（12）United States Patent
Awadin et al.

(10) Patent No.: US 11,871,451 B2
(45) Date of Patent: Jan. 9, 2024

(54) SUB-BAND OPERATIONS IN UNLICENSED SPECTRUMS OF NEW RADIO

(71) Applicant: InterDigital Patent Holdings, Inc., Wilmington, DE (US)

(72) Inventors: Mohamed Awadin, Plymouth Meeting, PA (US); Lakshmi R. Iyer, King of Prussia, PA (US); Qing Li, Princeton Junction, NJ (US); Pascal M. Adjakple, Great Neck, NY (US); Joseph M. Murray, Schwenksville, PA (US); Yifan Li, Conshohocken, PA (US); Guodong Zhang, Woodbury, NJ (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 17/275,702

(22) PCT Filed: Jul. 17, 2019

(86) PCT No.: PCT/US2019/042163
§ 371 (c)(1),
(2) Date: Mar. 12, 2021

(87) PCT Pub. No.: WO2020/068251
PCT Pub. Date: Apr. 2, 2020

(65) Prior Publication Data
US 2022/0039158 A1 Feb. 3, 2022

Related U.S. Application Data

(60) Provisional application No. 62/754,159, filed on Nov. 1, 2018, provisional application No. 62/737,380, filed on Sep. 27, 2018.

(51) Int. Cl.
H04W 74/08 (2009.01)
H04W 74/00 (2009.01)

(52) U.S. Cl.
CPC ..... *H04W 74/0816* (2013.01); *H04W 74/006* (2013.01); *H04W 74/0841* (2013.01); *H04W 74/0866* (2013.01)

(58) Field of Classification Search
CPC .......... H04W 72/042; H04W 72/0453; H04W 74/006; H04W 74/0816; H04W 74/0833; H04W 74/0841; H04W 74/0866
See application file for complete search history.

(56) References Cited

U.S. PATENT DOCUMENTS

| 934,888 A | 9/1909 | Dahlberg |
| 4,892,292 A | 1/1990 | Russell |

(Continued)

FOREIGN PATENT DOCUMENTS

| CN | 101313578 A | 11/2008 |
| CN | 101331735 A | 12/2008 |

(Continued)

OTHER PUBLICATIONS

Huawei,R3-161134,"Network slice selection," RAN WG3 Meeting #92, May 2016.

(Continued)

*Primary Examiner* — Kashif Siddiqui
(74) *Attorney, Agent, or Firm* — BakerHostetler

(57) ABSTRACT

Sub-band (SB) indications and listen-before-talk (LBT) outcomes may be used to adjust communications between devices such as wireless terminals and base stations. For example, a wireless terminal may receive SB indications including SB configurations and/or LBT outcomes of a base station, and other information such as a remapped CORESET. Similarly, a terminal may determine that a physical (Continued)

resource block (PRB) is invalid based at least in part on whether the PRB overlaps with a guard band. The terminal may be arranged to adjust its searches and transmissions based on received SB indications, and to provide the base station with LBT outcomes of the terminal.

20 Claims, 50 Drawing Sheets

(56) References Cited

U.S. PATENT DOCUMENTS

| | | |
|---|---|---|
| 5,610,653 A | 3/1997 | Abecassis |
| 5,892,554 A | 4/1999 | Dicicco et al. |
| 6,750,919 B1 | 6/2004 | Rosser |
| 6,973,130 B1 | 12/2005 | Wee et al. |
| 7,114,174 B1 | 9/2006 | Brooks et al. |
| 7,117,517 B1 | 10/2006 | Milazzo et al. |
| 7,343,617 B1 | 3/2008 | Katcher et al. |
| 7,577,980 B2 | 8/2009 | Kienzle et al. |
| 7,782,344 B2 | 8/2010 | Whittaker |
| 7,949,032 B1 | 5/2011 | Frost |
| 8,055,785 B2 | 11/2011 | Liu et al. |
| 8,160,077 B2 | 4/2012 | Traversat et al. |
| 8,243,797 B2 | 8/2012 | Lin et al. |
| 8,331,760 B2 | 12/2012 | Butcher |
| 8,621,000 B2 | 12/2013 | Adimatyam et al. |
| 8,705,527 B1 | 4/2014 | Addepalli et al. |
| 8,902,773 B2 | 12/2014 | Anderson et al. |
| 9,002,979 B2 | 4/2015 | Hansen |
| 9,047,236 B2 | 6/2015 | Pigliotti |
| 9,060,187 B2 | 6/2015 | Wu et al. |
| 9,064,313 B2 | 6/2015 | Seshadrinathan et al. |
| 9,137,027 B2 | 9/2015 | Matthews et al. |
| 9,170,707 B1 | 10/2015 | Laska et al. |
| 9,177,225 B1 | 11/2015 | Cordova-Diba et al. |
| 9,198,181 B2 | 11/2015 | Blankenship et al. |
| 9,231,838 B2 | 1/2016 | Ould-Brahim et al. |
| 9,276,710 B2 | 3/2016 | Damnjanovic et al. |
| 9,288,545 B2 | 3/2016 | Hill et al. |
| 9,317,688 B2 | 4/2016 | Yegin et al. |
| 9,336,060 B2 | 5/2016 | Nori et al. |
| 9,338,700 B2 | 5/2016 | Schulist et al. |
| 9,344,888 B2 | 5/2016 | Starsinic et al. |
| 9,380,623 B2 | 6/2016 | Kim et al. |
| 9,413,451 B2 | 8/2016 | Park et al. |
| 9,559,797 B2 | 1/2017 | Liao et al. |
| 9,992,553 B2 | 6/2018 | Bennett et al. |
| 10,028,302 B2 | 7/2018 | Au et al. |
| 10,111,163 B2 | 10/2018 | Vrzic et al. |
| 10,306,671 B2 | 5/2019 | Li et al. |
| 10,432,362 B2 | 10/2019 | Iyer et al. |
| 10,530,757 B2 | 1/2020 | Seed et al. |
| 10,979,924 B2 | 4/2021 | Fooher et al. |
| 11,051,293 B2 | 6/2021 | Tsai et al. |
| 11,122,027 B2 | 9/2021 | Seed et al. |
| 11,218,267 B2 | 1/2022 | Zhang et al. |
| 2002/0065678 A1 | 5/2002 | Peliotis et al. |
| 2002/0120931 A1 | 8/2002 | Huber et al. |
| 2002/0126990 A1 | 9/2002 | Rasmussen et al. |
| 2002/0174425 A1 | 11/2002 | Markel et al. |
| 2004/0032495 A1 | 2/2004 | Ortiz |
| 2004/0190779 A1 | 9/2004 | Sarachik et al. |
| 2005/0093976 A1 | 5/2005 | Valleriano et al. |
| 2005/0286466 A1 | 12/2005 | Fagg et al. |
| 2006/0155842 A1 | 7/2006 | Yeung et al. |
| 2006/0193295 A1 | 8/2006 | White et al. |
| 2007/0024706 A1 | 2/2007 | Brannon et al. |
| 2007/0042784 A1 | 2/2007 | Anderson |
| 2007/0086669 A1 | 4/2007 | Berger et al. |
| 2007/0101418 A1 | 5/2007 | Wood et al. |
| 2007/0104369 A1 | 5/2007 | Weatherhead |
| 2007/0140106 A1 | 6/2007 | Tsai et al. |
| 2007/0153739 A1 | 7/2007 | Zheng |
| 2007/0171921 A1 | 7/2007 | Wookey et al. |
| 2008/0127253 A1 | 5/2008 | Zhang et al. |
| 2008/0205351 A1 | 8/2008 | Lindoff et al. |
| 2008/0225116 A1 | 9/2008 | Kang et al. |
| 2008/0261711 A1 | 10/2008 | Tuxen |
| 2009/0007023 A1 | 1/2009 | Sundstrom |
| 2009/0046152 A1 | 2/2009 | Aman |
| 2009/0047902 A1 | 2/2009 | Nory et al. |
| 2009/0197630 A1 | 8/2009 | Ahn et al. |
| 2009/0201917 A1 | 8/2009 | Maes et al. |
| 2009/0217339 A1 | 8/2009 | Kim et al. |
| 2009/0220080 A1 | 9/2009 | Herne et al. |
| 2009/0225164 A1 | 9/2009 | Renkis |
| 2009/0276805 A1 | 11/2009 | Andrews et al. |
| 2009/0298497 A1 | 12/2009 | Lee |
| 2009/0300692 A1 | 12/2009 | Mavlankar et al. |
| 2009/0305708 A1 | 12/2009 | Matsui et al. |
| 2009/0316795 A1 | 12/2009 | Chui et al. |
| 2009/0323607 A1 | 12/2009 | Park et al. |
| 2010/0027466 A1 | 2/2010 | Mustapha |
| 2010/0035611 A1 | 2/2010 | Montojo et al. |
| 2010/0061361 A1 | 3/2010 | Wu |
| 2010/0097221 A1 | 4/2010 | Kreiner et al. |
| 2010/0188531 A1 | 7/2010 | Cordes et al. |
| 2010/0227611 A1 | 9/2010 | Schmidt et al. |
| 2010/0232504 A1 | 9/2010 | Feng |
| 2011/0013836 A1 | 1/2011 | Gefen et al. |
| 2011/0016321 A1 | 1/2011 | Sundaram et al. |
| 2011/0077013 A1 | 3/2011 | Cho et al. |
| 2011/0113480 A1 | 5/2011 | Ma et al. |
| 2011/0222428 A1 | 9/2011 | Charbit et al. |
| 2011/0231653 A1 | 9/2011 | Bollay et al. |
| 2011/0242997 A1 | 10/2011 | Yin |
| 2011/0263250 A1 | 10/2011 | Mueck et al. |
| 2011/0299832 A1 | 12/2011 | Butcher |
| 2011/0304772 A1 | 12/2011 | Dasher et al. |
| 2012/0009963 A1 | 1/2012 | Kim et al. |
| 2012/0047551 A1 | 2/2012 | Pattar et al. |
| 2012/0056898 A1 | 3/2012 | Tsurumi et al. |
| 2012/0062732 A1 | 3/2012 | Marman et al. |
| 2012/0072952 A1 | 3/2012 | Vaysman et al. |
| 2012/0078712 A1 | 3/2012 | Fontana et al. |
| 2012/0117140 A1 | 5/2012 | Wang et al. |
| 2012/0127934 A1 | 5/2012 | Anderson et al. |
| 2012/0163335 A1 | 6/2012 | Chung et al. |
| 2012/0238264 A1 | 9/2012 | Jindal |
| 2012/0308202 A1 | 12/2012 | Murata et al. |
| 2013/0003576 A1 | 1/2013 | Segura et al. |
| 2013/0016910 A1 | 1/2013 | Murata et al. |
| 2013/0017833 A1 | 1/2013 | Sakamoto et al. |
| 2013/0031582 A1 | 1/2013 | Tinsman et al. |
| 2013/0034071 A1 | 2/2013 | Lee et al. |
| 2013/0036442 A1 | 2/2013 | Wingert |
| 2013/0077574 A1 | 3/2013 | Ekpenyong et al. |
| 2013/0091430 A1 | 4/2013 | Zhai et al. |
| 2013/0091515 A1 | 4/2013 | Sakata et al. |
| 2013/0111609 A1 | 5/2013 | Resch et al. |
| 2013/0142118 A1 | 6/2013 | Cherian et al. |
| 2013/0155106 A1 | 6/2013 | Rolleston et al. |
| 2013/0155847 A1 | 6/2013 | Li et al. |
| 2013/0167062 A1 | 6/2013 | Herring et al. |
| 2013/0185353 A1 | 7/2013 | Rondao et al. |
| 2013/0188503 A1 | 7/2013 | Anepu et al. |
| 2013/0223339 A1 | 8/2013 | Nakahara |
| 2013/0225184 A1 | 8/2013 | Liu et al. |
| 2013/0225189 A1 | 8/2013 | Moon et al. |
| 2013/0242882 A1 | 9/2013 | Blankenship et al. |
| 2013/0246784 A1 | 9/2013 | Zhang et al. |
| 2013/0265932 A1 | 10/2013 | Huang et al. |
| 2013/0266286 A1 | 10/2013 | Yu et al. |
| 2013/0294506 A1 | 11/2013 | Kang et al. |
| 2013/0312042 A1 | 11/2013 | Shaw et al. |
| 2013/0342539 A1 | 12/2013 | Chan et al. |
| 2014/0022074 A1 | 1/2014 | Balinski et al. |
| 2014/0026052 A1 | 1/2014 | Thorwirth et al. |
| 2014/0029462 A1 | 1/2014 | Stewart |
| 2014/0033074 A1 | 1/2014 | Thibaux et al. |
| 2014/0036806 A1 | 2/2014 | Chen et al. |
| 2014/0059457 A1 | 2/2014 | Min |
| 2014/0082054 A1 | 3/2014 | Denoual et al. |

(56) References Cited

U.S. PATENT DOCUMENTS

| | | |
|---|---|---|
| 2014/0086177 A1 | 3/2014 | Adjakple et al. |
| 2014/0086217 A1 | 3/2014 | Park et al. |
| 2014/0089990 A1 | 3/2014 | Van et al. |
| 2014/0126402 A1 | 5/2014 | Nam et al. |
| 2014/0168056 A1 | 6/2014 | Swaminathan et al. |
| 2014/0195918 A1 | 7/2014 | Friedlander |
| 2014/0204247 A1 | 7/2014 | Bilgen et al. |
| 2014/0204854 A1 | 7/2014 | Freda et al. |
| 2014/0206854 A1 | 7/2014 | Bennett et al. |
| 2014/0215043 A1 | 7/2014 | Ryu et al. |
| 2014/0223095 A1 | 8/2014 | Storm et al. |
| 2014/0245367 A1 | 8/2014 | Sasaki et al. |
| 2014/0254544 A1 | 9/2014 | Kar et al. |
| 2014/0269932 A1 | 9/2014 | Su et al. |
| 2014/0279068 A1 | 9/2014 | Systrom et al. |
| 2014/0280781 A1 | 9/2014 | Gregotski |
| 2014/0282751 A1 | 9/2014 | Lee et al. |
| 2014/0282909 A1 | 9/2014 | Cherian et al. |
| 2014/0293901 A1 | 10/2014 | Hegde |
| 2014/0293942 A1 | 10/2014 | Kang et al. |
| 2014/0314100 A1 | 10/2014 | Song |
| 2014/0315593 A1 | 10/2014 | Vrzic et al. |
| 2014/0321375 A1 | 10/2014 | Agiwal et al. |
| 2014/0351891 A1 | 11/2014 | Grube et al. |
| 2014/0369201 A1 | 12/2014 | Gupta et al. |
| 2015/0014773 A1 | 1/2015 | Cheng et al. |
| 2015/0032901 A1 | 1/2015 | Wang et al. |
| 2015/0033312 A1 | 1/2015 | Seed et al. |
| 2015/0043520 A1 | 2/2015 | Sun et al. |
| 2015/0070587 A1 | 3/2015 | Emeott et al. |
| 2015/0089023 A1 | 3/2015 | Phillips et al. |
| 2015/0089072 A1 | 3/2015 | Phillips et al. |
| 2015/0103725 A1 | 4/2015 | Sun et al. |
| 2015/0104155 A1 | 4/2015 | Bloch et al. |
| 2015/0145782 A1 | 5/2015 | Brown et al. |
| 2015/0179219 A1 | 6/2015 | Gao et al. |
| 2015/0208103 A1 | 7/2015 | Guntur et al. |
| 2015/0222815 A1 | 8/2015 | Wang et al. |
| 2015/0223279 A1 | 8/2015 | Jiao et al. |
| 2015/0234708 A1 | 8/2015 | Storm et al. |
| 2015/0264096 A1 | 9/2015 | Swaminathan et al. |
| 2015/0268822 A1 | 9/2015 | Waggoner et al. |
| 2015/0282130 A1 | 10/2015 | Webb et al. |
| 2015/0296250 A1 | 10/2015 | Casper |
| 2015/0304693 A1 | 10/2015 | Hwang et al. |
| 2015/0326353 A1 | 11/2015 | Ko et al. |
| 2015/0326484 A1 | 11/2015 | Cao et al. |
| 2015/0327245 A1 | 11/2015 | Zhu et al. |
| 2015/0341091 A1 | 11/2015 | Park et al. |
| 2015/0348247 A1 | 12/2015 | McLaughlin et al. |
| 2015/0351084 A1 | 12/2015 | Werb |
| 2015/0382262 A1 | 12/2015 | Cho et al. |
| 2015/0382268 A1 | 12/2015 | Hampel et al. |
| 2016/0020877 A1 | 1/2016 | Koutsimanis et al. |
| 2016/0036578 A1 | 2/2016 | Malladi et al. |
| 2016/0042496 A1 | 2/2016 | Ichimi et al. |
| 2016/0057494 A1 | 2/2016 | Hwang et al. |
| 2016/0073106 A1 | 3/2016 | Su et al. |
| 2016/0073302 A1 | 3/2016 | Yang et al. |
| 2016/0100395 A1 | 4/2016 | Xu et al. |
| 2016/0113039 A1 | 4/2016 | Hole et al. |
| 2016/0135153 A1 | 5/2016 | Suzuki et al. |
| 2016/0156397 A1 | 6/2016 | Onggosanusi et al. |
| 2016/0156949 A1 | 6/2016 | Hattori et al. |
| 2016/0165309 A1 | 6/2016 | Van et al. |
| 2016/0165622 A1 | 6/2016 | Luo et al. |
| 2016/0182201 A1 | 6/2016 | Jiang et al. |
| 2016/0182593 A1 | 6/2016 | Denoual et al. |
| 2016/0183234 A1 | 6/2016 | Sung et al. |
| 2016/0192433 A1 | 6/2016 | Deenoo et al. |
| 2016/0217623 A1 | 7/2016 | Singh |
| 2016/0234736 A1 | 8/2016 | Kubota et al. |
| 2016/0234759 A1 | 8/2016 | Kubota et al. |
| 2016/0249269 A1 | 8/2016 | Niu et al. |
| 2016/0249353 A1 | 8/2016 | Nakata et al. |
| 2016/0253240 A1 | 9/2016 | Cocagne |
| 2016/0270102 A1 | 9/2016 | Zeng et al. |
| 2016/0306036 A1 | 10/2016 | Johnson |
| 2016/0337706 A1 | 11/2016 | Hwang et al. |
| 2016/0344464 A1 | 11/2016 | Kim |
| 2016/0352545 A1 | 12/2016 | Johnson |
| 2016/0353343 A1 | 12/2016 | Rahman et al. |
| 2016/0353465 A1 | 12/2016 | Vrzic et al. |
| 2016/0360235 A1 | 12/2016 | Ramasubramonian et al. |
| 2016/0366454 A1 | 12/2016 | Tatourian et al. |
| 2017/0013598 A1 | 1/2017 | Jung et al. |
| 2017/0034845 A1 | 2/2017 | Liu et al. |
| 2017/0070735 A1 | 3/2017 | Ramasubramonian et al. |
| 2017/0080158 A1 | 3/2017 | Cabiri et al. |
| 2017/0118054 A1 | 4/2017 | Ma et al. |
| 2017/0118540 A1 | 4/2017 | Thomas et al. |
| 2017/0134913 A1 | 5/2017 | Cui et al. |
| 2017/0136948 A1 | 5/2017 | Sypitkowski et al. |
| 2017/0163645 A1 | 6/2017 | Bradley et al. |
| 2017/0164212 A1 | 6/2017 | Opsenica et al. |
| 2017/0164349 A1 | 6/2017 | Zhu et al. |
| 2017/0201686 A1 | 7/2017 | Choi et al. |
| 2017/0201980 A1 | 7/2017 | Hakola et al. |
| 2017/0212583 A1 | 7/2017 | Krasadakis |
| 2017/0230915 A1 | 8/2017 | Kim et al. |
| 2017/0230985 A1 | 8/2017 | Yamada et al. |
| 2017/0236288 A1 | 8/2017 | Sundaresan et al. |
| 2017/0244529 A1* | 8/2017 | Yu .................... H04W 76/15 |
| 2017/0273063 A1 | 9/2017 | Kim et al. |
| 2017/0289791 A1 | 10/2017 | Yoo et al. |
| 2017/0290052 A1 | 10/2017 | Zhang et al. |
| 2017/0302719 A1 | 10/2017 | Chen et al. |
| 2017/0331670 A1 | 11/2017 | Parkvall et al. |
| 2017/0331785 A1 | 11/2017 | Xu et al. |
| 2017/0359731 A1 | 12/2017 | Soldati et al. |
| 2017/0366311 A1 | 12/2017 | Iyer et al. |
| 2018/0034612 A1 | 2/2018 | Lin et al. |
| 2018/0076994 A1 | 3/2018 | Lee et al. |
| 2018/0115357 A1 | 4/2018 | Park et al. |
| 2018/0123763 A1 | 5/2018 | Yu |
| 2018/0124598 A1 | 5/2018 | Zeng |
| 2018/0139656 A1 | 5/2018 | Xu et al. |
| 2018/0167938 A1 | 6/2018 | Stephenne et al. |
| 2018/0184415 A1 | 6/2018 | Rong et al. |
| 2018/0198504 A1 | 7/2018 | Li et al. |
| 2018/0199361 A1 | 7/2018 | Zhang et al. |
| 2018/0220407 A1 | 8/2018 | Xiong et al. |
| 2018/0242304 A1 | 8/2018 | Rong et al. |
| 2018/0254851 A1 | 9/2018 | Roessel et al. |
| 2018/0270696 A1 | 9/2018 | Duan et al. |
| 2018/0270698 A1 | 9/2018 | Babaei et al. |
| 2018/0287722 A1 | 10/2018 | Takano |
| 2018/0294860 A1 | 10/2018 | Hakola et al. |
| 2018/0317213 A1* | 11/2018 | Islam .............. H04W 72/0406 |
| 2018/0332632 A1 | 11/2018 | Vikberg et al. |
| 2018/0338277 A1 | 11/2018 | Byun et al. |
| 2018/0343043 A1 | 11/2018 | Hakola et al. |
| 2018/0367255 A1 | 12/2018 | Jeon et al. |
| 2018/0368018 A1 | 12/2018 | Kim et al. |
| 2019/0036910 A1 | 1/2019 | Choyi et al. |
| 2019/0037409 A1 | 1/2019 | Wang et al. |
| 2019/0045340 A1 | 2/2019 | Zhu et al. |
| 2019/0045577 A1 | 2/2019 | Kim et al. |
| 2019/0089423 A1 | 3/2019 | Davydov |
| 2019/0159107 A1 | 5/2019 | Kim et al. |
| 2019/0182856 A1 | 6/2019 | Moroga et al. |
| 2019/0190579 A1 | 6/2019 | Wang et al. |
| 2019/0200315 A1 | 6/2019 | Tsai et al. |
| 2019/0208474 A1 | 7/2019 | Ali et al. |
| 2019/0224474 A1 | 7/2019 | Yang et al. |
| 2019/0281623 A1 | 9/2019 | Andgart et al. |
| 2019/0288789 A1 | 9/2019 | Li et al. |
| 2019/0342782 A1 | 11/2019 | Yum et al. |
| 2019/0363777 A1 | 11/2019 | Karjalainen et al. |
| 2020/0021999 A1* | 1/2020 | Park ................... H04L 1/1854 |
| 2020/0059969 A1* | 2/2020 | Agiwal ............ H04W 74/0833 |
| 2020/0092065 A1 | 3/2020 | Kuang et al. |
| 2020/0221480 A1 | 7/2020 | Li et al. |
| 2020/0351917 A1 | 11/2020 | Bang et al. |

(56) References Cited

U.S. PATENT DOCUMENTS

| | | |
|---|---|---|
| 2020/0359391 A1 | 11/2020 | Behravan et al. |
| 2020/0383129 A1 | 12/2020 | Ko et al. |
| 2020/0404655 A1 | 12/2020 | Salem |
| 2020/0404663 A1 | 12/2020 | Zhang et al. |
| 2021/0021314 A1* | 1/2021 | Sun .................. H04L 5/005 |
| 2021/0029646 A1 | 1/2021 | Park |
| 2021/0037561 A1 | 2/2021 | Lyu et al. |
| 2021/0044385 A1 | 2/2021 | Hosseini et al. |
| 2021/0045125 A1 | 2/2021 | Mondal et al. |
| 2021/0045181 A1 | 2/2021 | Li et al. |
| 2021/0051646 A1 | 2/2021 | Maaref et al. |
| 2021/0068138 A1 | 3/2021 | Baldemair et al. |
| 2021/0105104 A1 | 4/2021 | Cao et al. |
| 2021/0105833 A1 | 4/2021 | Freda et al. |
| 2021/0130629 A1 | 5/2021 | Suzuki et al. |

FOREIGN PATENT DOCUMENTS

| | | |
|---|---|---|
| CN | 101350923 A | 1/2009 |
| CN | 101622891 A | 1/2010 |
| CN | 101690271 A | 3/2010 |
| CN | 101868273 A | 10/2010 |
| CN | 101917765 A | 12/2010 |
| CN | 102026270 A | 4/2011 |
| CN | 102038998 A | 5/2011 |
| CN | 102045849 A | 5/2011 |
| CN | 102090126 A | 6/2011 |
| CN | 102238547 A | 11/2011 |
| CN | 102474394 A | 5/2012 |
| CN | 102577294 A | 7/2012 |
| CN | 102726109 A | 10/2012 |
| CN | 102752877 A | 10/2012 |
| CN | 102907068 A | 1/2013 |
| CN | 102939573 A | 2/2013 |
| CN | 102971032 A | 3/2013 |
| CN | 103069739 A | 4/2013 |
| CN | 103190089 A | 7/2013 |
| CN | 103560936 A | 2/2014 |
| CN | 103563462 A | 2/2014 |
| CN | 103944686 A | 7/2014 |
| CN | 104012106 A | 8/2014 |
| CN | 104052788 A | 9/2014 |
| CN | 104092488 A | 10/2014 |
| CN | 104205930 A | 12/2014 |
| CN | 104220975 A | 12/2014 |
| CN | 104394558 A | 3/2015 |
| CN | 104753780 A | 7/2015 |
| CN | 104782166 A | 7/2015 |
| CN | 104838713 A | 8/2015 |
| CN | 104869583 A | 8/2015 |
| CN | 104936189 A | 9/2015 |
| CN | 105050189 A | 11/2015 |
| CN | 105103566 A | 11/2015 |
| CN | 105144727 A | 12/2015 |
| CN | 105162557 A | 12/2015 |
| CN | 105264904 A | 1/2016 |
| CN | 105284172 A | 1/2016 |
| CN | 105323049 A | 2/2016 |
| CN | 105373331 A | 3/2016 |
| CN | 105471487 A | 4/2016 |
| CN | 105532050 A | 4/2016 |
| CN | 106023261 A | 10/2016 |
| CN | 106233745 A | 12/2016 |
| CN | 106416223 A | 2/2017 |
| CN | 107007910 A | 8/2017 |
| EP | 0246076 A1 | 11/1987 |
| EP | 1175785 A1 | 1/2002 |
| EP | 2086266 A2 | 8/2009 |
| EP | 2408196 A1 | 1/2012 |
| EP | 2426645 A1 | 3/2012 |
| EP | 2464076 A2 | 6/2012 |
| EP | 2530675 A2 | 12/2012 |
| EP | 2553860 A1 | 2/2013 |
| EP | 2710844 A1 | 3/2014 |
| EP | 2824883 A1 | 1/2015 |
| EP | 2824885 A1 | 1/2015 |
| EP | 2869478 A1 | 5/2015 |
| EP | 2882110 A1 | 6/2015 |
| EP | 2919471 A1 | 9/2015 |
| EP | 3051906 A1 | 8/2016 |
| EP | 3076672 A1 | 10/2016 |
| EP | 3082362 A1 | 10/2016 |
| EP | 3101971 A1 | 12/2016 |
| EP | 3110160 A1 | 12/2016 |
| EP | 3420659 A1 | 1/2019 |
| JP | 63-013503 A | 1/1988 |
| JP | 02-464076 A | 2/1990 |
| JP | 2004-104351 A | 4/2004 |
| JP | 2007-192988 A | 8/2007 |
| JP | 2010-050269 A | 3/2010 |
| JP | 2010-508789 A | 3/2010 |
| JP | 2010-519838 A | 6/2010 |
| JP | 2012-507961 A | 3/2012 |
| JP | 2013-522965 A | 6/2013 |
| JP | 2014-502128 A | 1/2014 |
| JP | 2014-525191 A | 9/2014 |
| JP | 2014-530534 A | 11/2014 |
| JP | 2015-207934 A | 11/2015 |
| JP | 2016-013351 A | 1/2016 |
| JP | 2016-504798 A | 2/2016 |
| JP | 2016-504851 A | 2/2016 |
| JP | 2016-514416 A | 5/2016 |
| JP | 6313503 B1 | 4/2018 |
| JP | 2019-518364 A | 6/2019 |
| JP | 2019-525616 A | 9/2019 |
| KR | 10-2008-0041237 A | 5/2008 |
| KR | 10-2008-0109535 A | 12/2008 |
| KR | 10-2009-0085640 A | 8/2009 |
| KR | 10-2010-0065327 A | 6/2010 |
| KR | 10-2010-0097625 A | 9/2010 |
| KR | 10-2011-0063565 A | 6/2011 |
| KR | 10-2013-0029374 A | 3/2013 |
| KR | 10-2014-0043532 A | 4/2014 |
| KR | 10-2014-0098156 A | 8/2014 |
| KR | 10-2014-0123870 A | 10/2014 |
| KR | 10-2015-0118874 A | 10/2015 |
| KR | 10-2015-0119355 A | 10/2015 |
| KR | 10-1563469 B1 | 10/2015 |
| KR | 10-2016-0021141 A | 2/2016 |
| KR | 10-2016-0055086 A | 5/2016 |
| KR | 10-2017-0128515 A | 11/2017 |
| KR | 10-2019-0089423 A | 7/2019 |
| WO | 00/65837 A1 | 11/2000 |
| WO | 01/18658 A1 | 3/2001 |
| WO | 2007/052753 A1 | 5/2007 |
| WO | 2007/125910 A1 | 11/2007 |
| WO | 2010/001474 A1 | 1/2010 |
| WO | 2010/021705 A1 | 2/2010 |
| WO | 2010/050269 A1 | 5/2010 |
| WO | 2010/082805 A2 | 7/2010 |
| WO | 2011/082150 A1 | 7/2011 |
| WO | 2011/097904 A1 | 8/2011 |
| WO | 2011/123805 A1 | 10/2011 |
| WO | 2012/021246 A2 | 2/2012 |
| WO | 2012/114666 A1 | 8/2012 |
| WO | 2012/130180 A1 | 10/2012 |
| WO | 2012/141557 A2 | 10/2012 |
| WO | 2012/155326 A1 | 11/2012 |
| WO | 2014/057131 A1 | 4/2014 |
| WO | 2014/059591 A1 | 4/2014 |
| WO | 2014/067566 A1 | 5/2014 |
| WO | 2014/090200 A1 | 6/2014 |
| WO | 2014/090208 A2 | 6/2014 |
| WO | 2014/111423 A1 | 7/2014 |
| WO | 2014/135126 A1 | 9/2014 |
| WO | 2014/183803 A1 | 11/2014 |
| WO | 2014/190308 A1 | 11/2014 |
| WO | 2015/013645 A1 | 1/2015 |
| WO | 2015/013685 A1 | 1/2015 |
| WO | 2015/045658 A1 | 4/2015 |
| WO | 2015/059194 A1 | 4/2015 |
| WO | 2015/067196 A1 | 5/2015 |
| WO | 2015/080646 A1 | 6/2015 |
| WO | 2015/084048 A1 | 6/2015 |

(56) References Cited

FOREIGN PATENT DOCUMENTS

| | | |
|---|---|---|
| WO | 2015/100533 A1 | 7/2015 |
| WO | 2015/113205 A1 | 8/2015 |
| WO | 2015/122737 A1 | 8/2015 |
| WO | 2015/141982 A1 | 9/2015 |
| WO | 2015/166840 A1 | 11/2015 |
| WO | 2016/013351 A1 | 1/2016 |
| WO | 2016/028111 A1 | 2/2016 |
| WO | 2016/033731 A1 | 3/2016 |
| WO | 2016/040290 A1 | 3/2016 |
| WO | 2016/040833 A1 | 3/2016 |
| WO | 2016/094191 A1 | 6/2016 |
| WO | 2016/130353 A2 | 8/2016 |
| WO | 2017/061297 A1 | 4/2017 |
| WO | 2017/147515 A1 | 8/2017 |
| WO | 2017/191833 A1 | 11/2017 |
| WO | 2017/195478 A1 | 11/2017 |
| WO | 2018/028602 A1 | 2/2018 |

OTHER PUBLICATIONS

Qualcomm Incorporated, S2-162339, "Solution for key issue 1 on Network Slicing: Network Slice and Network Functions Selection based on evolved eDECOR model," SA WG2 Meeting #115, May 2016.
"Nokia Networks Enhancements for MTC Paging", R3-151590 Discussion Paper MTC Paging vB, Aug. 14, 2015.
3GPP TS 36 211 V13.0.0, "Technical Specification Group Radio Access Network; Evolved Universal Terrestrial Radio Access (E-UTRA); Physical Channels and Modulation (Release 13)", Dec. 2015, 141pages.
3GPP TSG GERA1 Adhoc #3 GPC150521, Samsung Electronics, "Discussions of Grant-Free Multiple Access in CIoT (Update GPC150512)", Jul. 2015, 9 pages.
3GPP TSG RAN WG1 Meeting #84bis R1-163049, Design Options for Longer Cyclic Prefix for MBSFN Subframes, Apr. 2016, 3 pages.
3GPP TSG-RAN WG2 Meeting #95 R2-164693, Samsung, "System Information Signalling Design in NR" Aug. 2016, 6 pages.
3GPP TSG-RAN2 meeting #95bis R2-166202, Huawei et al., "Further Discussions of Minimum SI" Oct. 2016, 3 pages.
3GPP TSG-RAN2 Meeting #95bis R2-166203, Huawei et al., "Delivery of "Other SI" in NR", Oct. 2016, 5 pages.
3GPP TSG=RAN WG2 Meeting #95bis, ETSI MCC, "Skeleton report", Oct. 2016, 5 pages.
3rd Generation Partnership Project (3GPP) R2-162571 TSGRAN WG2 Meeting #93bis, Introduction of Virtual Cell, CATT, Dubrovnik, Croatia, Apr. 11-15, 2016, 3 pages.
3rd Generation Partnership Project (3GPP) RP-160301 TSG RAN Meeting #71, Motivation for new WI on Light Connection in LTE, Huawei, HiSilicon, Goteborg, Sweden, Mar. 7-11, 2016, 14 pages.
3rd Generation Partnership Project (3GPP) RP-160425 TSG RAN Meeting #71, Further enhancements on signaling reduction to enable light connection for LTE, Intel Corporation, Gothenburg, Sweden, Mar. 7-10, 2016, 7 pages.
3rd Generation Partnership Project (3GPP) RP-160540 TSG RAN Meeting #71, New WI proposal: Signalling reduction to enable light connection for LTE, Gothenburg, Sweden, Mar. 7-10, 2016, 7 pages.
3rd Generation Partnership Project (3GPP) RP-161214 TSG RAN Meeting #72, Revision of SI: Study on New Radio Access Technology, NTT DOCOMO, Busan, Korea, Jun. 13-16, 2016, 8 pages.
3rd Generation Partnership Project (3GPP) S1-152395 Revision of S1-152074, ZTE Corporation et al., "Update the network slicing use case in Smarter", ZTE Smarter Update the Network Slicing Use case REV3, vol. SA WG1, No. Belgrade Serbia, Aug. 24, 2015, 3 pages.
3rd Generation Partnership Project (3GPP) S1-161323 TSG-SA WG1 Meeting #74, Editorial cleanup and alignment of eMBB TR22.863, Venice, Italy, May 9-13, 2016, 4 pages.

3rd Generation Partnership Project (3GPP) S2-161198 SA WG2 Meeting #113AH, Solution for optimized UE sleep state and state transitions, Sophia Antipolis, France, Feb. 23-26, 2016, 3 pages.
3rd Generation Partnership Project (3GPP) S2-161324 SA WG2 Meeting #113, Solution to Key Issue on Mobility Framework, Sophia Antipolis, FR, Feb. 23-26, 2016, 3 pages.
3rd Generation Partnership Project (3GPP) S2-162982 was S2-162717-MDD and Slice Selection in core and RAN V1, 3rd vol. SA WG2 Nokia et al., No. Nanjing, P.R. China; May 27, 2016, 13 pages.
3rd Generation Partnership Project (3GPP) SA WG2 Meeting #115 S2-162511 "Common CP functions and dedicate CP function for simultaneous multiple Network Slice (update of solution 1.3)" May 23-27, 2016, 4 pages.
3rd Generation Partnership Project (3GPP) TR 22.861 V14.1.0, Technical Specification Group Services and Systems Aspects, Feasibility Study on New Services and Markets Technology Enablers for Massive Internet of Things, Stage 1 (Release 14), Sep. 2016, 28 pages.
3rd Generation Partnership Project (3GPP) TR 22.862 V14.1.0, Technical Specification Group Services and System Aspects, Feasibility Study on New Services and Markets Technology Enablers for Critical Communications, Stage 1 (Release 14), Sep. 2016, 31 pages.
3rd Generation Partnership Project (3GPP) TR 22.863 V0.3.1, Technical Specification Group Services and System Aspects, Feasibility Study on New Services and Markets Technology Enablers—Enhanced Mobile Broadband; Stage 1 (Release 14), Feb. 2016, 13 pages.
3rd Generation Partnership Project (3GPP) TR 22.863 V14.1.0, Technical Specification Group Services and System Aspects, Feasibility Study on New Services and Markets Technology Enablers—Enhanced Mobile Broadband, Stage 1 (Release 14), Sep. 2016, 21 pages.
3rd Generation Partnership Project (3GPP) TR 22.864 V14.1.0, Technical Specification Group Services and System Aspects, Feasibility Study on New Services and Markets Technology Enablers—Network Operation, Stage 1 (Release 14), Sep. 2016, 35 pages.
3rd Generation Partnership Project (3GPP) TR 22.891 V14.2.0, Technical Specification Group Services and System Aspects, Feasibility Study on New Services and Markets Technology Enablers, Stage 1 (Release 14), Sep. 2016, 95 pages.
3rd Generation Partnership Project (3GPP) TR 23.720 V13.0.0, Technical Specification Group Services and System Aspects, Study on architecture enhancements for Cellular Internet of Things, (Release 13), Mar. 2016, 94 pages.
3rd Generation Partnership Project (3GPP) TR 36.881 V14.0.0, Technical Specification Group Radio Access Network, Evolved Universal Terrestrial Radio Access (E-UTRA), Study on Latency Reduction Techniques for LTE (Release 14), Jun. 2016, 249 pages.
3rd Generation Partnership Project (3GPP) TR 36.897 V13.0.0, Technical Specification Group Radio Access Network, Study on Elevation Beamforming/Full-Dimension (FD) Multiple Input Multiple Output (MIMO) for LTE; (Release 13), Jun. 2015, 58 pages.
3rd Generation Partnership Project (3GPP) TR 36.912 V13.0.0, Technical Specification Group Radio Access Network, Feasibility study for Further Advancements for E-UTRA (LTE-Advanced) (Release 13), Dec. 2015, 273 pages.
3rd Generation Partnership Project (3GPP) TR 38.801 V0.2.0, Technical Specification Group Radio Access Network, Study on New Radio Access Technology: Radio Access Architecture and Interface (Release 14), Jun. 2016, 20 pages.
3rd Generation Partnership Project (3GPP) TR 38.913 V14.3.0, Technical Specification Group Radio Access Network, Study on Scenarios and Requirements for Next Generation Access Technologies, (Release 14), Jun. 2017, 39 pages.
3rd Generation Partnership Project (3GPP) TR 45.820 V13.1.0, Technical Specification Group GSM/EDGE Radio Access Network, Cellular system support for ultra-low complexity and low throughput Internet of Things (CIoT) (Release 13), Nov. 2015, 495 pages.
3rd Generation Partnership Project (3GPP) TS 23.060 V13.6.0, Technical Specification Group Services and System Aspects, General Packet Radio Service (GPRS), Service description, Stage 2 (Release 13), Mar. 2016, 362 pages.

(56) References Cited

OTHER PUBLICATIONS

3rd Generation Partnership Project (3GPP) TS 23.401 V13.6.1, Technical Specification Group Services and System Aspects, General Packet Radio Service (GPRS) enhancements for Evolved Universal Terrestrial Radio Access Network (E-UTRAN) access (Release 13), Mar. 2016, 365 pages.
3rd Generation Partnership Project (3GPP) TS 24.302 V13.5.0, Technical Specification Group Core Network and Terminals, Access to the 3GPP Evolved Packet Core (EPC) via non-3GPP access networks; Stage 3 (Release 13), Mar. 2016, 126 pages.
3rd Generation Partnership Project (3GPP) TS 36.133 V14.7.0, Technical Specification Group Radio Access Network, Evolved Universal Terrestrial Radio Access (E-UTRA), Requirements for support of radio resource management (Release 14), Mar. 2018, 2997 pages.
3rd Generation Partnership Project (3GPP) TS 36.213 V13.0.0, Technical Specification Group Radio Access Network, Evolved Universal Terrestrial Radio Access (E-UTRA), Physical layer procedures (Release 13), Dec. 2015, 326 pages.
3rd Generation Partnership Project (3GPP) TS 36.300 V13.3.0, Technical Specification Group Radio Access Network, Evolved Universal Terrestrial Radio Access (E-UTRA) and Evolved Universal Terrestrial Radio Access Network (E-UTRAN), Overall description; Stage 2 (Release 13), Mar. 2016, 295 pages.
3rd Generation Partnership Project (3GPP) TS 36.321 V13.0.0, Technical Specification Group Radio Access Network, Evolved Universal Terrestrial Radio Access (E-UTRA), Medium Access Control (MAC) protocol specification (Release 13), Dec. 2015, 82 pages.
3rd Generation Partnership Project (3GPP) TS TSG RAN WG1 Meeting #84bis, Busan, Korea ,Intel Corporation, Overview of New Radio Access Technology Requirements and Designs, 8.1.1, Discussion and Decision, Apr. 2016, 4 pages.
3rd Generation Partnership Project (3GPP) TS TSG RAN WG1 Meeting #85,2016 Nanjing, China 23rd-27th,NTT DoCoMo, Inc., Uplink Multiple Access Schemes for NR, 7.1.3.2, Discussion and Decision, May 2016, 4 pages.
3rd Generation Partnership Project (3GPP) TSG RAN WG1 #84bis Meeting, R1-163757, Way Forward on Channel Coding Evaluation for 5G New Radio, Busan, Korea, Apr. 11-15, 2016, Agenda Item 8.1.6.1, 5 pages.
3rd Generation Partnership Project (3GPP) TSG RAN WG1 #85, R1-164013, Framework for Beamformed Access, Samsung, Nanjing, China, May 23-27, 2016, 4 pages.
3rd Generation Partnership Project (3GPP) TSG RAN WG1 #85, R1-164014, Discussion on RS for Beamformed Access, Samsung, Nanjing, China, May 23-27, 2016, 3 pages.
3rd Generation Partnership Project (3GPP) TSG RAN WG1 #85, R1-165669, Way Forward on Frame Structure, Qualcomm and etc., Nanjing, China, May 23-27, 2016, Agenda Item 7.1.4, 2 pages.
3rd Generation Partnership Project (3GPP) TSG RAN WG1 Meeting #83 R1-157351, Initial Views on Technical Design for NB-IoT, Nov. 15-22, 2015, 3 pages.
3rd Generation Partnership Project (3GPP) TSG RAN WG1 Meeting #84bis R1-162379, "Overview of new radio access technology requirements and designs" Apr. 11-15, 2016, 4 pages.
3rd Generation Partnership Project (3GPP) TSG RAN WG1 Meeting #84bis R1-162797, "Harq Enhancement for Improved Data Channel Efficiency", Busan, Korea, Apr. 11-15, 2016, 3 pages.
3rd Generation Partnership Project (3GPP) TSG RAN WG1 Meeting #85 R1-164871 "Frame structure for new radio interface", May 23-27, 2016, 3 pages.
3rd Generation Partnership Project (3GPP) TSG RAN WG1 Meeting #85 R1-165174 "Uplink multiple access schemes for NR", May 23-27, 2016, 4 pages.
Nokia et al., R1-163267, On design of DL control channel for shorter TTI operation, 3GPP TSG RAN WG1 #84bis, #GPP Apr. 1, 2016.

3GPP TSG-RAN1#85 R1-164869, "Low code rate and signature based multiple access scheme for New Radio," May 23-27, 2016, pp. 1-4.
Huawei et al., "R1-162116, Discussion on enhanced frame structure for latency reduction in TDD," 3GPP TSG RAN WG1 #84bis, (Apr. 1, 2016).
NTT DOCOMO, Inc., R1-160965, "UL aspects of TTI shortening," 3GPP TSG RAN WG1 #84, 3GPP (Feb. 5, 2016).
Spreadtrum Communications, R1-164584, "Harq feedback for sTTI scheduling," 3GPP TSG RAN WG1 #85, 3GPP (May 13, 2016).
Huawei et al., "Numerology and wideband operation in NR unlicensed", 3GPP Draft; R1-1803677, 3rd Generation Partnership vol. RAN WG1, No. Sanya, China; Apr. 16, 2018-Apr. 20, 2018, Apr. 15, 2018, Apr. 16, 2018-Apr. 20, 2018.
Huawei et al.: "Initial access in NR unlicensed", 3GPP Draft R1-1808062 3rd Generation Partnership Project (3GPP), Mobile Competence Centre, vol. RAN WG1, No. Aug. 10, 2018, Aug. 20, 2018-Aug. 24, 2018.
Nokia et al: Feature Lead's Summary on Channel Access Procedures 3GPP Draft; R1-1809801 NRU Channel Access Summary 3rd Generation Partnership Project (3GPP), Mobile Competence Centre, vol. RAN WG1, No. Gothenburg, Sweden; Aug. 23, 2018, Aug. 20, 2018-Aug. 20, 2018.
ZTE: "Considerations on channel access procedure for NR-U", 3GPP Draft; R2-1811281 Considerations on Random Access Procedure for NR-U, 3rd Generation Partnership Project (3GPP), Mobile Competence Centre vol. RAN WG2, No. Gothenburg, Sweden; Aug. 9, 2018, Aug. 20, 2018-Aug. 24, 2018.
3rd Generation Partnership Project (3GPP) TSG RAN WG1 Meeting #86bis R1-1610524, WF on NR RS Definition, Huawei, HiSilicon, Lisbon, Portugal, Oct. 10-14, 2016, Agenda Item: 8.1.4.4, 4 pages.
3rd Generation Partnership Project (3GPP) TSG-RAN WG1 #85, R1-164628, Frame Structure for NR, Ericsson, Nanjing, China, May 23-27, 2016, 3 pages.
3rd Generation Partnership Project (3GPP) TSG-RAN WG1 #85, R1-164694, Frame Structure Requirements, Qualcomm, Nanjing, China, May 23-27, 2016, 5 pages.
3rd Generation Partnership Project (3GPP) TSG-RAN WG1#85 R1-165027 "Basic Frame Structure Principles for 5G" May 23-27, 2016, 6 pages.
3rd Generation Partnership Project (3GPP) TSG-RAN WG1#85, R1-165363, Nokia, Alcatel-Lucent Shanghai Bell, Scalability of MIMO Operation Across NR Carrier Frequencies, Nanjing, P.R. China, May 23-27, 2016, 5 pages.
3rd Generation Partnership Project (3GPP) TSG-RAN WG2 Meeting #94 R2-163371, "System Information Signalling Design in NR", May 23-27, 2016, 7 pages.
3rd Generation Partnership Project (3GPP) TSG-RAN WG2 Meeting #94, R2-163718 "Control Plane functions in NR", Nanjing, China; May 23-27, 2016, 4 pages.
3rd Generation Partnership Project (3GPP), RI-165027, vol. RAN WG1, Nokia et al.: "Basic frame structure 1 principles for 5G", 3GPP Draft; No. Nanjing, P R. China; May 23, 2016-May 27, 2016 May 13, 2016.
3rd Generation Partnership Project (3GPP), TS 36.212 V10.8.0, RAN WG1, Technical Specification Group Radio Access Network; Evolved Universal Terrestrial Radio Access (E-UTRA); Multiplexing and Channel Coding (Release 10), Jun. 17, 2013, pp. 1-79.
3rd Generation Partnership Project (3GPP), TSG RAN WG1 Meeting #86, "RAN1 Chairman's Notes", Gothenburg, Sweden, Aug. 22-26, 2016, 105 pages.
3rd Generation Partnership Project; (3GPP) TR 22.891 V1.1.0, 3rd Generation Partnership Project; Technical Specification Group Services and System Aspects; Feasibility Study on New Services and Markets Technology Enablers; Stage 1 (Release 14), Nov. 2015, 95 pages.
3rd Generation Partnership Project; (3GPP) TR 23.799, "Technical Specification Group Services and System Aspects Study on Architecture for Next Generation System (Release 14)", vol. SA WG2, No. V0.5.0, Jun. 8, 2016, pp. 1-179.
3rd Generation Partnership Project; (3GPP) TR 38.913 V0.2.0, 3rd Generation Partnership Project; Technical Specification Group Radio

(56) References Cited

OTHER PUBLICATIONS

Access Network; Study on Scenarios and Requirements for Next Generation Access Technologies; (Release 14), Feb. 2016, 19 pages.
3rd Generation Partnership Project; (3GPP) TS 36.211 V13.1.0, 3rd Generation Partnership Project; Technical Specification Group Radio Access Network; Evolved Universal Terrestrial Radio Access (E-UTRA); Physical Channels and Modulation (Release 13), Mar. 2016, 155 pages.
3rd Generation Partnership Project; (3GPP) TS 36.304 V13.0.0, 3rd Generation Partnership Project; Technical Specification Group Radio Access Network; Evolved Universal Terrestrial Radio Access (E-UTRA); User Equipment (UE) Procedures in idle Mode (Release 13), Dec. 2015, 42 pages.
3rd Generation Partnership Project; (3GPP) TS 36.331 V13.0.0, Technical Specification Group Radio Access Network; Evolved Universal Terrestrial Radio Access (E-UTRA); Radio Resource Control (RRC); Protocol specification (Release 13), Dec. 2015, 507 pages.
3rd Generation Partnership Project; (3GPP) TSG-RAN WG1 #86bis, R1-1610177, "DL Control Channels Overview", Qualcomm Incorporated, Oct. 10-14, 2016, Lisbon, Portugal, Discussion, Oct. 1, 2016, 6 pages.
Budisin S. "Decimation Generator of Zadoff-Chu Sequences", In: Carlet C., Pott A. (eds) Sequences and Their Applications—SETA 2010. SETA 2010. Lecture Notes in Computer Science, vol. 6338. Springer, Berlin, Heidelberg, 2010, 40 pages.
Budisin, "Decimation Generator of Zadoff-Chu Sequences", C. Carlet and A. Pott (Eds.): SETA 2010, LNCS 6338, pp. 30-40, 2010.
CATT: "On interference measurement enhancement for multi-user MIMO operation", 3GPP TSG RAN WG1 Meeting #85, R1-164223, May 14, 2016, May 23, 2016-May 27, 2016, XP051096527.
CATT: "WF on Interference Measurement Enhancements", 3GPP TSG RAN WGI Meeting #86bis, R1-1610771, Oct. 18, 2016, Oct. 10, 2016-Oct. 14, 2016, XP051160249.
Chu, David, "Polyphase Codes With Good Periodic Correlation Properties", IEEE Transactions on Information Theory, Jul. 1972, 531-532.
Consideration on System Information Broadcast in New RAT, ZTE, 3GPPTSG-RANWG2 Meeting #93bis, R2-162629, Apr. 15, 2016.
Etri, "FS_NEO updated requirement of network slicing", 3GPP TSG-SA WG1 #74 S1-161171, Apr. 29, 2016, URL:http://www.3gpp.org/ftp/tsg_sa/WG1_Serv/TSGS1_74_Venice/docs/SI-161171.zip, 6 pages.
Etri, "High-level Functional Architecture for the Network Slicing", 3GPPTSG-SA WG2 #114 SZ-161833, Apr. 6, 2016, URL: http://www.3gpp.org/ftp/tsg_sa/WG2_Arch/TSGS2_114_Sophia_Antipolis/Docs/S2-161833.zip, 7 pages.
Huawei et al., "Discussion on frame structure for NR", 3 GPP TSG-RAN WG1#85, R1-164032, May 23-27, 2016, 8 pages.
Huawei, "HiSilicon, UE Slice Association/Overload control Procedure", 3GPP TSG-SA WG2 #115 SZ-162605, May 17, 2016, URL:http://www. 3gpp.org/ftp/tsg_sa/WG2_Arch/TSGS2_115_Nanjing_China/Docs/S2-162605.zip, 11 pages.
Huawei, HiSilicon LTE-NR tight interworking control plane, R2-164268 LTE-NR tight interworking control plane, May 14, 2016.
IEEE P802.11, Wireless LANs, Proposed TGax draft specification, Comment Resolutions on UL MU Operation, Jul. 25, 2016, 27 pages.
International Telecommunication Union (ITU-R), "IMT Vision—Framework and overall objectives of the future development of IMT for 2020 and beyond", Recommendation ITU-R M.2083-0, Sep. 2015, 21 pages.
Itri, "Updates to Solution 6. 1.3: Introducing Network Instance ID", 3GPP TSG-SA WG2 #115 SZ-162666, May 17, 2016, URL:http://www.3gpp.org/ftp/tsg_sa/WG2_Arch/TSGS2_115_Nanjing_China/Docs/S2-162666.zip>.
MediaTek Inc., "HARQ Enhancement for Improved Data Channel Efficiency" [online], 3GPP TSG-RAN WG1#84b, R1-162797, <URL:http://www.3gpp.org/ftp/tsg_ran/WG1_RL1/TSGR1_84b/Docs/R1-162797.zip>, Apr. 2016, 4 pages.

NGMN 5G Initiative White Paper v1.0, Feb. 17, 2015, 125 pages.
Nokia, "Alcatel-Lucent Shanghai Bell", Slice Selection solution update, 3GPP TSG-SA WG2 #115 SZ-162982, May 27, 2016, URL: http://www.3gpp.org/ttp/tsg_sa/WG2_Arch/TSGS2_115_Nanjing_China/Docs/S2-162982.zip, 15 pages.
Nokia, "Solutions for Network Slice Selection", Alcatel-Lucent Shanghai Bell, 3GPP TSGG-RAN WG3 Meeting #92, R3-161356, China, May 23-27, 2016, 9 pages.
NTT DOCOMO Inc., "Discussion on frame structure for NR", 3GPP TSG-RAN WG1#85, R1-165176, May 23-May 27, 2016, 10 pages.
NTT DOCOMO, Inc., and Uplink multiple access schemesfor NR [online] and 3GPP TSG-RANWG 1#85R1-165174, the Internet<URL:http://www.3gpp.org/ftp/tsg_ran/WG1_RL1/TSGR1_1281/Docs/R1-165174.zip>, May 27, 2016, 1-4 pages.
Qualcomm Incorporated: "Frame structure requirements", 3GPP DRAFT; vol. RAN WG1, No. Nanjing, China; May 14, 2016.
Qualcomm, 3GPP R1-1612062, TSG-RAN WG1 #87, Control Channel for slot format indicator, Nov. 14-18, 2016 (Year: 2016).
Samsung: "Signaling of Slot Structure", 3GPP Draft; R1-1609127, 3rd Generation Partnership Project (3GPP), Mobile Competence Centre; 650, Route Des Lucioles; F-06921 SOPHIA ANTI POLIS CEO EX ; France, RAN WG1, No. Lisbon, Portugal; Oct. 10, 2016-Oct. 14, 2016 Sep. 30, 2016.
Sesia et al., "LTE- The UMTS Long Term Evolution", Chapter 9.3.3., LTE-The UMTS Long Term Evolution : from theory to Practice; Jul. 20, 2011, pp. 198-200.
Zte et al., "Forward compatibilty for numerology and fr ame structure design", R1-164261, 3GPP TSG-RAN WG1#85, May 23-27, 2016, 7 pages.
Zte, "Consideration on RAN architecture impacts of network slicing", 3GPP TSG-RAN WG2 Meeting #93bis, R2-162627, Croatia, Apr. 11-15, 2016, 10 pages.
Huawei et al., "Design of initial downlink transmission for LBE-based LAA", R1-150980, 3GPP TSG RAN WG1, Mar. 2015, 6 Pages.
Nokia et al., "On supported Shorter TTI lengths and its configurability", 3GPP TSG RAN WG1 Meeting #85, 2016, R1-164945, 4 pages.
Spreadtrum Communications, "HARQ feedback for sTTI scheduling", R1-162546, Apr. 2016, 3GPP TSG RAN WG1 Meeting #84bis, 4 Pages.
3rd Generation Partnership Project; 3GPP TS 23 228 V12.1.0; Technical Specification Group Services and System Aspects; IP Multimedia Substystem (IMS); Stage 2 (Release 12), Jun. 2013, 296 pages.
ASUSTeK, R1-083574, Draft CR on RNTI for UE-specific search space, 3GPP TSG-RAN1 Meeting #54bis, Oct. 2018.
Damour, N., "List of Common Services Functions-Call for Contributions", M2M Functional Architecture Technical Specification, Doc# oneM2M-ARC-2013-0304R04-List of oneM2M CSFs- Call for contributions-2.DOC Input Contribution, Jul. 11, 2013, 1-5 pages.
ETSI TS 102690 V2.0.14 Technical Specification, "Machine-to-Machine Communications (M2M) Functional Architecture", Jul. 2013, 332 pages.
European Telecommunications Standards Institute (ETSI), TS 102 690 V1.2.1; Machine-to- Machine Communications (M2M); Functional Architecture, Jun. 2013, 279 pages.
Itri, "Discussion on resource utilization for UE-specific BF CSI-RS", R1-162987, 7.3.3.1.2, 3GPP TSG RAN WG1 Meeting #84b, 2016, 2 Pages.
Machine-to-Machine Communications (M2M) Functional Architecture, Draft ETSI TS 102 690 V1.1.1, Oct. 2011, 280 pages.
Motorola Mobility, "Synchronization signal in NR", 3GPP TSG-RAN WG1#86b R1-1609917, Oct. 2016, 5 Pages.
OMA (Open Mobile Alliance), OMA-TS-LightweightM2M-V1_0-20130206-D, Lightweight Machine to Machine Technical Specification, Draft Version 1.0-Feb. 6, 2013, 53 pages.
OneM2M Technical Specification, oneM2M-TS-0001 oneM2M Functional Architecture-V- 0.0.3, Jun. 8, 2013, 11 pages.

(56) References Cited

OTHER PUBLICATIONS

Third Generation Partnership Project, "Technical Specification Group Radio Access Network; Evolved Universal Terrestrial Radio Access (E-UTRA); Multiplexing and channel coding (Release 13)," 3GPP TS 36.212 V13.2.0 (Jun. 2016).
Mavlankar et al., "Video Streaming with Interactive Pan/Tilt/Zoom", High-Quality Visual Experience, Jan. 2010, pp. 26.
Sun, et. al., The Dynamic Videobook: A Hierarchical Summarization for Surveillance Video, Published in IEEE Sep. 2013, pp. 3963-3966.
"Consideration on TTI shortening for DL", 3GPP TSG RAN WG1 Meeting #84, R1-161017, Feb. 2016, 4 Pages.
"Considerations on required downlink physical layer enhancements for shorter TTI", 3GPP TSG-RAN WG1 Meeting #84, R1-160786, Feb. 2016, 6 Pages.
"Discussion on downlink control channel design," 3GPP TSG RAN WG1 Meeting #86bis, R1-1609432, Oct. 10-14, 2016, p. 5.
"Study on TTI shortening for downlink transmissions", 3GPP TSG RAN WG1 Meeting #84 , R1-160649, Feb. 2016, 6 Pages.
LG Electronics, "Transmission modes for Un PDSCH", 3GPP TSG RAN WG1 Meeting #63, R1-106138, 2010, pp. 3.

\* cited by examiner

SUB-BAND OPERATIONS IN UNLICENSED SPECTRUMS OF NEW RADIO

CROSS-REFERENCE TO RELATED APPLICATIONS

This application is the National Stage of International Patent Application No. PCT/US2019/042163, filed Jul. 17, 2019, which claims the benefit of U.S. Provisional Application No. 62/737,380, filed Sep. 27, 2018; and United States Provisional Application No. 62/754,159, filed Nov. 1, 2018, the disclosures of which are incorporated herein by reference in their entireties.

SUMMARY

Sub-band (SB) indications and Listen-Before-Talk (LBT) outcomes may be used to adjust communications between devices such as wireless terminals and base stations. For example, a wireless terminal device, such as a User Equipment (UE) may receive SB indications including SB configurations and/or LBT outcomes of a base station, and then use such information in a variety of ways.

For example, a UE may receive a remapped Control Resource Set (CORESET) from a base station. Similarly, a UE may determine that a Physical Resource Block (PRB) is invalid based on whether the PRB overlaps with a guard band, wherein the PRB belongs to a group of PRBs in a CORESET. Similarly, a UE may determine that a group of PRBs is invalid based on whether the PRB overlaps the guard band. Further, an apparatus may assume that any invalid PRB does not carry a Physical Downlink Control Channel (PDCCH).

An apparatus may be arranged to select transmission opportunities for MSG3 transmission in a Random Access Channel (RACH) procedure, where such transmission opportunities are separated in the frequency domain, time domain, or both. For example, a transmission opportunity may be selected based upon a Random Access Response (RAR), where the RAR indicates a sub-band or a Bandwidth Part (BWP) for MSG3. Multiple transmission opportunities may be inferred by applying a shift relative to a guard band. An opportunity may be determined by random selection, or based upon an identifier (ID) of the apparatus, from among multiple MSG3 transmission opportunities provided by one or more MSG2 messages.

Similarly, RACH MSG3 transmission opportunities may be selected in the time domain. For example, transmission opportunities may be select based upon a random access response (RAR).

An apparatus may receive indications of an LBT type for a MSG3 of a RACH procedure. For example, an LBT type may be indicated in Downlink Control Information (DCI) scheduling a random Access Response (RAR), or in the RAR itself.

An apparatus may determine, for on a channel state information reference signal (CSI-RS) that crosses a boundary between an available and an unavailable LBT sub-band, whether the CSI-RS sub-band is fully dropped, partially dropped, or bounded within the available sub-band. The unavailable sub-band may be a guard band or an LBT sub-band that is indicated to be unavailable based on the LBT outcome of the base station, for example.

An apparatus may adjust a CSI-RS assumption by dropping one or more Orthogonal Frequency Division Multiplexing (OFDM) symbols carrying CSI-RS that fall before the base station successfully acquires a channel, or by shifting one or more OFDM symbols carrying CSI-RS based at least in part upon when the base station successfully acquires a channel, for example.

A terminal apparatus may provide assistance information to a base station, the assistance information pertaining to an LBT outcome of the apparatus. The apparatus may then receive an adjusted SB indication back from the base station, for example. One or more SB indications and the assistance information may be exchanged between the apparatus and the base station during a first portion of a maximum channel occupancy time (MCOT), e.g., where the adjusted SB indication is received during a second portion of the MCOT. The assistance information may include one or more preferred downlink (DL) sub-bands.

SB indications may be carried in group communications, e.g., wherein the one or more SB indications contain a group identifier.

Further, an apparatus may adjust a search space base at least in part on an available sub-band.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with the accompanying drawings.

FIG. 4A shows an example LBT-independent sub-band configuration and, FIG. 4B shows an example LBT-dependent sub-band configurations solution.

DETAILED DESCRIPTION

Table 0 of the Appendix lists several acronyms used herein.

The term "procedure" generally refers to methods of performing operations to achieve particular ends. The term "procedure" is used in place of "method" to avoid confusion with special meanings of the term "method" in the context of M2M and IoT applications. The steps described for procedures are often optional, and potentially be performed in a variety of ways and a variety of sequences. Hence, herein the term "procedure" should not be interpreted as referring to a rigid set and sequence of steps, but rather to a general methodology for achieving results that may be adapted in a variety of ways.

Unlicensed Spectrum in NR

In mmWave, there is wide range of unlicensed spectrum that can be further utilized to attain higher data rate than attained by operating in sub 6 GHz frequency band. In the previous study item (SI) and the current work item (WI) on NR unlicensed, procedures to enhance the co-existence between NR-U and other technologies operating in the unlicensed, e.g., WiFi devices, LTE-based LAA devices, other NR-U devices, etc., and meet the regulatory requirements will be extensively studied and specified, without much degradation for NR-U devices in term of throughput and latency.

NR Bandwidth Adaption

With Bandwidth Adaptation (BA), the receive and transmit bandwidth of a UE need not be as large as the bandwidth of the cell and can be adjusted: the width can be ordered to change (e.g. to shrink during period of low activity to save power); the location can move in the frequency domain (e.g. to increase scheduling flexibility); and the subcarrier spacing can be ordered to change (e.g. to allow different services). A subset of the total cell bandwidth of a cell is referred to as a Bandwidth Part (BWP) and BA is achieved by configuring the UE with BWP(s) and telling the UE which of the configured BWPs is currently the active one. A Serving Cell may be configured with at most four BWPs, and for an activated Serving Cell, there is always one active BWP at any point in time.

Figure 1:
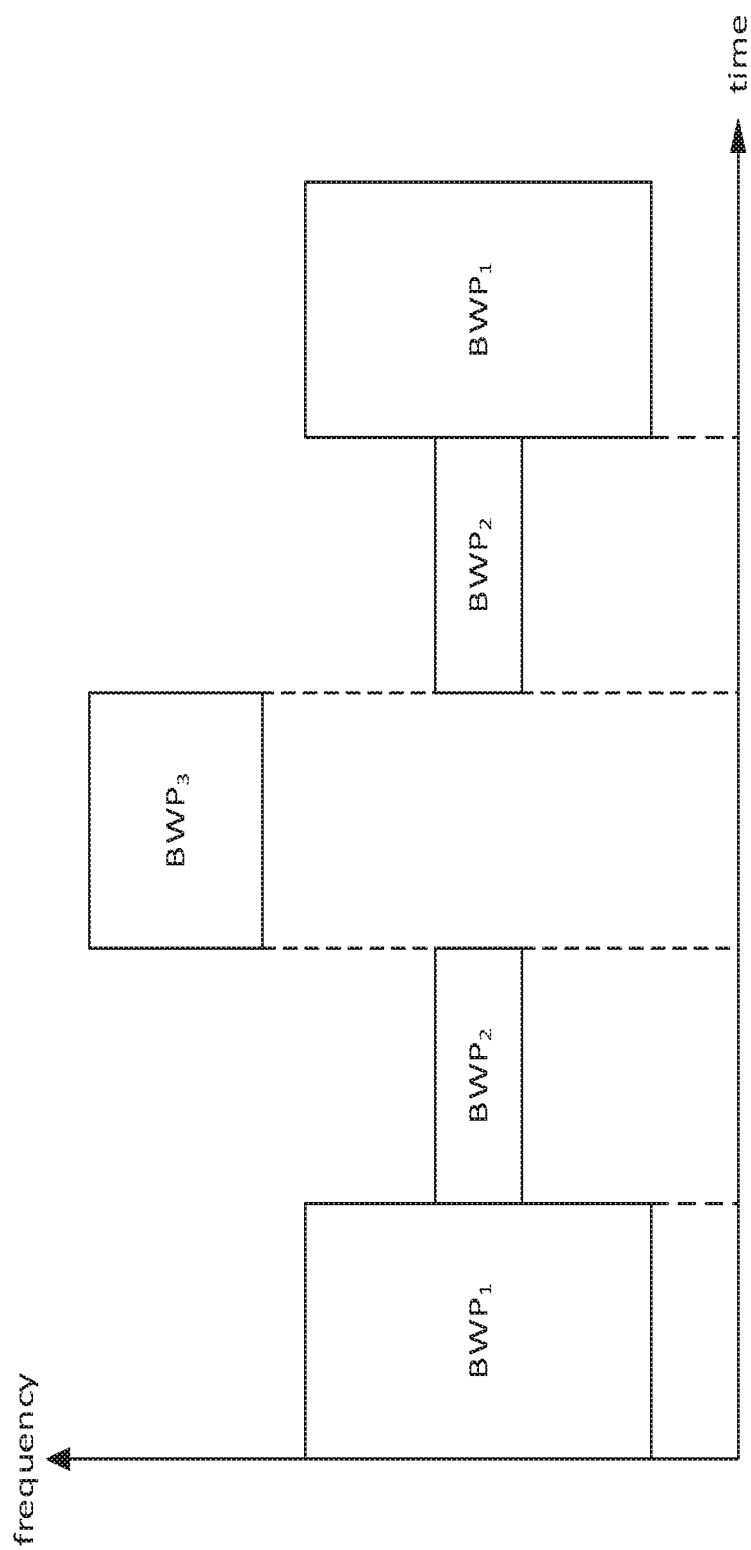
FIG. 1 illustrates and example of bandwidth adaptation.

FIG. 1 describes a scenario where 3 different BWPs are configured:

BWP1 with a width of 40 MHz and subcarrier spacing of 15 kHz;

BWP2 with a width of 10 MHz and subcarrier spacing of 15 kHz;

BWP3 with a width of 20 MHz and subcarrier spacing of 60 kHz.

NR Random Access Procedure

The random access procedure is triggered by a number of events, e.g., as described in 3GPP TS 38.300, NR; NR and NG-RAN Overall Description; Stage 2 (Release 15), V15.0.0 and 3GPP TS 38.213, Physical layer procedures for control (Release 15), V15.1.0.

Figure 2:
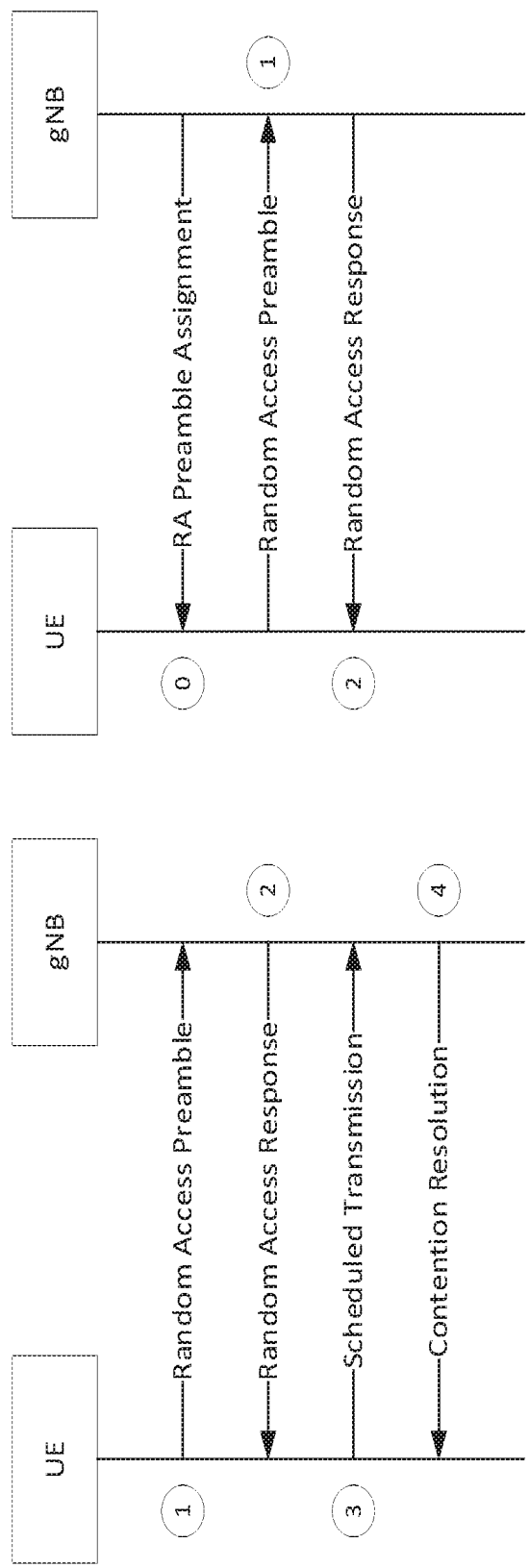
FIGS. 2A and 2B show call flows of example random access procedures.

Initial access from RRC_IDLE;
RRC Connection Re-establishment procedure;
Handover;
DL or UL data arrival during RRC_CONNECTED when UL synchronization status is "non-synchronized";
Transition from RRC_INACTIVE;
Request for Other SI.
Beam failure recovery Furthermore, the random access procedure takes two distinct forms: contention based and contention free as shown in FIG. 2. Normal DL/UL transmission can take place after the random access procedure.

For initial access in a cell configured with SUL, the UE selects the SUL carrier if and only if the measured quality of the DL is lower than a broadcast threshold. Once started, all uplink transmissions of the random access procedure remain on the selected carrier.

Example Challenges

Problem 1: Sub-Band Configurations and LBT Outcome Indication

In NR-U, it is beneficial to operate on frequency granularity, namely sub-band, smaller than bandwidth part (BWP) to increase the likelihood of accessing the channel and to cope with channel unavailability that would have potentially been experienced if listen-before-talk (LBT) is conducted on whole frequency band allocated to BWP and only portion of this band is occupied by other nodes. Therefore, it is of great interest to describe efficient procedures to configure the sub-bands within the BWP. Moreover, it is important to develop procedures to indicate the outcome of the LBT across the sub-bands within the BWP such that UE can adjust its behavior in monitoring different signaling and channels.

Problem 2: CORESET Configurations while Conducting Sub-Band Based LBT

In NR, the control resource set (CORESET) is defined with respect to BWP that contains the CORESET's frequency resources. Adopting sub-band based LBT imposes additional challenges depending on relative location of the CORESET's frequency domain resources and sub-band. For example, the sub-band that fully contains the CORESET's frequency domain resources may not be available while other sub-bands in the same BWP are available. Moreover, for large CORESETs with frequency domain resources spanning multiple sub-bands, if some of those sub-bands are not available, it is most likely that the UE will fail to decode the associated downlink control indicator (DCI). Then how the CORESET may be configured to increase its transmission chance and how these configurations are indicated to the UE to monitor the CORESET properly.

Problem 3: Uplink BWP switching for RACH and BFR

Allowing dynamic UL BWP switching is also beneficial to increase the chance that UE accesses the channel and mitigate the effect of channel unavailability due to LBT failure. To this end, the issue UL BWP switching during random access procedure or during beam failure recovery procedure need to be addressed. Furthermore, the issue of UL resources assignment to the UE, for the MSG3 transmission or for the transmission of beam failure recovery request (BFRQ), that supports UL BWP switching during Random Access procedure or during Beam Failure Recovery procedure need to be addressed.

Sub-Band Configuration and Indication Procedures

Sub-Band Configurations

Figure 3:
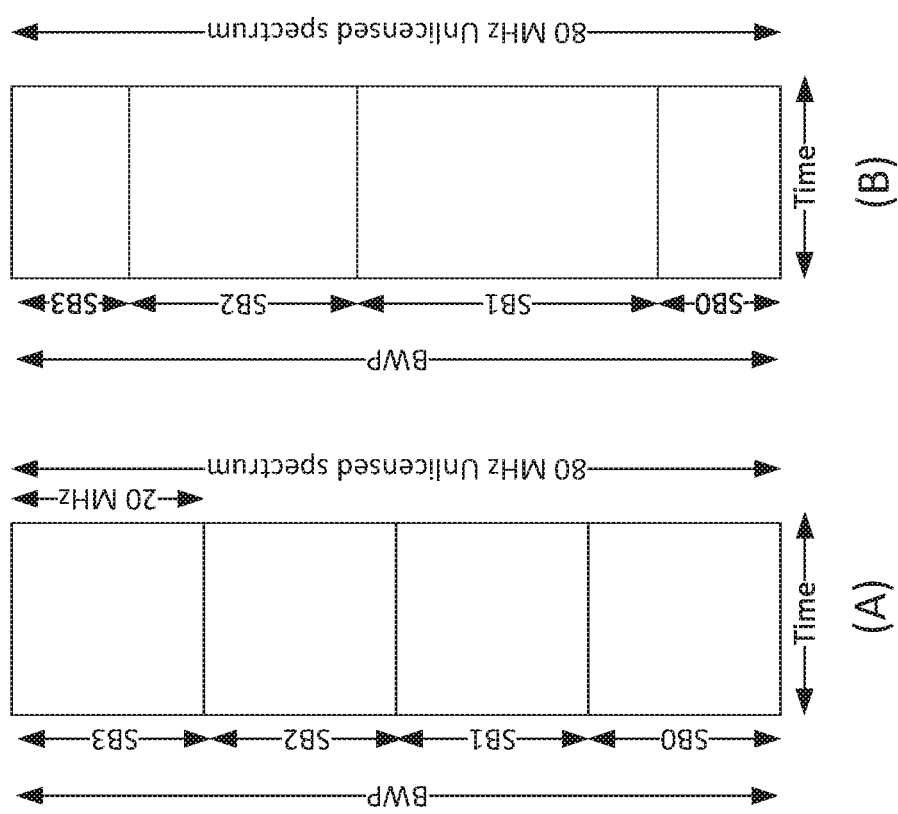
FIGS. 3A and 3B show example bandwidth parts with multiple sub-bands, where (A) sub-bands have equal bandwidth, and where (B) sub-bands have different bandwidths.

In NR-U, channel access depends on the outcome of the deployed channel sensing procedures which imposes uncertainty on whether gNB or UE successfully acquired channel when they are supposed to transmit any signals or/and channels. Sub-band operation can be beneficial in mitigating the deleterious effects of channel unavailability specifically if a small portion of allocated frequency band operating BWP is occupied by other nodes while the rest is available. In sub-band operation, the BWP may be divided into equal or unequal bandwidths as shown, for example, in FIG. 3A and FIG. 3B, respectively. The essence of adopting sub-band is to operate on finer frequency granularity smaller than BWP to enhance the chance that gNB or UE can acquire the channel.

Our developed solutions for configuring sub-bands fall into two main categories. In the first set of solutions, a set of sub-bands within the active DL BWP is configured to the UE. Based on LBT outcome at gNB, UE monitors the available sub-bands (associated with successful LBT) within the initially configured set of sub-bands within the active DL BWP. UE cannot monitor any other sub-bands outside the configured set of sub-bands within the active DL BWP until this configuration is updated. Therefore, we call this category of solutions as LBT-independent sub-band configurations. In the second category, we herein propose another set of solutions in which gNB may indicate only the available sub-bands within the active DL BWP out of a set of sub-bands configurations based on LBT outcome at gNB. Therefore, once a particular set of sub-bands within the active DL BWP is indicated to be available, then UE is expected to monitor all of them. This category of solutions is named as LBT-dependent sub-band configurations. The key difference between the two categories is that in the former set of solutions some of the configured sub-bands may not be available due to LBT failure, while in the latter set of solutions all the indicated sub-bands are always available. Moreover, in the former set of solutions, gNB may explicitly indicate to the UE that some sub-bands are always abandon, while in the latter set of solutions such indication may be accomplished implicitly as will be explained in the text.

As possibly another set of solutions that may be adopted on the top of both solution categories is called UE-assisted sub-band selection in which the UE assists the gNB in determining the preferred downlink sub-bands. Such assistance may be beneficial to avoid the hidden nodes issues where the UE may further narrow down the provided downlink sub-bands in case some of them are not available from UE perspective and indicate those selected sub-bands. Moreover, in time-division-duplexing (TDD) or frequency-division-duplexing (FDD) operation, the UE may only monitor the downlink sub-bands if those downlink sub-bands are available from UE perspective (LBT is conducted successfully at the UE). Alternately or additionally, the UE may only monitor the downlink sub-bands if those downlink sub-bands are available from UE perspective (LBT is conducted successfully at the UE) and there is at least one UL sub-band with successful LBT. Similarly, the UE may not monitor the downlink sub-bands even if they are available when the UE has no available UL sub-bands.

Figure 4A:
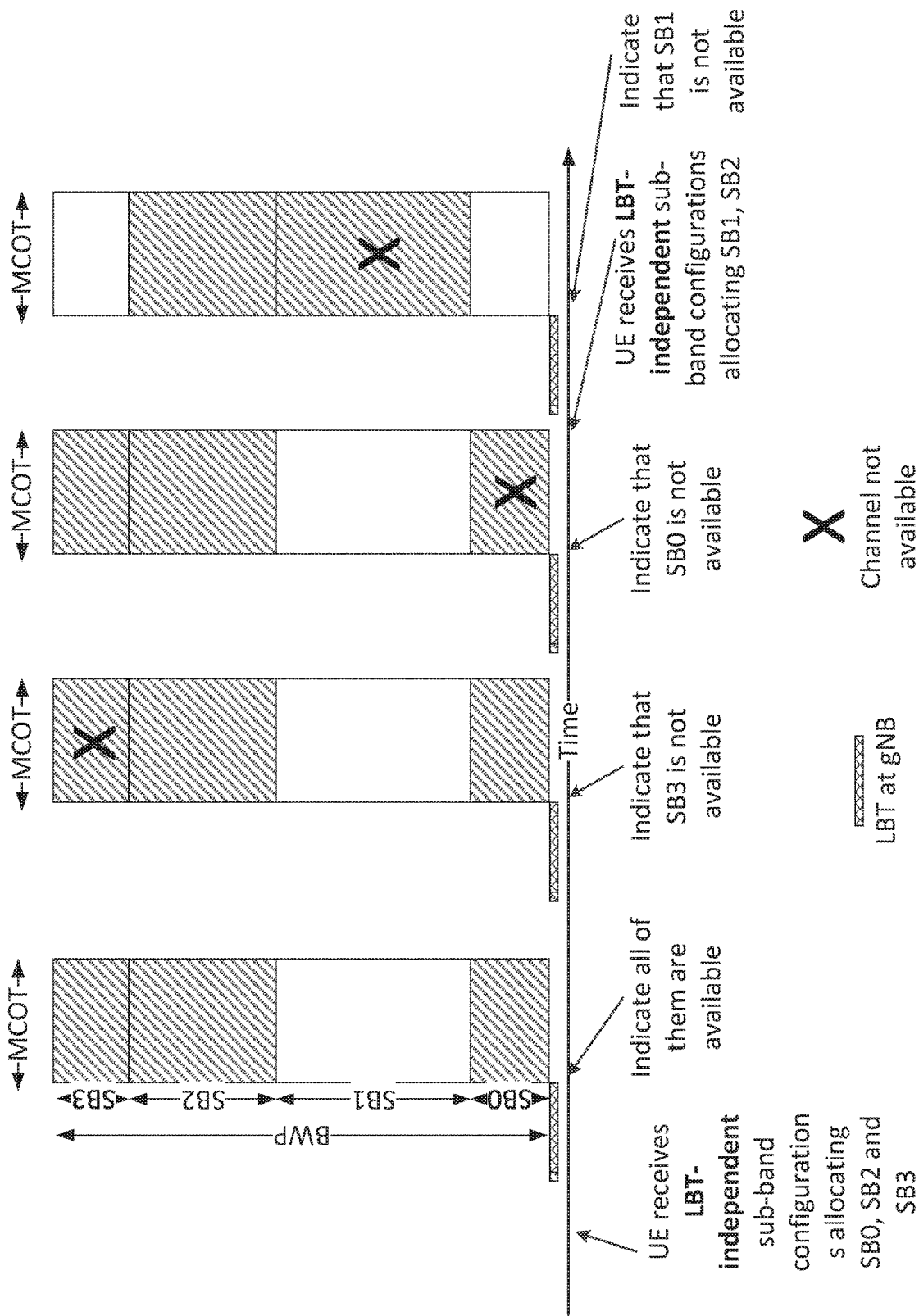
FIGS. 4A and 4B illustrate examples of the difference between two solutions categories.
Figure 4B:
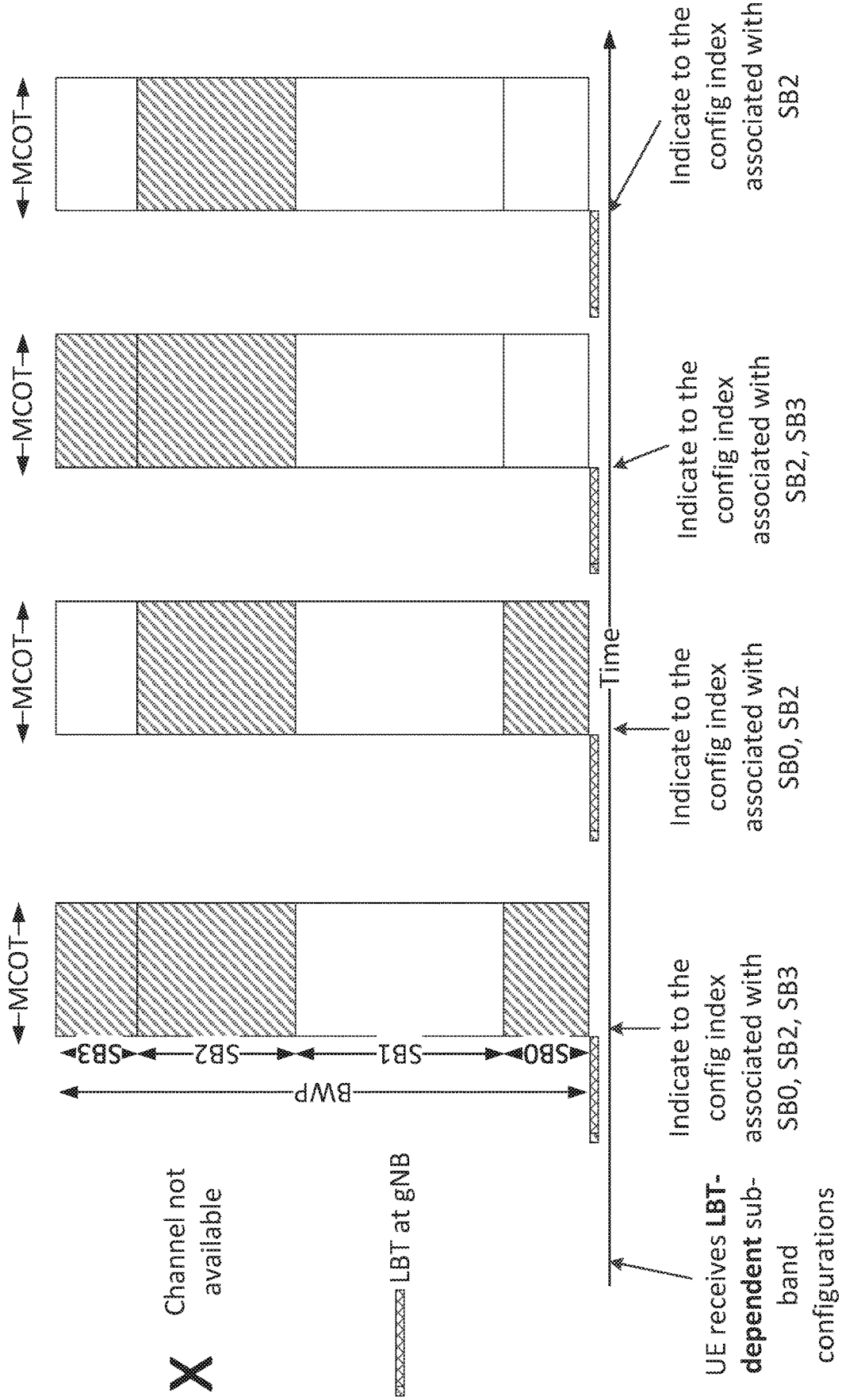

FIG. 4 shows the main difference between the two solution categories. In FIG. 4A, the UE receives LBT-independent sub-band configurations allocating SB0, SB2, and SB3 within the active DL BWP. In this case, UE only monitor those sub-bands. If any of them is not available, gNB may indicate the unavailable sub-band and the UE only monitors the available ones out of what was initially configured. To monitor new sub-bands, new configurations should be received by the UE. On the other hand, FIG. 4B shows the high level description of the second category of solutions, e.g., LBT-dependent sub-band configurations, in which gNB indicates the sub-bands that UE may monitor after each successful LBT at gNB.

FIG. 4 is a high level illustration of the difference between the two solutions categories. FIG. 4A show LBT-independent sub-band configurations and FIG. 4B shows LBT-dependent sub-band configurations solutions.

Sub-Band Static Configurations

LBT-Independent Sub-Band Configurations

If sub-bands (SBs) have equal bandwidth, the UE may be configured with number of equal SBs and associated bandwidth of the SB through high layer parameters, e.g., NumEqSB, and BandwidthSB, for each configured BWP. The UE may assume that SB with the smallest sub-band index occupy the lowest physical resource blocks (PRB) in a BWP containing the sub-bands and the next sub-band index occupy the next set of PRB in increscent way. The SBs' indices are arranged in ascending order with respect to the occupied PRBs as shown in FIG. 3A for example.

Alternatively, we herein propose a high layer configuration message such as SB IE, an example is given in Information Element 1 of the Appendix, which may be used to configure each SBs separately with unequal bandwidths and non-uniform frequency domain location as shown in FIG. 3B, for example. Each BWP may consist of multiple SBs configured through multiple information elements.

See Example Information Element 1, SB information element, of the Appendix.

Table 1 contains the description of the SB IE parameters.

To allow non-contiguous sub-bands, if applicable, we herein propose to configure their frequency domain resources through high layer parameter such as frequencyDomainResoruces, RRC parameter, instead of locationAndBandwidth. For example, this parameter may be a bit string of size 45 bits where each bit may correspond to group of 6 PRBs with grouping starting from PRB0 which is fully contained in the BWP containing the sub-bands. Moreover, the most significant bit may correspond to the group of lowest frequency which is fully contained in the BWP within which the sub-band is configured, each next subsequent lower significance bit corresponds to the next lowest frequency group fully contained within the BWP within which the sub-band is configured, if any. Bits corresponding to a group not fully contained within the BWP within which the sub-band is configured are set to zero. Moreover, the parameter frequencyDomainResoruces may be with respect to the actual component carrier containing the BWP and its sub-bands.

Moreover, we herein propose a compact high layer message such as SB-List, e.g., RRC IE, which may be used to configure multiple sub-bands at one shot. The message SB-List may consist of multiple blocks of the aforementioned SB IE each one configures a single sub-band.

See Example Information Element 1, SB-List information element, of the Appendix.

LBT-Dependent Sub-Band Configurations:

In this solution, we herein propose to use high layer message to configure the UE with a list of potential sub-bands' configurations with a BWP. Then, based on LBT outcome one configurations will be selected. For each configuration, the proposed message may carry information on the frequency domain resources, subcarrier spacing, cyclic prefix, etc. For example, Table 2 shows how different configuration indices are sub-bands. Configuration's index 0 indicates to frequency domain resources as same as those occupied by SB0 in FIG. 3, while configuration's index 5 indicates to frequency domain resources as same as those occupied by SB0 and SB3 in the same figure.

To this end, high layer message may be called BWP_SB_Configs, e.g., RRC IE, as in Information Element 3 in the Appendix for example. The parameter SB-Config-Id represents the index of the configurations as in Table 2 while the other parameters are defined as same as in the aforementioned SB IE.

See, Example Information Element 3, BWP_SB_Config information element, of the Appendix.

SB Semi-Static Configurations

LBT-Independent Sub-Band Configurations

Figure 5:
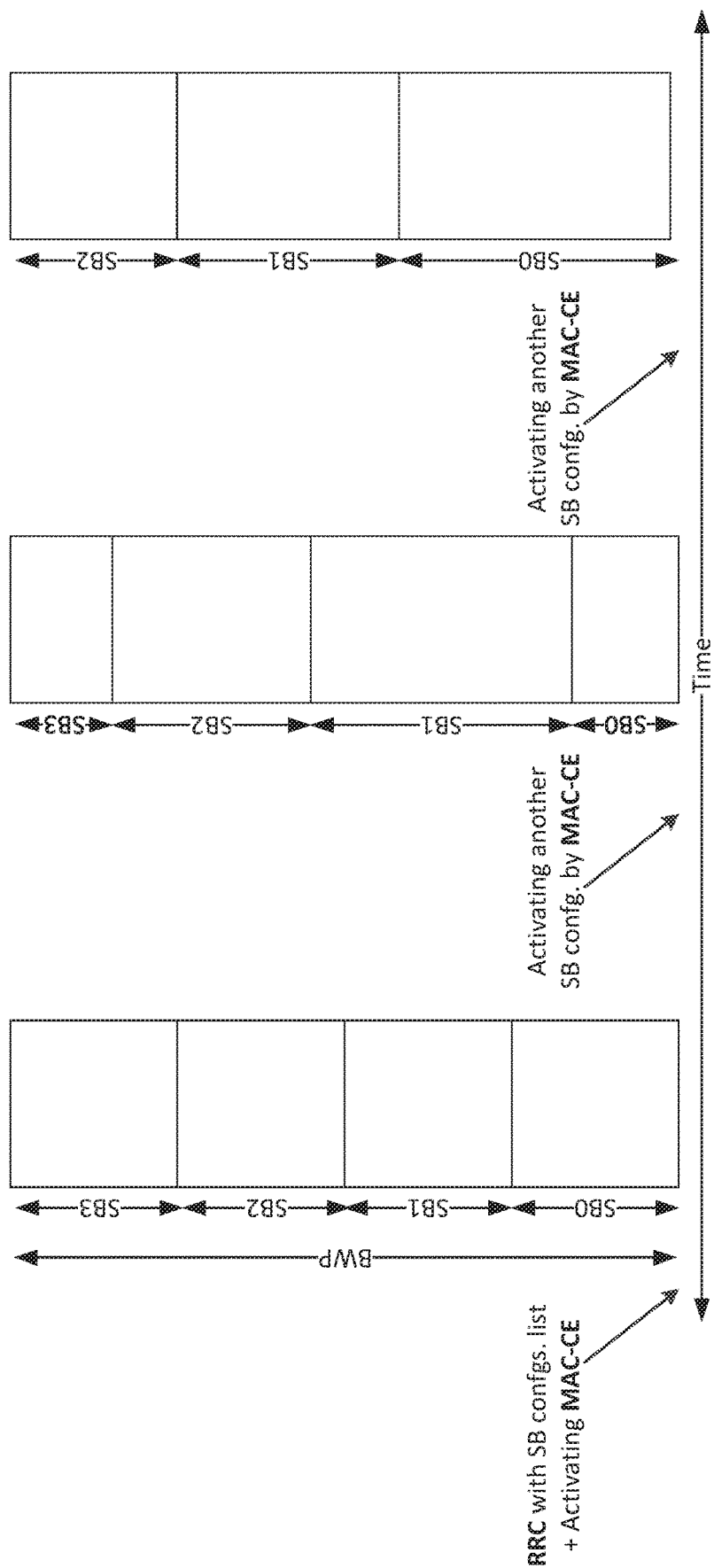
FIG. 5 shows an example of semi-statically constructing SBs using RRC+MAC-CE.

As another embodiment, UE may be configured by high layer, e.g., RRC message such as SB-ConfigLists, with multiple SBs configurations per BWP. For example, SB-ConfigLists may carry multiple SB-List-Id. Then medium access control-control element (MAC-CE) message may be deployed to semi-statically activate particular configuration by choosing the propitiate index in SB-ConfigLists. FIG. 5, for example, shows that UE receives high layer configurations of SBs to be activated by MAC-CE. Next, UE receives another activation MAC-CE changing the SBs from being of equal bandwidths to SBs with unequal bandwidths. Later, another MAC-CE chooses different SB configuration to divide the BWP into only three SBs instead of four SBs. Therefore, MAC-CE may be used to semi-statically add or remove SBs to the initial configured SBs.

Figure 6:
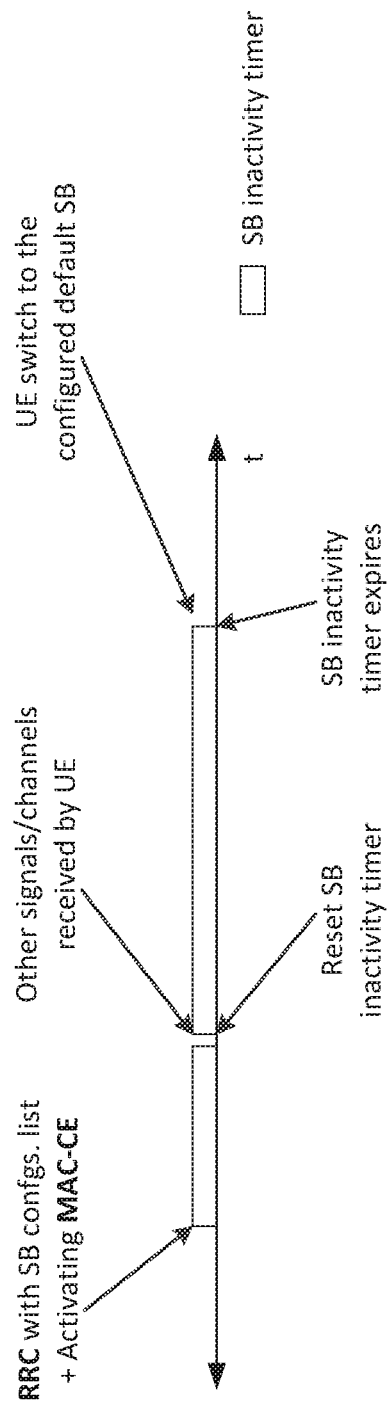
FIG. 6 shows an example of UE behavior when configured with SB inactivity timer.

Additionally, UE may be configured with default SB configurations. It may be SB configuration with lowest index in SB-ConfigLists, or configured separately by high layer signaling. UE may use the default SB configurations as a fall back state in the absence of activation MAC-CE or after the expiry of SB inactivity timer, configured by high layer parameter such as SB-InactivityTimer, for example. The SB inactivity timer may be reset upon reception of activation MAC-CE or any other signals or channels and it may be decrement when no signals or channels are received. Upon the of SB inactivity timer, the UE may assume that gNB switched to default SB configurations. For example, in FIG. 6, UE sets SB inactivity timer upon the reception of the activating MAC-CE. Later, UE receives other signals/channels or even other MAC-CE, then the UE reset SB inactivity timer. Upon receiving no signals/channels for a sufficiently long period of time until the expiry of SB inactivity timer, the UE may fall back to the default SB configurations.

LBT-Dependent Sub-Band Configurations:

In this category of solutions, the high layer parameter such as the aforementioned BWP_SB_Configs IE may provide the UE with so many configurations. Therefore, we herein propose to deploy the MAC-CE to select the subset of these configurations which may be identified by their Id in the parameter SB-Config-Id, for example.

Signaling the Sub-Band Configurations in NR-U

In this section, we herein propose several procedures to signal the sub-band configurations irrelevant to whether these configurations are for the solutions belonging to LBT-independent sub-band configurations or LBT-dependent sub-band configurations.

Broadcast Sub-Bands Configurations

The SB configurations through RRC or RRC+MAC-CE may be signaled in physical downlink shared channel (PDSCH) carrying the remaining system information (RMSI) scheduled by type0-PDCCH common search space with DCI format with CRC scrambled by system information-radio network temporary identifier (SI-RNTI). Also, SB configurations may be signaled in PDSCH carrying other system information (OSI) scheduled by type0A-PDCCH common search space with DCI format with CRC scrambled by SI-RNTI.

Unicast Sub-Bands Configurations

Alternatively, SB configurations may be signaled in PDSCH carrying either RRC or RRC+MAC-CE scheduled by a PDCCH in UE-specific search space with DCI format 1_0 or DCI format 1_1 scrambled by C_RNTI. For the SB configurations through RRC+MAC-CE, the RRC message may be scheduled by DCI in common-search space while the MAC-CE is scheduled with DCI in UE-specific-search space (dedicated UE message).

Figure 7:
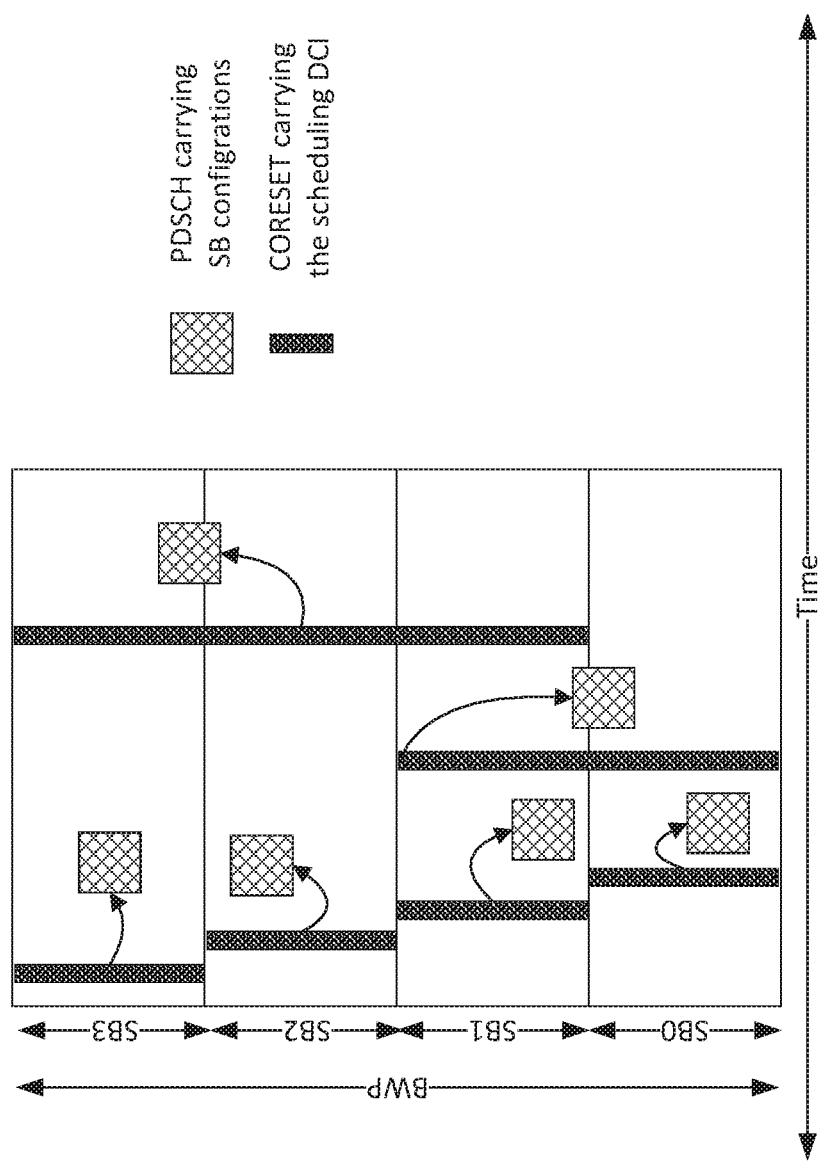
FIG. 7 shows an example of signaling sub-band (SB) configurations.

To increase the chance of acquiring the channel, the search space may composite of several control research sets (CORESETs) with different bandwidths as shown in FIG. 7. Narrow band CORESETs may be more suitable for less capable UEs while wide band CORESETs may be more suitable for PDCCH with high aggregation levels. The PDSCH carrying RRC or RRC+MAC-CE may be allocated in the same SB spanned by CORESET and in case that CORESET spans multiple SBs, then the associated PDSCH carrying RRC or RRC+MAC configurations may also span multiple SBs as illustrated in FIG. 7, for example.

To further enhance flexibility of channel access and mitigate uncertainty due to LBT, gNB may configure a set of SBs to a particular UE even if the CORESET spans one or multiple sub-bands that may belong to this set or not.

Indicating the LBT Outcome

LBT-Independent Sub-Band Configurations:

In NR-U, as a result of conducting listen before talk (LBT) before accessing the channel, some of the configured sub-bands may not be available and gNB cannot acquire those initially configured SBs. It is beneficial to dynamically indicate which sub-bands out of the originally configured sub-bands.

We herein propose to use DCI to indicate the SBs that gNB successfully acquires. To this end, one of the following alternation may be adopted.

Figure 8:
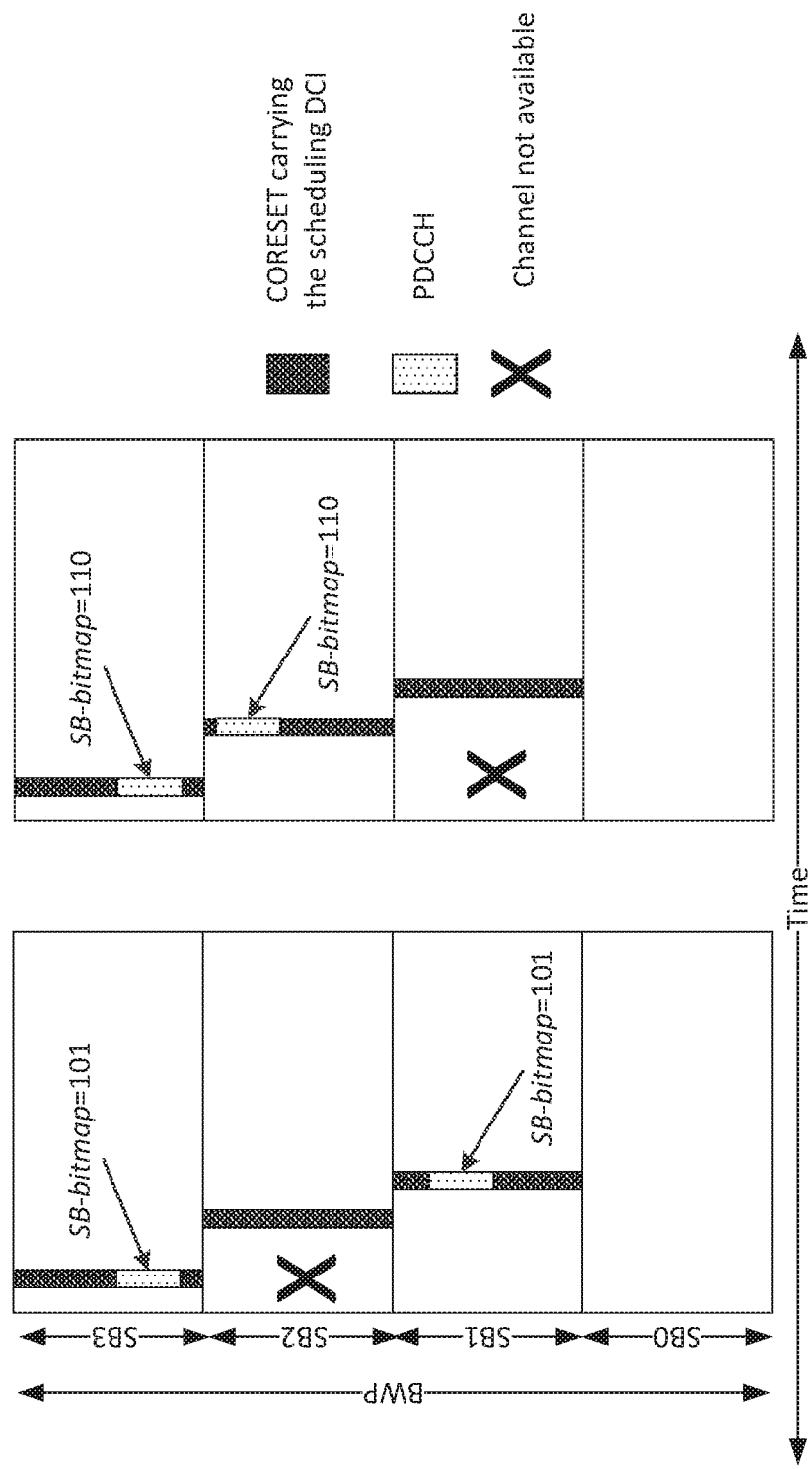
FIG. 8 shows an example of indicating the unavailable SB by signaling SB-bitmap through the other available SBs.

UE specific indication: DCI may be transmitted in a UE-specific search space using a UE specific RNTI such as cell-radio network temporary identifier (C-RNTI) with a bitmap field, called SB-bitmap field for example. The size of the SB-bitmap is equal to the number of configured SBs with the most significant bit corresponds to the highest SB index. For example, the UE may expect that SB is available when its corresponding is set to one. This DCI may be configured on each configured sub-band. For example, FIG. 8 shows that a UE configured with three sub-bands, SB1, SB2, and SB3. Moreover, UE is configured UE-specific search space in each SB to monitor DCI with CRC scrambled by C_RNTI to decode the SB-bitmap field. To enhance the robustness of the DCI, gNB may transmit the DCI across different SBs at different time instances. In the first transmission opportunity, SB-bitmap is equal to 101, while in the second transmission opportunity, SB-bitmap is equal to 110.

Moreover, to avoid variable DCI size, the size of SB-bitmap may set to fixed value such as the maximum number of sub-bands per BWP and its bits are mapped sub-bands' according a certain rule. For example, the most significant bit may correspond to the sub-band with the highest index and each next subsequent lower significance bit corresponds to sub-band with the next subsequent smaller index. The remaining bits that are unmapped to sub-band indices are set to zero.

Groupcast/broadcast UEs indications: If the same sub-bands are configured for multiple UEs, then gNB may indicate the available sub-bands to all UEs sharing the same configurations. To this end, we introduce sub-band indication-radio network temporary identifier (SBI-RNTI) which may be used to scramble the CRC of DCI transmitted in a common search space. This DCI will carry the SB-bitmap field indicating which SBs are available for transmission.

Either for UE-specific or group/broadcast indication, the DCI may be transmitted with configured periodicity to indicate any change in the available sub-bands. The DCI transmitted across different sub-bands may be shifted in time from one sub-band to another. For example, the DCI on the sub-band with the highest index may come first followed by DCI on sub-bands with lower indices as in FIG. 8 for example. To reduce the power consumption at the UE side, if UE successfully decodes one DCI in particular sub-band, UE may ignore the DCI transmitted from other sub-bands until the next monitoring occasion. The DCI transmission may be restricted to particular time location, for example, to occur at the beginning of the slot. The DCI may be transmitted periodically even if there is no change in the configured sub-bands' availability.

Some sub-bands may be configured as a default sub-band which may always carry the DCI indicating which sub-bands are available, e.g., SB-bitmap. For example, the sub-band with the smallest index may be the default sub-band. We also herein propose a high layer parameter such as Default_SB, RRC message which may be used to indicate to the default sub-band.

LBT-Dependent Sub-Band Configurations:

In this category of solutions, we herein propose to transmit DCI that indicates the sub-band configuration index, for example one of the indices in Table 2, from what configured by high layer parameter either RRC or RRC+MAC-CE. In other words, we herein propose RRC+DCI procedure in which RRC message provide multiple sub-bands configures and the DCI selects one of them. The other procedure is RRC+MAC-CE+DCI in which the RRC provides multiple sub-band configurations, then MAC-CE provides a subset out of these configurations followed by DCI which select a single configuration based on the LBT outcome. The DCI may have a bitmap to indicate which configuration is selected and its size may be fixed equal to the number maximum sub-band configurations, for example.

To this end, gNB may configure multiple CORESETs which gNB may use to send activation DCI. Those CORESETs may be contained in a single SB or across multiple sub-bands as shown in FIG. 9.

Figure 9:
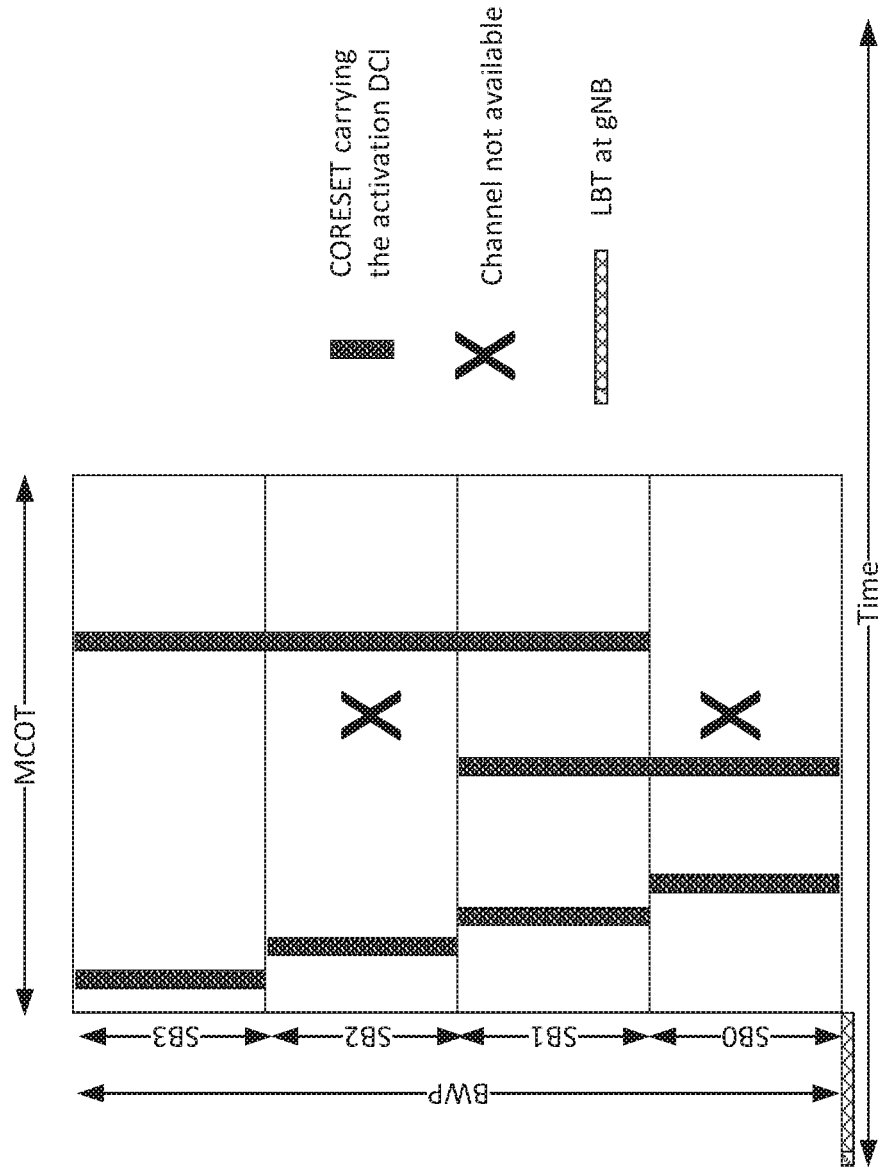
FIG. 9 Activation DCI to select one of the sub-bands configurations provided by RRC or RRC+MAC-CE.

In the example of FIG. 9, the activation DCI may be transmitted in UE-specific search space with its CRC scrambled by C-RNTI. Alternatively, the DCI may be transmitted in common search space or through group common PDCCH with a SB_act_radio network temporary identified (SB_act-RNTI).

Moreover, gNB may implicitly indicate that some sub-bands will not be used and hence the UE may avoid monitoring them. This may be accomplished by not configuring any CORESET in those sub-bands to be abandoned.

Some sub-bands may be configured as a default sub-band which may always carry the activation DCI. For example, the sub-band with the smallest index may be the default sub-band. We also herein propose a high layer parameter such as Default_SB, RRC message which may be used to indicate to the default sub-band.

In carrier aggregation mode, for both solutions categories, the activation/indication DCI may be transmitted in the licensed cell to indicate which sub-bands are active at any particular instance.

As another embodiment that may be used on the top of both solution categories, we herein propose that UE may assist gNB in determining which sub-bands gNB may acquire for downlink transmission. Such UE assistance may be quite useful in mitigating the hidden nodes issues. For time-division-duplexing (TDD), both DL and UL transmissions occupy the same frequency band. Therefore, if there are some UL sub-bands that UE is not able to acquire them due to LBT failure, then gNB may not acquire those sub-bands even if they are available from gNB perspective and UE only monitor available sub-bands from its perspective. UE may indicate the available sub-bands in several ways. For example, if handshake-like procedures are supported, then UE may explicitly indicate the preferred sub-bands in its response. Moreover, the UE may implicitly indicate the preferred DL sub-band by doing UL transmission on this band. For example, gNB may configure or schedule the UE with multiple UL resources across different sub-bands. Then the UE may choose to conduct the transmission on the UL sub-bands associated with the preferred DL sub-bands. These resources may be for different purposes such as sounding reference signal (SRS), physical uplink channel (PUSCH), physical uplink control channel (PUCCH), preamble for random access channel (RACH).

In frequency-division-duplexing (FDD), both DL and UL transmissions occupy different frequency bands. In this case, the UE may conduct LBT on the DL sub-bands and indicate those sub-band by UL transmission. If the channel for UL transmission is available, then it may be used to indicate the indices of the preferred DL sub-bands. Also, hand-shake-like procedures, if supported, may be useful to carry such information. Also, some association between UL sub-bands and DL sub-bands may be defined such that when UE performs UL transmission on any particular UL sub-band, gNB may figure out which DL sub-band is preferred.

UE-Assisted Sub-Bands Switching

Due to hidden nodes issues, the BWP(s)/sub-band(s) selected by gNB for DL transmission may not always be available at UE side for receiving this DL and vice versa for BWP(s)/sub-band(s) selected by UE for UL transmission as they may not be available at gNB side for receiving the UL transmission. Procedures are needed to avoid selecting BWP(s)/sub-band(s) that are not available at UE side for DL transmissions and at gNB for UL transmissions.

Figure 18:
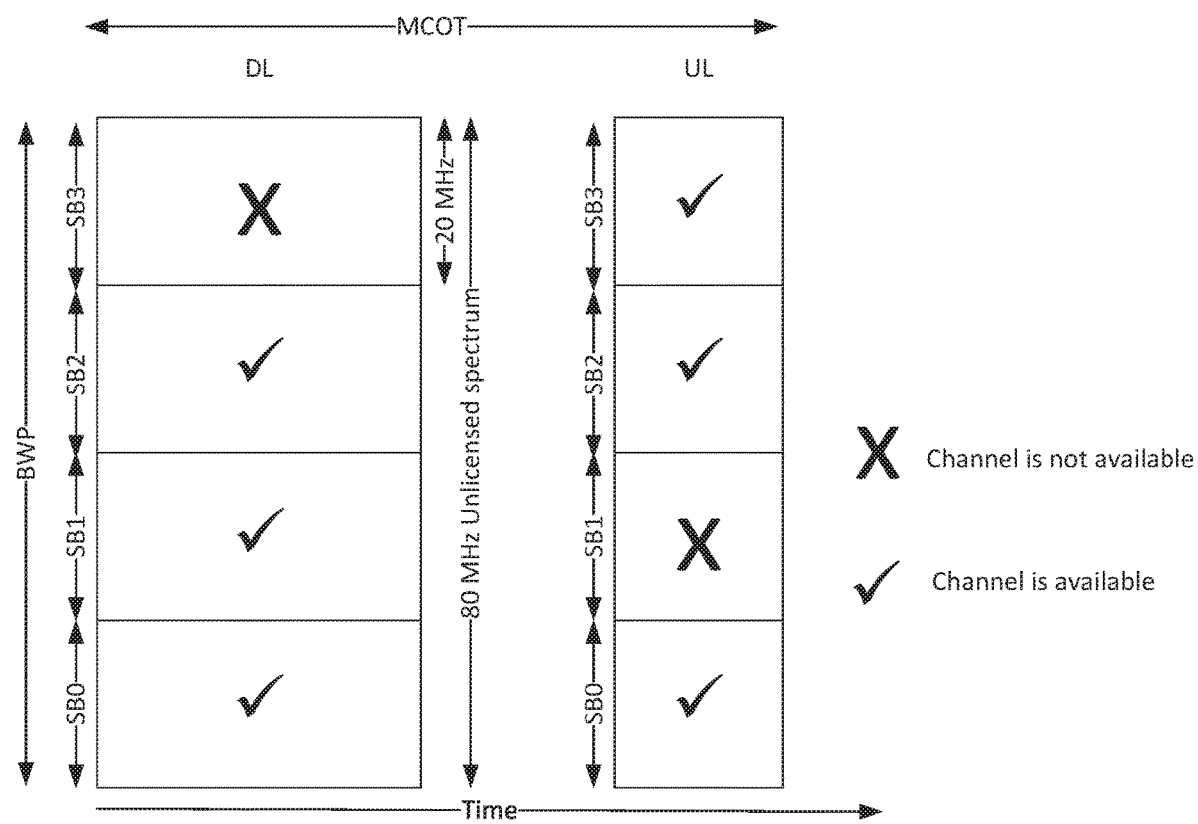
FIG. 18 is a time and spectrum diagram of an example in TDD where the gNB and UE may operate on the sub-bands that are available for at both gNB and UE sides.

To cope with this challenge, we herein propose that UE may assist gNB in selecting the sub-bands/BWPs that do not experience any hidden nodes issues. FIG. 18 is a time and spectrum diagram of an example in TDD where the gNB and UE may operate on the sub-bands that are available for at both gNB and UE sides. In the example of FIG. 18, though some DL sub-bands are available at gNB side, UE may not able to receive on all of them. In particular, FIG. 18 shows that the available DL sub-bands at gNB side are SB0, SB1, and SB2 while the available sub-bands for UL at UE side are SB0, SB2, and SB3. Since in TDD operation mode the same frequency bands are used for both DL and UL, then any successful transmission and reception, the selected sub-bands have to be available from gNB and UE perspectives simultaneously.

In our example, though DL SB1 is available from gNB side, this sub-band may not be used for DL because SB1 is not available for UL transmission which implies the presence of hidden nodes around the UE that cannot be detected by gNB. Similarly, though UL SB3 is available at UE side, this sub-band may not be used because SB3 is not available for UL because SB3 is not available for DL transmission which implies the presence of hidden nodes around the gNB that cannot be detected by UE.

Such UE assistance may not only be useful to avoid hidden nodes surrounding UE, but it may also be used by gNB to provide the UE with UL resources on the available sub-bands indicated by the UE.

Figure 19:
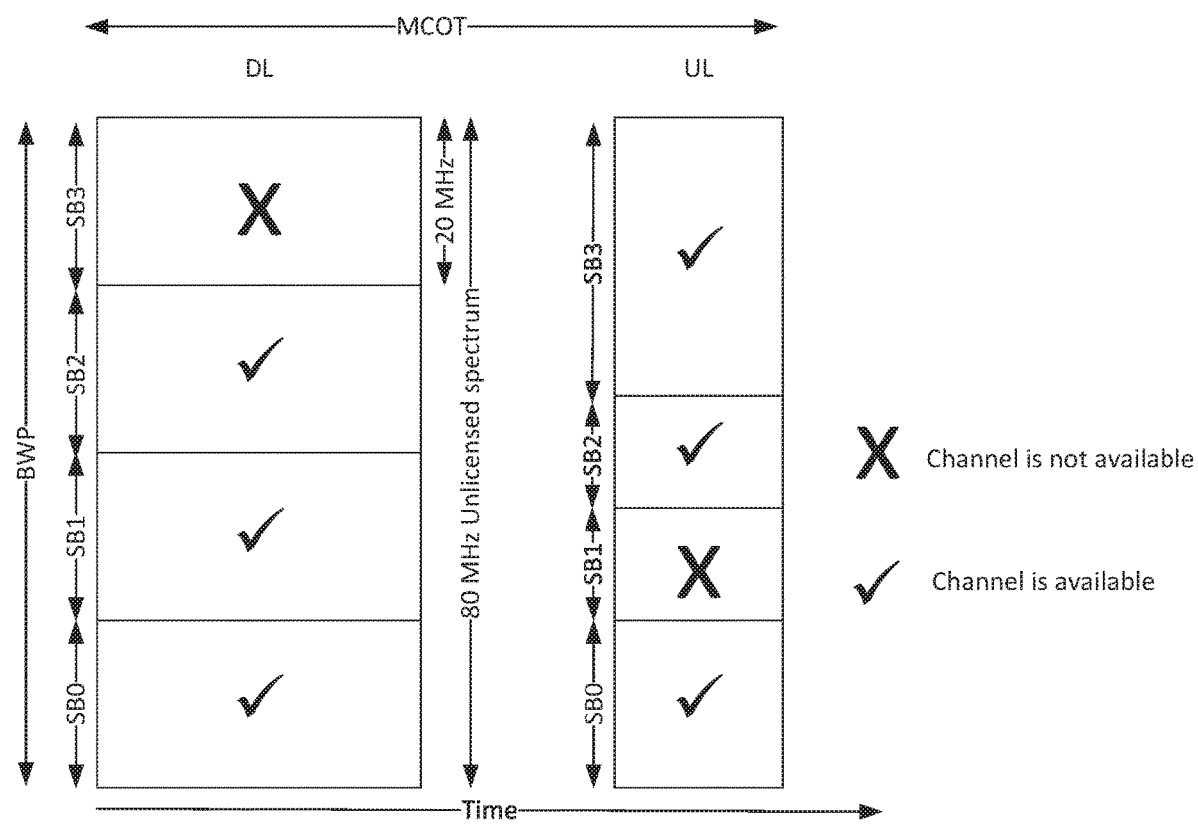
FIG. 19 is a time and spectrum diagram of an example in TDD where the gNB and the UE may operate on DL sub-bands and UL sub-bands that correspond to single or multiple available sub-bands at both gNB and UE sides.

If the DL BWP and UL BWP consist of different number of sub-bands or the same number of sub-bands with different bandwidths, then DL sub-band or UL sub-band may only be selected if it overlaps with available UL sub-bands or DL sub-bands, respectively. FIG. 19 is a time and spectrum diagram of an example in TDD where the gNB and the UE may operate on DL sub-bands and UL sub-bands that correspond to single or multiple available sub-bands at both gNB and UE sides. In the example of FIG. 19, though DL SB1 is available at gNB side, it may not be used because it overlaps with two UL sub-bands and one of them is not available at UE side, SB1. Similarly, UL SB3 may not be used because it overlaps with the unavailable DL SB3 at gNB. Moreover, in TDD case, the number of DL sub-bands and UL sub-bands may be different and each DL sub-band may be associated with multiple UL sub-bands or vice-versa. Moreover, since the DL BWP and UL BWP may have different bandwidths and consequently the associated DL sub-bands and UL bands may not even be overlapped. In this case, we herein propose to adopt explicit indication of the available DL sub-bands at the UE side and the procedures proposed for FDD case may be deployed as well.

Figure 20:
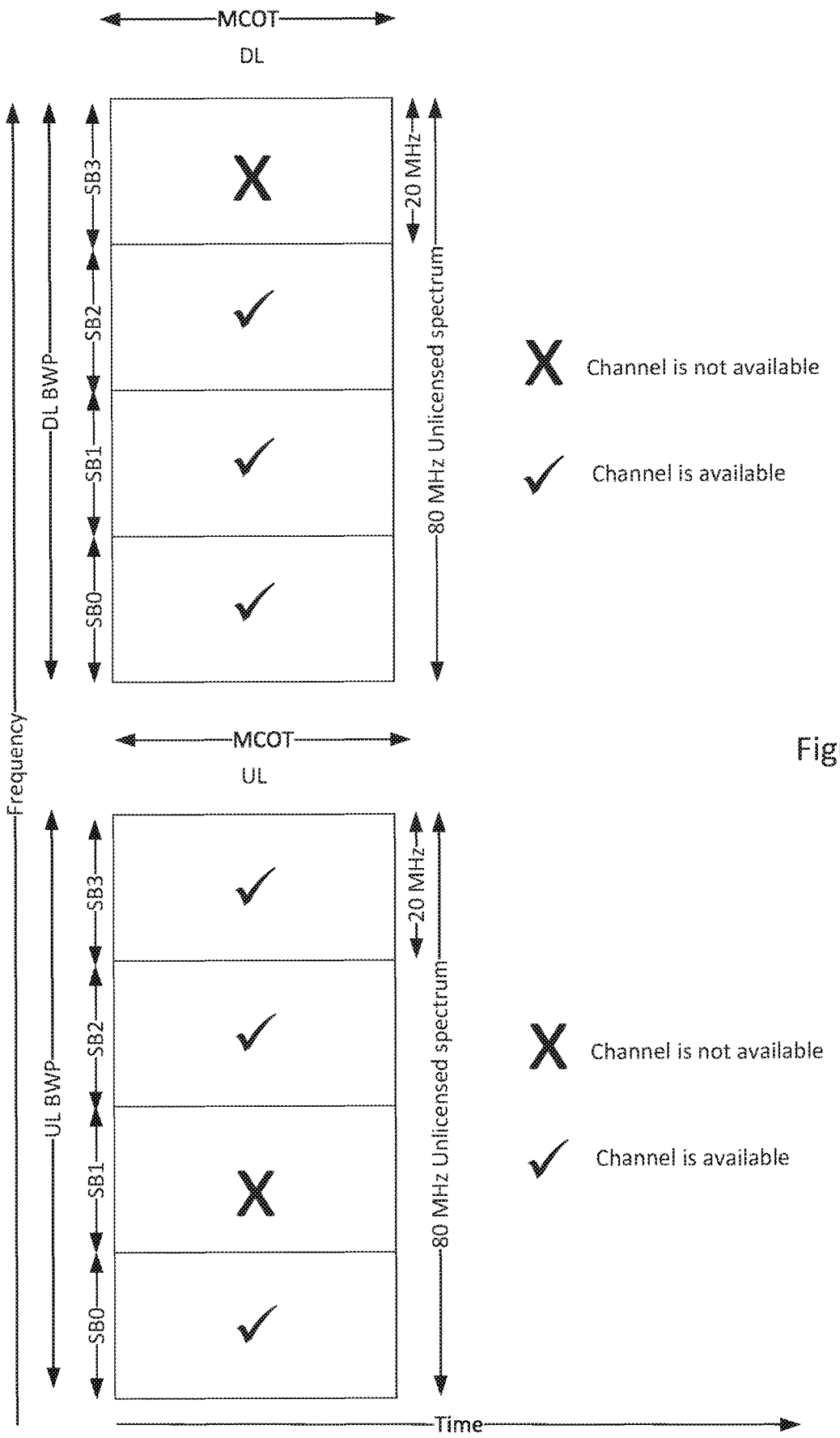
FIG. 20 is a time and spectrum diagram of an example in FDD where the DL sub-bands and UL sub-bands occupy different frequency bands.

In FDD operation, the transmission and reception occur at different frequency bands consequently the availably or unavailability of particular sub-band in DL or UL does not necessary mean that associated UL or DL sub-band is available or not. Therefore, the UE may explicitly indicate the DL sub-bands that do not suffer from hidden nodes in addition to the available UL sub-bands. FIG. 20 illustrates an example of an FDD scenario with four DL and UL sub-bands. In FDD, DL sub-bands and UL sub-bands occupy different frequency bands. The availability of UL sub-band does not necessary mean that associated DL sub-band has no hidden nodes, e.g., available at UE side, and explicit indication is needed. Contrary to TDD case, though UL SB1 is not available for UL transmission at UE side, it is not necessary meaning that DL SB1 suffers from hidden issues because UL SB1 and DL SB1 occupy different frequency bands. Moreover, for FDD, the number of DL sub-bands and UL sub-bands may not to be equal. In this case, a single DL sub-band may be associated with multiple UL sub-bands, or vice versa. That's why we herein propose the UE shall indicate the available DL sub-bands at UE side explicitly. Procedures for UE Assisted Sub-Band/BWP Switching The MCOT duration may be divided into two parts (not necessary to be equal). We call the first part as assistance window which is mainly used to, but not limited to, exchange information about the available DL and UL sub-bands/BWPs at gNB and UE sides. Then, gNB may use this information to adjust the DL sub-bands/BWPs and schedule the UL transmission on the available UL sub-bands/BWPs. The second portion of the MCOT, labeled as DL/UL transmission window for example, may be utilized for the actual DL and UL transmission consisting of data, signals or control. The DL/UL transmission window may contain single or multiple DL-UL switching point. Moreover, the assistance window may be at the beginning of MCOT or it may be repeated several times in case sub-band/BWP switching in the middle of the MCOT for example.

Figure 21:
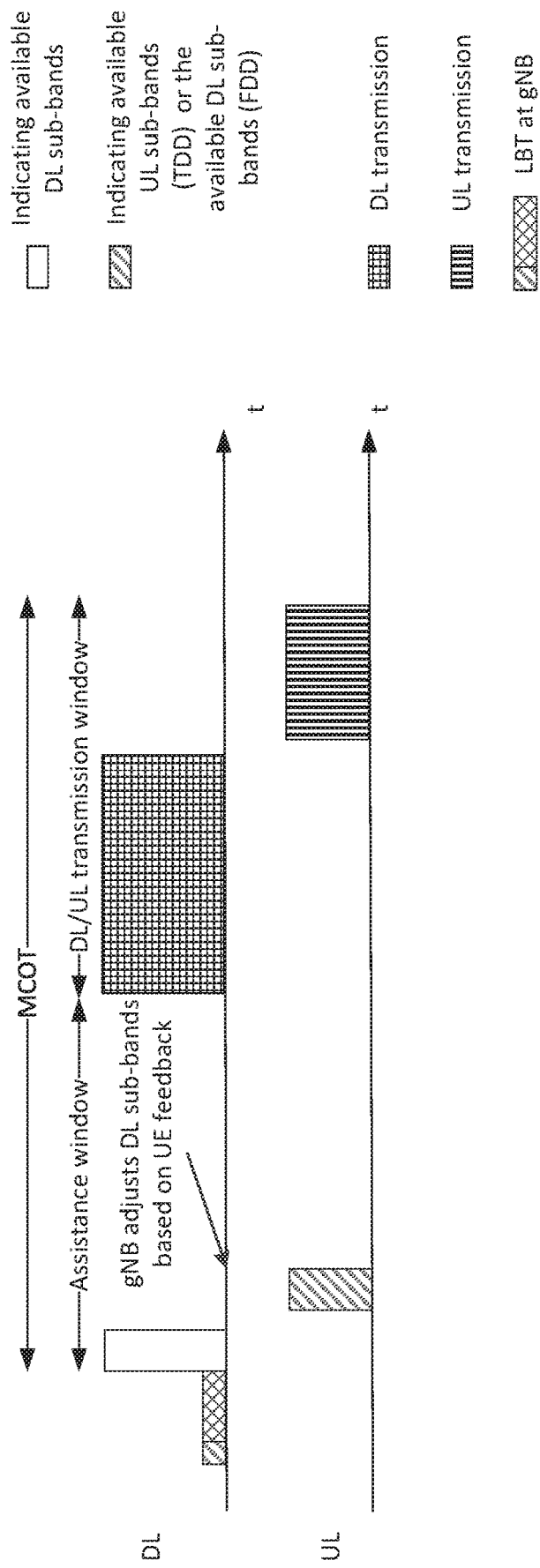
FIG. 21 is a timing diagram illustrating an example of UE assisted sub-band switching.

In FIG. 21 shows an example of UE assisted sub-band switching procedure in which gNB senses and provides the UE with a list of possible DL sub-bands available at gNB. UE assesses those DL sub-bands and senses for any hidden nodes. Then UE signals the available sub-bands at UE side. In FDD, this may be accomplished by explicitly indicating the DL sub-bands that can be used to receive DL transmission at UE. In TDD, the UE may signal the available UL sub-bands at UE side and gNB may choose the DL sub-bands that overlap with available UL sub-bands at UE side. A similar procedure may be used for the BWP switching.

Figure 22A:
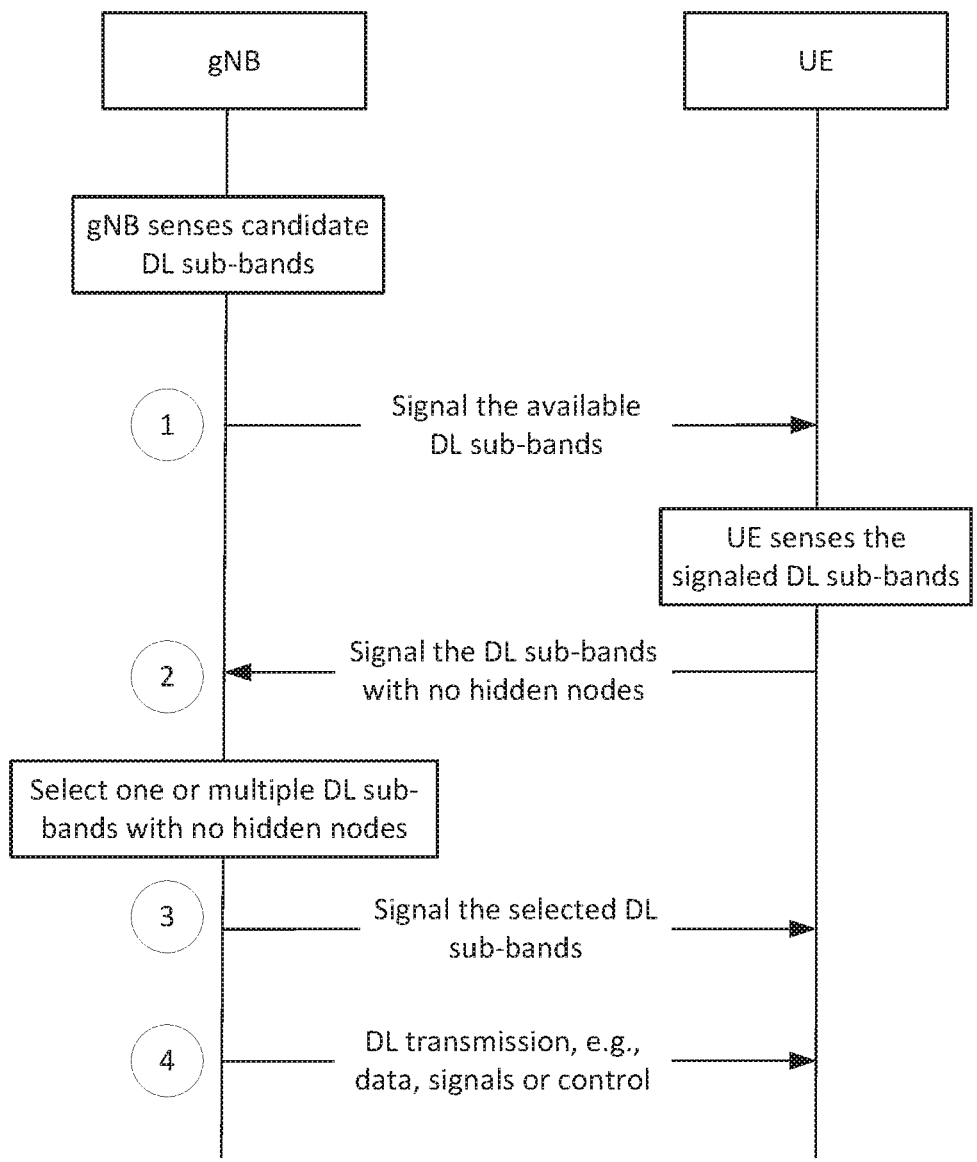
FIGS. 22A and 22B is a call flow diagram of example procedures for the signaling of UE assisted sub-bands switching.
Figure 22B:
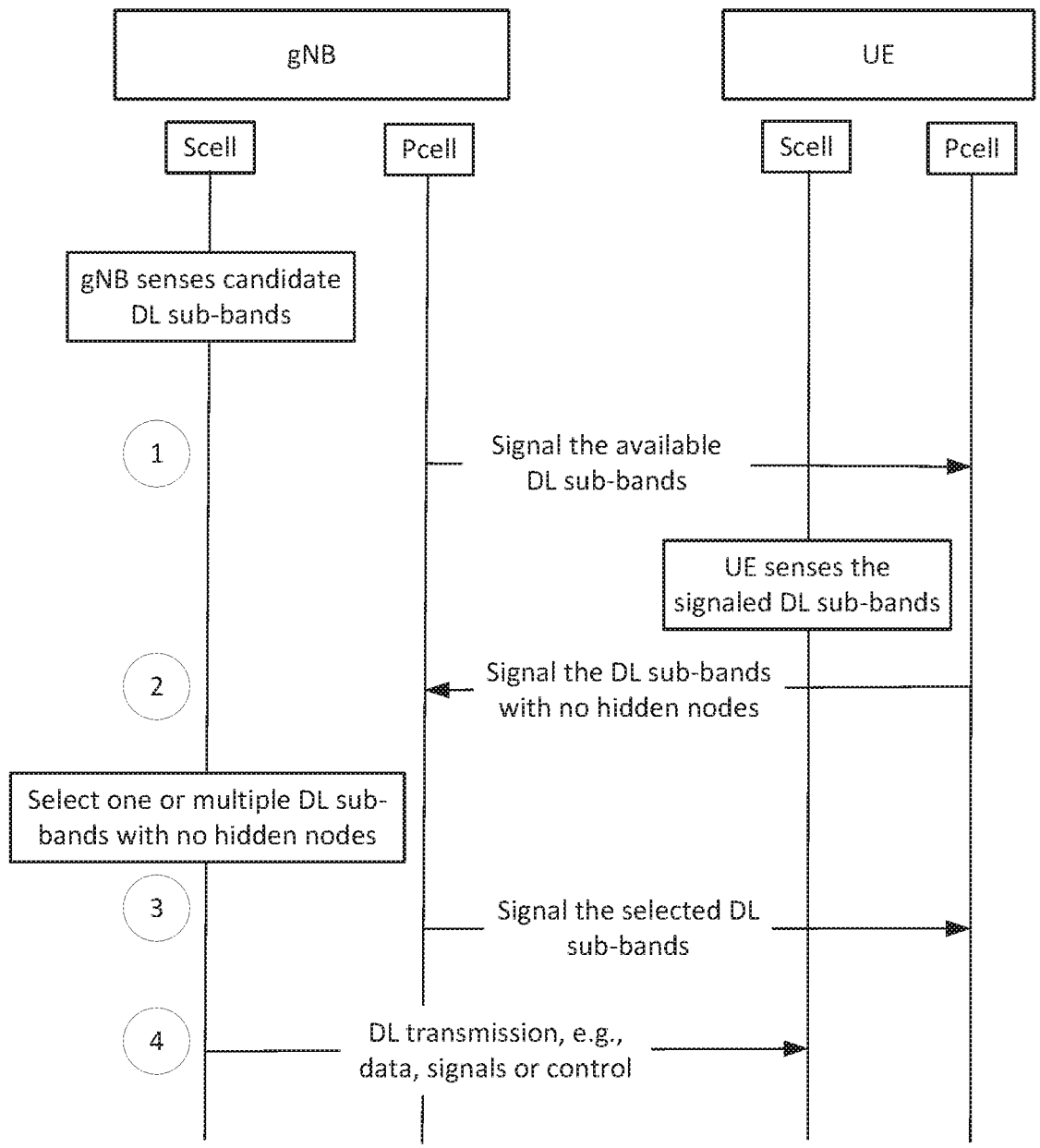

FIG. 22A shows a high level procedure of UE assisted sub-band switching procedure in which the signaling occur on the same unlicensed cell which appropriate for dual connectivity (DC) and stand-alone (SA) NR-U. Alternatively, in carry aggregation (CA) mode, the signaling may occur in the Pcell as shown in FIG. 22B. There are four main steps.

First is to signal the available DL sub-bands. This signal may carry the available DL sub-bands at gNB side which are associate with successful LBT.

Second is to signal the DL sub-bands with no hidden nodes. Before transmitting this signal, the UE may assess the channel on the DL sub-bands indicated in the previous signal to determine whether UE can receive on those sub-bands. Similarly, some of them may not be available due to the presence of hidden nodes that cannot be detected by gNB. Then UE may indicate the available DL sub-bands at UE side to the gNB.

Third is to signal the selected DL sub-bands. This signal may be used to indicate which sub-bands will be selected and it may be optional with predefined rules that gNB may use to select the DL gNB to avoid any ambiguity between UE and gNB.

Fourth, the gNB may start DL transmission either data, control or signals. Moreover, gNB may include single or multiple switch point within the MCOT.

A similar procedure to the aforementioned one may be adopted as a high level procedure of UE assisted BWP switching procedure.

For the case that UE is configured with multiple BWPs and only a single BWP is activated at any particular time if the whole DL BWP is available, we herein propose that UE may assist gNB in determining the presence of any hidden nodes on this DL BWP. For TDD case in which the paired DL BWP ($i_{DL}$) and UL BWP ($i_{UL}$) occupy the same frequency band, once the gNB signal the availability of the $i_{DL}$ th DL BWP then the UE may sense this DL BWP and transmit a signal to indicate its availability when no hidden nodes occupy this BWP. The UE indication may be transmitted on the $i_{UL}$ UL BWP paired with the $i_{DL}$ th DL BWP in the Scell. Moreover, the UE may transmit this indication on any other UL BWP (not paired with the $i_{DL}$ th DL BWP) either on the Scell or Pcell which can be configurable by gNB. In the absence of such configurations, some UL BWP with predefined rules/orders may be used to determine the UL BWP such as the initial or the default UL BWP in the Scell or the PCell for example. For the FDD case in which the paired DL BWP $i_{DL}$ and UL BWP $i_{UL}$ occupy different frequency bands, the DL BWP may be available with no hidden nodes, even if the paired UL BWP is not available. Therefore, we herein propose that when gNB indicates the availability of particular DL BWP, gNB may indicate single or multiple UL BWPs that the UE may use to indicate whether the DL BWP has hidden nodes or not. The UE may attempt to transmit the indication on UL BWP (if it is passed the LBT) paired with DL BWP or additional UL BWPs such as initial UL BWP or default UL BWP in the Scell or the Pcell. Moreover, the UE may follow a particular rule/order to choose the UL BWP. For example, the UE may attempt to use the UL BWP $i_{UL}$ paired with DL BWP $i_{DL}$, then the UE may to attempt to transmit the indication on the default UL BWP if it is available followed by the initial UL BWP for example.

For the case that UE is configured with multiple DL BWPs and multiple of those DL BWPs are activated at one time, then the aforementioned procedures may be adopted if each activated DL BWP is paired with a single UL BWP which is one-to-one pairing. If the pairing between DL and UL BWP is more like many-to-one relationship, e.g., multiple activated DL BWPs are paired with a single UL BWP, then the aforementioned procedure may still be used, but the UE may indicate additional information on which DL BWP has no hidden nodes, for example the UE may provide the DL BWP ID.

In the next sections, we propose several possible alternatives for the aforementioned signals.

Signaling the Available DL Sub-Bands/BWPs

If the available DL sub-bands dynamically vary from MCOT to another, dynamic PHY indications may be adopted. While for semi-static or static channels in which the available sub-bands remain available for long time, higher layer indications may be deployed.

Channel Acquisition Request

Figure 23:
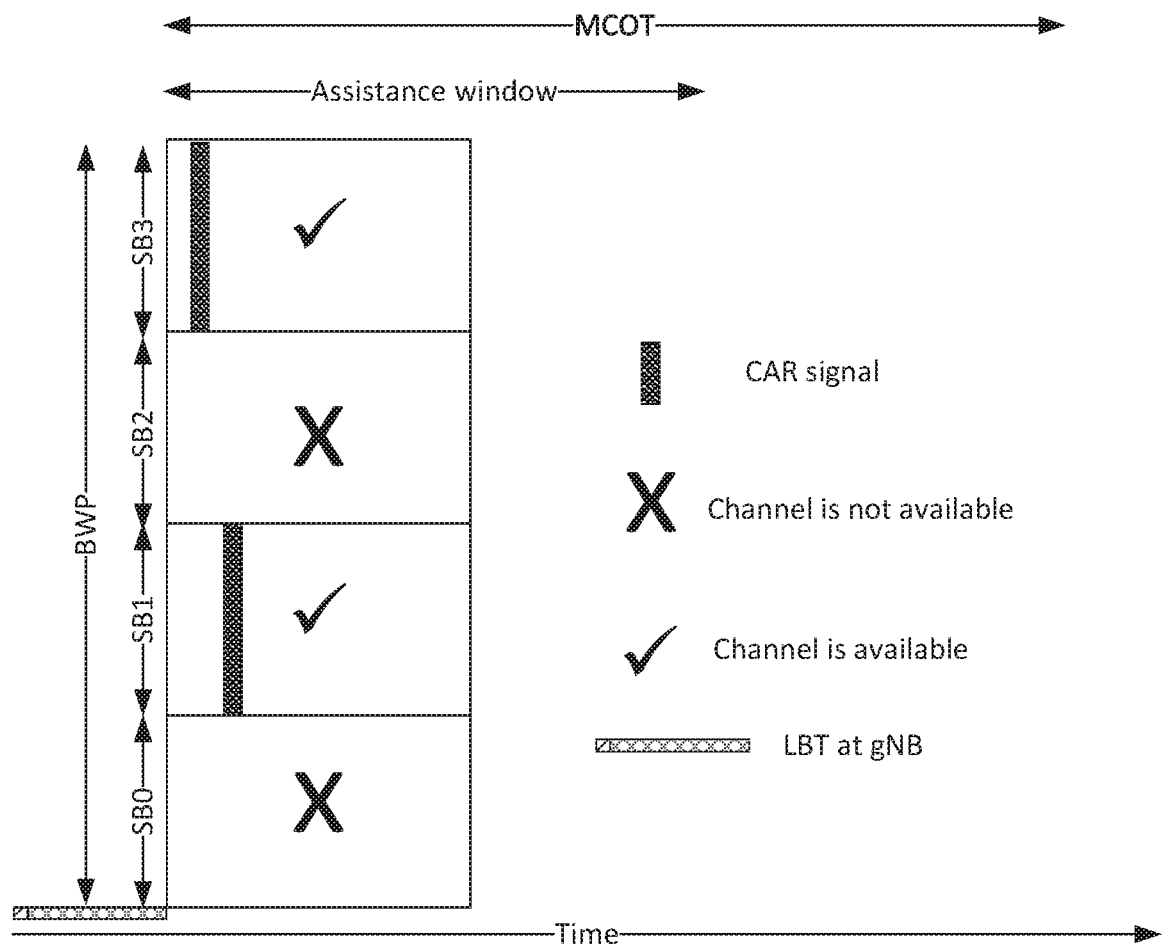
FIG. 23 is a time and spectrum diagram of an example channel acquisition request.

We herein propose that gNB may transmit channel acquisition request (CAR) to indicate which sub-bands at gNB. The CAR signal may be transmitted on each available DL sub-band to indicate that the sub-band which carries the CAR signal is available at gNB to keep the CAR small as shown in FIG. 23, for example.

Alternatively, the CAR signal may be transmitted on only one available sub-band at gNB with a bitmap field, labeled as Avai_SBs for example, and each bit represents the availability of one sub-band. The most significant bit may correspond to the sub-band with the highest ID and each next subsequent lower significance bit corresponds to the next sub-band ID. The size of Avai_SBs may be equal to the maximum number of DL sub-bands per DL BWP.

As another embodiment, the CAR signal may be transmitted on the Pcell for CA mode. In this case, we herein propose additional parameter or field to indicate the Scell ID that contains the DL sub-bands which may be called as ScellID for example. If the UE is configured with multiple unlicensed Scell, such parameter may allow the gNB to indicate to which Scell, the available DL sub-bands belong to. The parameter or field ScellID may be of size $\log_2$ (maximum number of configurable Scell to the UE).

The CAR signal may be carried in DCI transmitted on UE specific search space scrambled with C-RNTI or in common search space with DCI format scrambled with pre-defined RNTI such as CAR-RNTI for example. Using common search space is beneficial as gNB may broadcast the available sub-bands for multiple UEs simultaneously. The CORESET carrying the PDCCH may be configured to within each sub-bands or spanning multiple sub-bands. Moreover, the DCI may provide the UE with UL grants for transmitting the feedback from the UE. Different UEs may derive the UL grants based on pre-defined rules. For example, the UE may apply particular time and frequency shift with respect the received DCI and function of the UE ID to reduce the collision chances. Moreover, if the UE configured with multiple grant free UL resources, then the UE may derive which grant free UL resource ID the UE may use to transmit the feedback.

To reduce the overhead of signaling the available DL sub-bands/BWPs at gNB and collecting the different UEs assessment of the presence of the hidden nodes, we herein propose that gNB may group the UEs based on source signal used to indicate the spatial QCL of the signal/channel indicating the available DL sub-bands/BWPs at gNB. If the UEs belong to the same group, then those UEs are on the same beam and suffering from the same hidden nodes if any. In this case, getting the feedback from one UE is enough for gNB to decide which DL sub-bands/BWPs to use. Other ways to group the UE may be adopted as well. To this end, we herein propose that the signal/channel indicating the available DL to be UE dedicated, e.g., transmitted on UE-specific search space.

For the case that UE is configured with multiple BWPs and only a single BWP is activated at any particular time if the whole DL BWP is available, we herein propose that the CAR signal may be transmitted on the activated BWP on the Scell for DC and SA NR-U. Alternatively, the CAR signal may be transmitted on Pcell carrying the ID of activated BWP which is beneficial for CA case. As one possibility, gNB may transmit a bitmap to indicate which DL BWP is available at gNB and the size of the bitmap may be equal to the number of configured BWP. For the case that only one active DL BWP, the UE does not expect more than a single bit is set to one.

For the case that UE is configured with multiple DL BWPs and multiple of those DL BWPs are activated at one time, the CAR signal may be transmitted on one BWP with a bitmap indicating the available DL BWP at gNB. In this case, the UE may expect that more than a single bit are set to one. The BWP that carry the CAR signal may be among the DL BWPs that UE has to verify the presence of hidden nodes. It may be a different BWP, for example the initial or default BWP in the Pcell, for example. Alternatively, the CAR signal may be transmitted on each DL BWP the gNB intend to acquire.

Implicit Indication of the Available DL Sub-Bands

We also herein propose that gNB may implicitly indicate the available DL sub-bands at gNB by transmitting signals with low decoding complexity, for example low-complexity correlator is needed to detect this signal. Such signal may be PSS, SSS, preamble, etc., that the UE may use it to infer the availability of the sub-band that carrying this signal which we label it as sequence-based signal.

Instead of transmitting signals with low decoding complexity on each available sub-bands, the sequence-based signal may indicate to bitmap to the available DL sub-band at gNB. For example, the initialization value of sequence-based signal may be mapped to particular code point in the bitmap.

For the case that UE is configured with multiple BWPs and only a single or multiple BWPs are activated at any particular time if the whole DL BWP(s) is available, we also herein propose that a sequence-based signal may be used to indicate the DL BWPs that gNB attempting to acquire. The sequence-based signal may be similar to the sequence-based signal used to indicate the available DL sub-band.

Signaling the DL Sub-Bands/BWPs with No Hidden Nodes

In this section, we propose several procedures to allow the UE to indicate preferred DL sub-bands/BWPs that do not suffer from any hidden nodes, e.g., DL sub-bands available at UE side. In TDD case, the UE may indicate the available UL sub-bands/BWPs at UE side and then gNB may infer the DL sub-bands/BWPs with no hidden nodes. For the FDD, the UE may explicitly indicate available DL sub-bands/BWPs at UE side.

Figure 24:
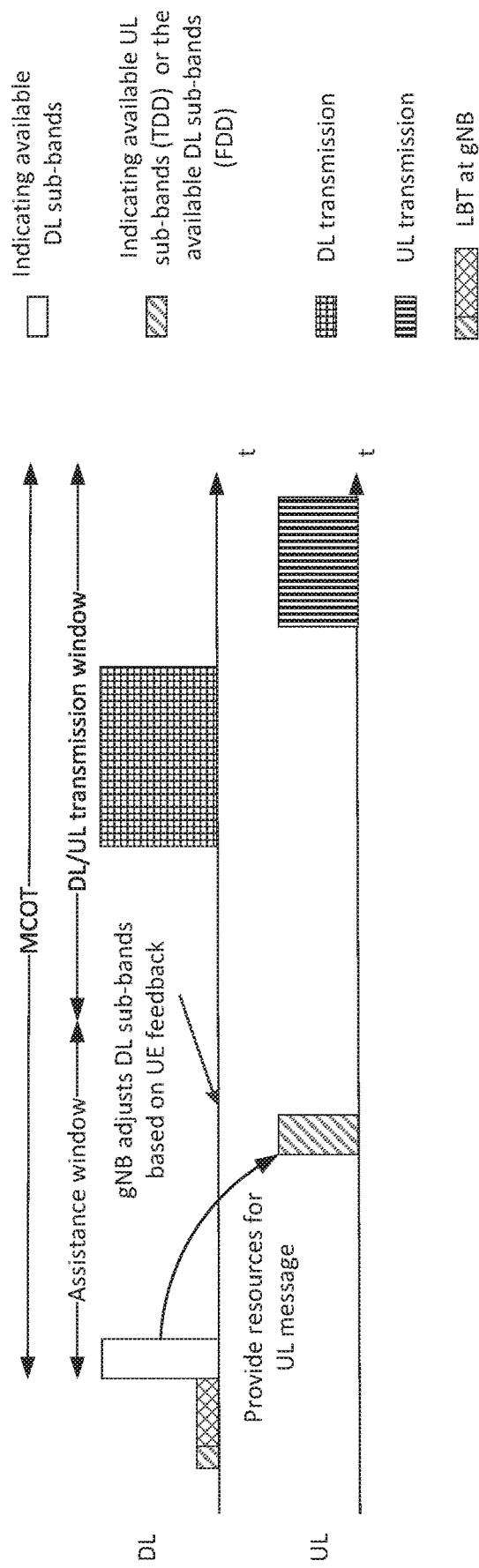
FIG. 24 is a timing diagram illustrating an example of a gNB indicating available DL sub-bands in addition to providing a UL resource.

As one embodiment, we herein propose that gNB may not only signal the available DL sub-bands/BWP(s) at gNB side, but this signal may also provide the UL resources that UE may use to transmit the indication to DL sub-bands/BWP(s) with no hidden nodes, e.g., the DL sub-bands/BWP(s) available at UE side. For example, if gNB uses DCI to indicate the available DL sub-bands/BWP(s) at gNB, then gNB may use this DCI to provide UL resources for PUCCH or PUSCH as in FIG. 24 for example. If the available DL sub-bands/BWP(s) are indicated by signals that cannot provide UL resources such as sequence-based signal for example, then the UE may use configured grant to transmit. Also, when gNB uses DCI to indicate the available DL sub-bands/BWP(s) at gNB, it may activate configured grant which provides the UE with multiple UL occasions that the UE may use to cope with UL channel unavailability. Moreover, we herein propose that the configured grant may be activated after pre-defined duration (without activating DCI) from the instance of receiving the indication of the available DL sub-bands/BWP(s) at gNB.

Either on PUCCH or PUSCH, the UE may transmit a bitmap indicating the available DL sub-bands/BWP(s) with no hidden nodes, e.g., DL sub-bands/BWP(s) available at UE side. The most significant bit may correspond to the sub-band/BWP with the highest ID and each next subsequent lower significance bit corresponds to the next sub-band ID. The size of the bitmap may be equal to the maximum number of DL sub-bands per DL BWP or the maximum number of DL BWP per component carrier (CC). Moreover, if a separate PUCCH or PUSCH is used to indicate the availability of each DL sub-band/BWP, then one bit may be enough to indicate if the DL sub-band has any hidden nodes, e.g., DL sub-bands/BWP(s) are unavailable at UE side or not.

If the PUCCH/PUSCH are scheduled or configured on the Pcell, for power saving, the UE may discard transmitting the indication of the hidden nodes if those PUCCH/PUSCH resources are associated with DL sub-bands/BWPs with hidden nodes, e.g., DL sub-bands/BWP(s) are unavailable at UE side.

Alternatively, if gNB uses DCI to indicate the available DL sub-bands/BWPs at gNB, it may also initiate PRACH transmission, e.g., PDCCH order. Different sub-bands/BWPs may be associated with different PRACH resources either different time-frequency resources or different preambles. To this end, we herein propose this associated to be configured through high layer parameter, e.g., RRC IE, such as rach-ConfigSBs for example, to configure contention free random access occasions for sub-bands/BWPs selection, which may include (but not limited to) the time-and-frequency resources and preamble for the RACH transmission.

This RRC parameter may be transmitted as part of the sub-bands/BWPs configurations. A one-to-one mapping procedure or a one-to-many mapping procedure may be used.

Figure 25:
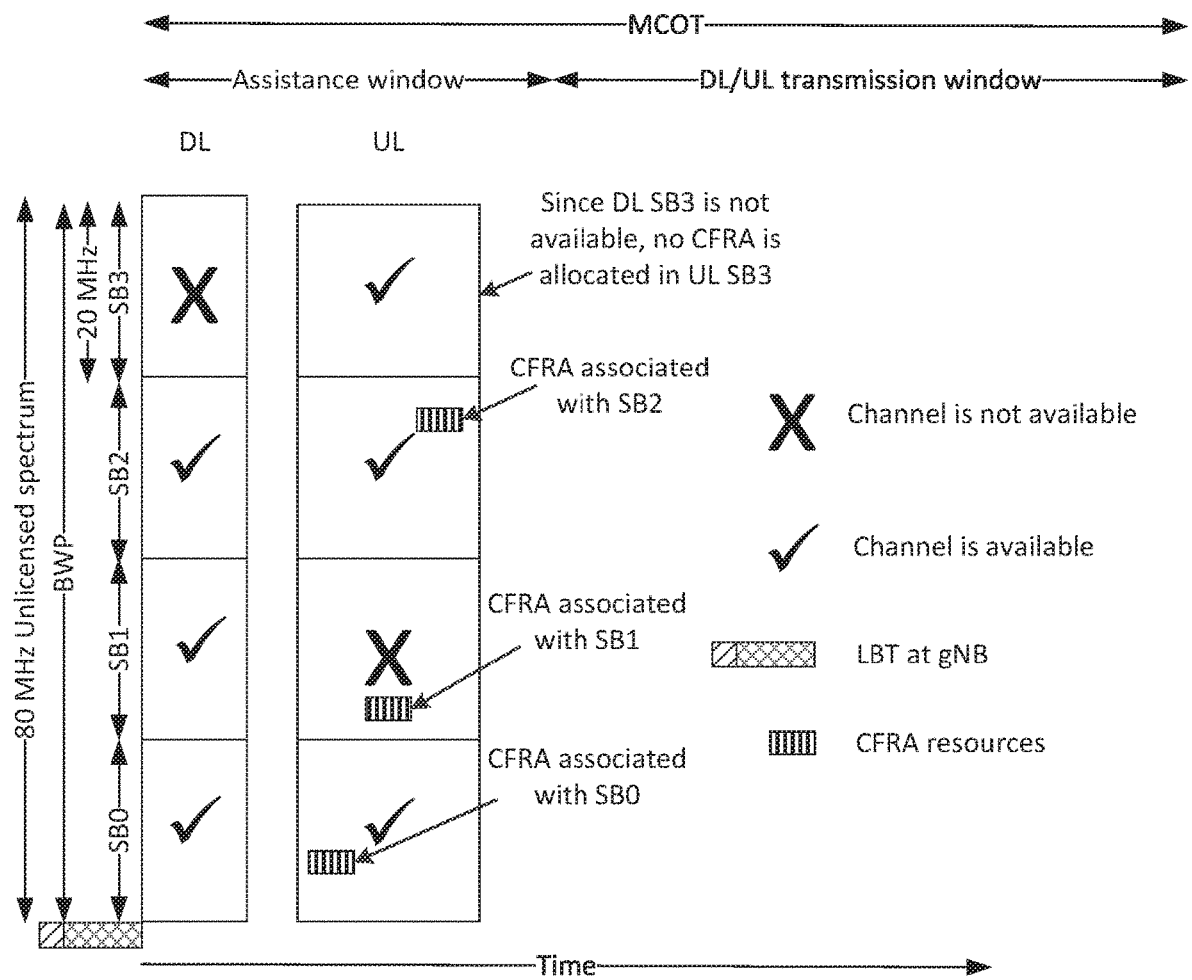
FIG. 25 is a time and spectrum diagram of an example one-to-one CFRA transmission to indicate the availability of a DL sub-band.

For a one-to-one mapping procedure, the UE may transmit PRACH preamble on the associated resources for each DL sub-bands with no hidden nodes, e.g., DL sub-bands is available at UE side. In FIG. 25, we illustrate an example of four DL sub-bands and their associated UL sub-bands. For each available DL sub-band, gNB may initiate RACH transmission on the associated UL sub-band. The UE may transmit RACH preamble only if the DL sub-band do not suffer from hidden nodes, e.g., DL sub-bands is available at UE side, which may be applicable in TDD and FDD cases.

FIG. 25 illustrates an example of the use of a one-to-one CFRA transmission to indicate the availability of DL sub-band in TDD case. In the example of FIG. 25, gNB cannot initiate contention-free RACH (CFRA) on UL SB3 which is associated with unavailable DL SB3. Also, the gNB may initiate CFRA on UL SB1 which is associated with available DL SB1 at gNB side. However, due to the presence of hidden nodes in SB1, the UE does not transmit RACH preamble. In each time gNB initiates CFRA on particular sub-band, gNB may trigger a timer to monitor the RACH preamble, may be called as SB_switchingTimer for example, after expiry of this timer without receiving RACH preamble, gNB may infer the presence of a hidden nodes on this DL sub-band around the UE, e.g., DL sub-bands is not available at UE side.

In addition to PDCCH order scrambled with C-RNTI, we also herein propose that PDCCH order may be transmitted in common search space scrambled with a new RNTI such DL_SB_check-RNTI for example. This may be beneficial if there is a DL sub-band intended to be used for multiple UEs. In this case, the gNB may transmit PDCCH order to the group of intended UEs to get their assessment of hidden nodes on this sub-band.

For the case that UE is configured with multiple BWPs and only a single BWP or multiple BWPs are activated at any particular time if the whole DL BWP is available and in TDD operation mode, the PRACH time-frequency resources to be on the paired UL BWP. However, for FDD, if the UL BWP paired with DL BWP under assessment is not available due to LBT failure at UE side, this DL BWP under assessment may not suffer from hidden nodes, e.g., the DL BWP is available at UE side. Therefore, we herein propose that UE may switch the active UL BWP to another available UL BWP. To this end, the gNB may provide RACH resources across different UL BWPs. Moreover, to reduce burden of detecting the PRACH preamble on gNB, the UE may attempt to transmit the PRACH preamble across different UL BWP with a certain order after expiry of configured timer for each UL BWP, e.g., BWP_access_timer. For example, the UE may attempt to access the UL BWP paired with DL BWP under assessment until timer BWP_access_timer expires. When this timer expires, the UE may switch to another UL BWP according to predefined order. Then the UE may keep attempt access the new UL BWP until its associated timer expire.

For a one-to-many mapping procedure, instead of transmitting PRACH preamble for each available DL sub-band/BWP with no hidden nodes, e.g., DL sub-band/BWP available at UE side, the UE may use particular time-frequency resources or preamble to indicate multiple sub-bands/BWPs with no hidden nodes, e.g., available at UE side. For example, the UE may transmit one PRACH preamble on CFRA resources associated with one available DL sub-band/BWP at UE side. However, different preambles may be used for different combinations of the available DL sub-bands/BWPs at UE side. Hence, once the gNB receives the RACH preamble, gNB may infer which combination of DL sub-bands/BWPs do not suffer from hidden nodes.

Figure 26:
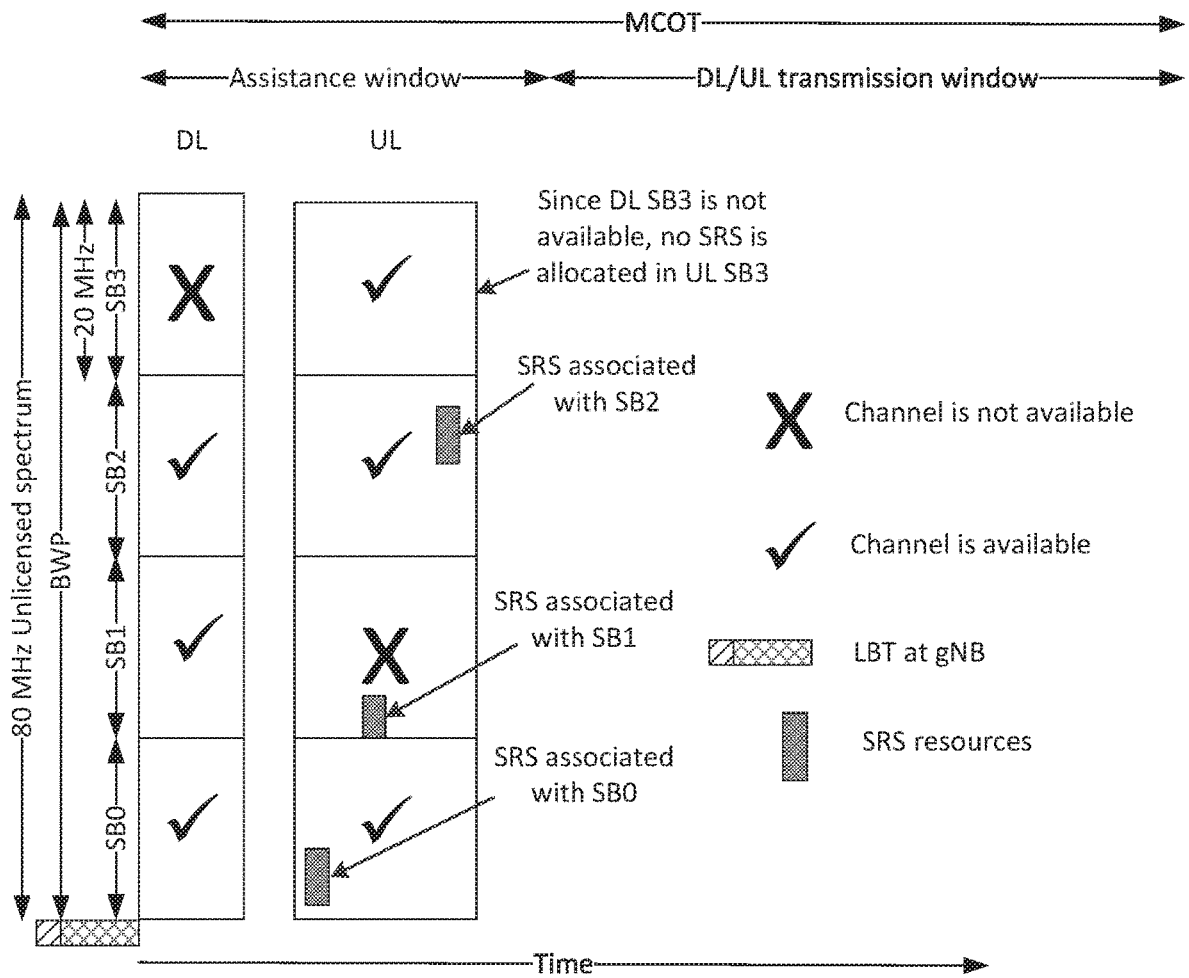
FIG. 26 is a time and spectrum diagram of an example of using SRS to indicate the available DL sub-bands at UE side.

We also herein propose to adopt sounding reference signals (SRS) as indicator to the DL sub-bands/BWPs with no hidden nodes, e.g., available at UE side. To this end, we herein propose to add more use cases to the SRS high layer parameter usage such as SB_indication/BWP_indication for example. The main feature of this SRS usage is that UE may choose not to transmit the SRS associated with the DL sub-band. For example, for each available DL sub-band, the gNB may activate SRS with SB_indication usage as shown in FIG. 26 such that each SRS is associated with particular DL sub-band/BWP. The UE may only transmit the SRS associated with DL sub-bands with no hidden nodes, e.g., available at UE side. The gNB may set a timer, called SRS_SB-timer for example, to receive the SRS. After the expiry of this timer and gNB does not detect SRS transmission, gNB may infer that DL sub-band is unavailable at UE side. If the UL sub-band does not overlap with DL sub-band, then the procedure similar to the one used for FDD may be adopted.

For FDD, if the DL sub-band/BWP has no hidden nodes, but the UE is not able to access the UL sub-band/BWP that are supposed to carry the SRS, then the UE may attempt on other UL sub-band/BWP if gNB provided resources for on other UL sub-bands/BWPs. The UE may follow a certain order while attempting to transmit SRS on other UL sub-bands/BWPs such as sub-band/BWP ID. The UE may keep attempting to access each UL sub-band/BWP for certain duration of time. To this end, we herein propose a timer that UE may use to switch to other UL sub-band/BWP when this timer expires.

Signaling the Selected DL Sub-Bands/BWPs

After exchanging information with the UE, gNB may need to select one or multiple out of those sub-bands indicated by UE to have no hidden nodes. One possible set of solutions is to adopt the aforementioned solutions to signal the sub-bands configurations and indicate the LBT outcome. As another set of solutions, the selected DL sub-band may be selected according to particular rules such that both gNB and UE have the same understanding on which DL sub-bands will be used for the transmission. For example, the DL sub-band with the lowest ID is the one that gNB may use.

After exchanging information between UE and gNB, if a single DL BWP does not suffer from hidden nodes and only one active DL BWP can be activated at any time, then the UE may switch to this DL BWP. On the other hand, if multiple DL BWPs do not suffer from hidden nodes and only one active DL BWP can be activated at any time only, then the UE may expect to receive the BWP activation on the PCell which may be used in CA mode. For DL or SA NR-U, the UE may monitor the BWP with ID according to certain rule. For example, the UE may monitor the BWP with the smallest ID among those indicated to have no hidden nodes.

After exchanging information between UE and gNB and for the case that UE is configured with multiple DL BWPs and multiple DL BWPs can be activated at any particular time if the whole DL BWP is available, then the UE monitor those DL BWPs if they do not have hidden nodes. If sub-set of the originally activated DL BWPs do not have hidden nodes, then the UE monitor this sub-set of DL BWP. Also, on the Pcell, we herein propose that the UE may receive a DCI activating multiple BWPs on the Scell. This DCI may have a bitmap field to indicate which DL BWPs are activated on the Scell which we may call it as one shot multiple DL BWPs activation.

Moreover, we herein propose that gNB may send multiple DCI to activate those multiple DL BWP sequentially, e.g., one DCI active one DL BWP. Here, we propose one bit field to indicate the UE shall monitor the newly activated DL BWP besides the earlier activated DL BWP as this indication bit field is not toggled. Once this bit field is toggled, then UE may interpret the DCI activation command as DL BWP switching command and the UE may deactivate the old active BWP(s) and activate the indicated new ones.

In DC or SA NR-U, the UE may only monitor one DL BWP with no hidden nodes. This DL BWP may be selected according to a particular rule such as the DL BWP with the smallest ID or the initial DL BWP if it has no hidden nodes for example. Then a similar procedure to the described above may be used to add multiple DL BWP when the DCI is transmitted on the Scell on this special DL BWP.

Sub-Band Indication Enhancements

An explicit or an implicit indication may be used to indicate the available or unavailable DL sub-bands. It may be beneficial to indicate different information about available sub-bands to different UEs groups. For example, gNB may successfully acquire the whole LBT sub-bands in particular BWP and indicate such information to a group of UEs while indicating a subset of those available LBT sub-bands to different groups of UEs.

UEs may be grouped based on some criteria such as their capability, power saving requirement, channel quality, UE location, etc., and all UEs belong to the same group are expected to receive the same indication of the available sub-bands. A UE's group index or indexes may be indicated by a high layer signaling, RRC parameter such as SBgroupID, for example. Also, several group IDs may be configured to the UE by high layer signaling and then MAC-CE may be used to semi-statically assign a UE to single or multiple groups by indicating their IDs. Additionally or alternatively, DCI may be used to dynamically assign a UE to particular group(s) by introducing a new field in the DCI which provides UL/DL grants for example, indicating the group ID. Such a field may be a bit map indicating the group(s) that the UE belong to, for example.

Figure 36:
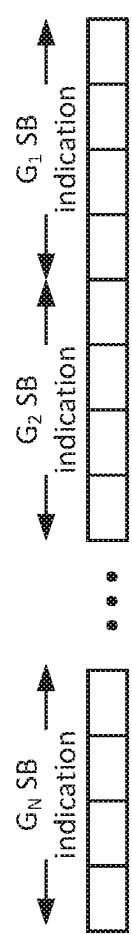
FIG. 36 illustrates and example of GC-PDCCH bit fields indicating available LBT sub-bands for different groups of UEs.

GC-PDCCH may be used to indicate the available LBT sub-bands to different UEs or groups of UEs. GC-PDCCH may include dedicated bit field to each UE or each group of UEs to indicate the available sub-bands to them. For example, assuming gNB constructed N groups of UE denoted by $G_1, \ldots, G_N$, respectively. For each UE or UE group, M bits may be used to indicate the available LBT sub-band as illustrated in FIG. 36 with M set to 4 bits as an example. The total number of constructed groups and number of bits required to indicate the available LBT sub-bands, i.e., N and M, respectively, may be indicated through high layer signaling. This allows the size of the GC-PDCCH to be fixed, known to all the UEs configured to receive GC-PDCCH and all the UEs belonging to any group to know which LBT sub-band indication bits they should read, for example, G1 UEs read the 4 least significant bits, G2 UEs read the next 4 bits and so on. GC-PDCCH may contain other fields carrying other information common to all the UEs or dedicated to some of the UEs groups only. For example, single MCOT value may be indicated to all the UE, or different MCOT values can be indicated to different groups of UEs by dedicating fields for each group of UEs.

Figure 37:
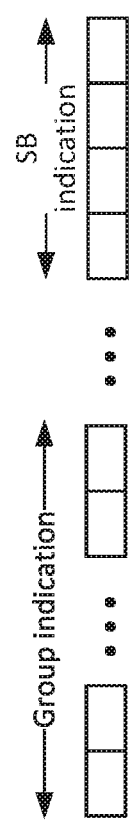
FIG. 37 illustrates and example of GC-PDCCH bit fields indicating available LBT sub-bands and a group ID.

Alternatively, GC-PDCCH may include two fields. The first field may indicate the available LBT sub-bands, called SB indication field for example, while the second field may indicate which UE or UE group(s) are addressed by this GC-PDCCH, called group indication field for example, as shown in FIG. 37, for example. The group indication field may carry a group ID allowing GC-PDCCH to indicate the available LBT sub-bands to single UE or group of UEs and it consists of $Log_2$ (number of groups) bits, we may call this GC-PDCCH as group-specific PDCCH. The group indication field may be a bit-string of length equal to the number of UEs or UEs groups and each bit indicates to particular UE or group of UEs, for example the most significant bit may represent $G_N$, while the least significant bit may represent $G_1$. This allows gNB signaling the same available LBT sub-bands to multiple UEs or groups of UEs whenever this is applicable. The sizes of the first and second fields in GC-PDCCH may be configured by high layer signaling. GC-PDCCH may contain other fields carrying information to all the UEs or UEs groups, some of the UEs or UEs groups only. For example, single MCOT value may be indicated to all UEs or groups of UEs, or a single MCOT value can be indicated to subset of UEs or UEs groups indicated by group indication field whenever this is applicable.

Another possible solution is that gNB may configure multiple 2-tuples of the group ID and the available sub-bands' IDs that the UE(s) may assume to be available, e.g. (Group ID, available sub-bands' ID), then gNB may activate or trigger single or multiple tuples through GC-PDCCH, reference signals, etc. For example, Table 7 shows different K tuples and how the group ID may be associated with particular available LBT sub-band(s). Such configurations may be signaled though high layer signaling. Then based on the outcome of LBT, single or multiple rows may be indicated to the UE. For example. GC-PDCCH may contain a bit field of K bits each bit corresponds to a particular configuration. Then GC-PDCCH may indicate multiple configurations to be activated at the same time. Alternatively, GC-PDCCH may indicate the tuple ID by using a field of $Log_2(K)$ bits instead of using a bit map of K bits. The same approach may be adopted if other signals or channel are deployed to carry single or multiple tuple IDs. For example, the features of those reference signals (e.g. of DMRS, CSI-RS, SSS, PSSS) such as the initialization sequence, pattern, etc., be mapped to particular tuple ID. This mapping may be indicated by high layer signaling.

TABLE 7

Different tuples of UE group ID and the available sub-bands

| Tuple ID | Group ID | Available sub-bands' IDs |
|----------|----------|--------------------------|
| 1 | 1 | SB0 |
| 2 | 1 | SB0, SB1 |
| 3 | 1 | SB2, SB3 |
| 4 | 1 | SB0, SB1, SB2, SB3 |
| 5 | 2 | SB1, SB2, SB3 |
| . | . | . |
| . | . | . |
| . | . | . |
| K | N | SB1, SB3 |

Other possible solution is to associate each UE or UEs group with a dedicated RNTI, sub-band group RNTI (SBG-RNTI) for example. The group ID and its associated SBG-RNTI may be configured by high layer signaling. Moreover, the several group IDs and their associated SBG-RNTI may be configured by high layer signaling and them MAC-CE and/or DCI may be used to semi-statically/dynamically selected the group which the UE belongs to. Alternatively, the UE may be able to infer SBG-RNTI from its group ID. For example, SBG-RNTI may be equal to group ID+common reference RNTI which may be SI-RNTI, P-RNTI, etc. Also, truncated version of any of those RNTI may be used to calculate SBG-RNTI in which some bit of the SI-RNTI, P-RNTI, etc., are dropped, e.g., the most/least significant K bits are truncated, such that the length of the remaining bits are as same as regular RNTI's length. The common reference RNTI may also be set by high layer signaling for all UEs or it may be specified. A UE may only attempt to decode GC-PDCCH that are scrambled with RNTIs associated to its group(s).

A UE may belong to multiple groups at the same time and the indicated available LBT sub-bands for those UEs or groups of UEs may be different. Then, the UE may assume a certain combination of the indicated LBT sub-bands for the different groups are available. For example, the UE may assume that the common LBT sub-bands in all indications are only available, or the UE may assume the union of the indicated LBT sub-bands are available.

As yet another solution, we herein propose to deploy two-steps sub-band indications. In the first step, gNB may explicitly or implicitly indicate all the available LBT sub-bands via GC-PDCCH, DMRS, and/or other reference signals, for example, to all UEs. Then in the second step, gNB may indicate a subset of available LBT sub-bands to individual UEs or group(s) of UEs such that those UE(s) may only monitor those LBT sub-bands during the remaining portion of the COT. For example, UE(s) may assume that the subset of the available LBT sub-bands that carry the first DL transmission, signals and/or channels, is the subset of LBT sub-bands that the UE(s) may have to monitor during the remaining of the COT.

Alternatively, the BWP ID field in DCI, format 1-1 DCI for example, may be interpreted as the LBT sub-band ID and additional one bit field may be introduced to distinguish whether BWP ID field is used for BWP switching or indicating a subset of the available sub-bands. Furthermore, we may introduce a new field to indicate the select sub-set of the available LBT sub-bands and its size may be configured by high layer signaling or set to be equal the number of sub-bands within the activated BWP. This bit field may just indicate the index of the available LBT sub-band. This bit field may be a bit map that may indicate multiple LBT sub-bands.

If other reference signals such as DMRS, CSI-RS, SSS, PSS, etc. are used to indicate the available LBT sub-band, then similar ideas in the aforementioned embodiments can be deployed. For example, each UE or group of UEs may be associated with particular initialization sequence, antenna port, or pattern.

CORESET Monitoring

In NR, the CORESETs, except CORESET 0, are configured through high layer parameter, e.g., RRC IE, ControlResourceSet which contains the parameter frequencyDomainResources to configure their frequency domain resources within the BWP within which the CORESETs are configured. The parameter frequencyDomainResources is a bit string of size equal to 45 bits where each bit each bit corresponds a group of 6 RBs, with grouping starting from PRB 0, which is fully contained in the bandwidth part within which the CORESET is configured. The most significant bit corresponds to the group of lowest frequency which is fully contained in the bandwidth part within which the CORESET is configured, each next subsequent lower significance bit corresponds to the next lowest frequency group fully contained within the bandwidth part within which the CORESET is configured, if any. Bits corresponding to a group not fully contained within the bandwidth part within which the CORESET is configured are set to zero.

Figure 10A:
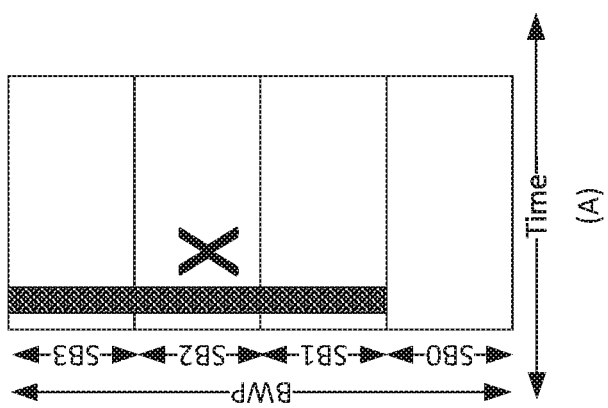
FIGS. 10A to 10E illustrate examples of different combinations of possible remapping the configured CORESET due to SB 2 unavailability.
Figure 10B:
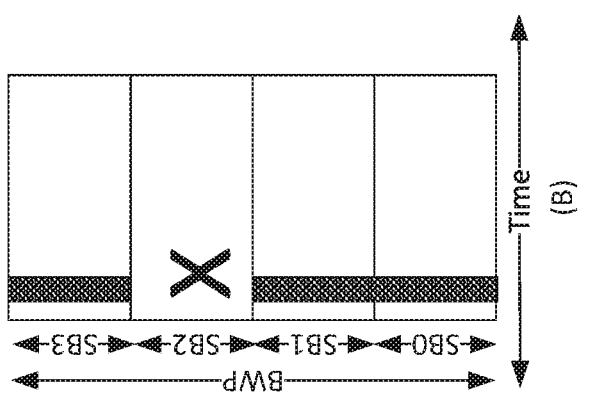
Figures 10C, 10D:
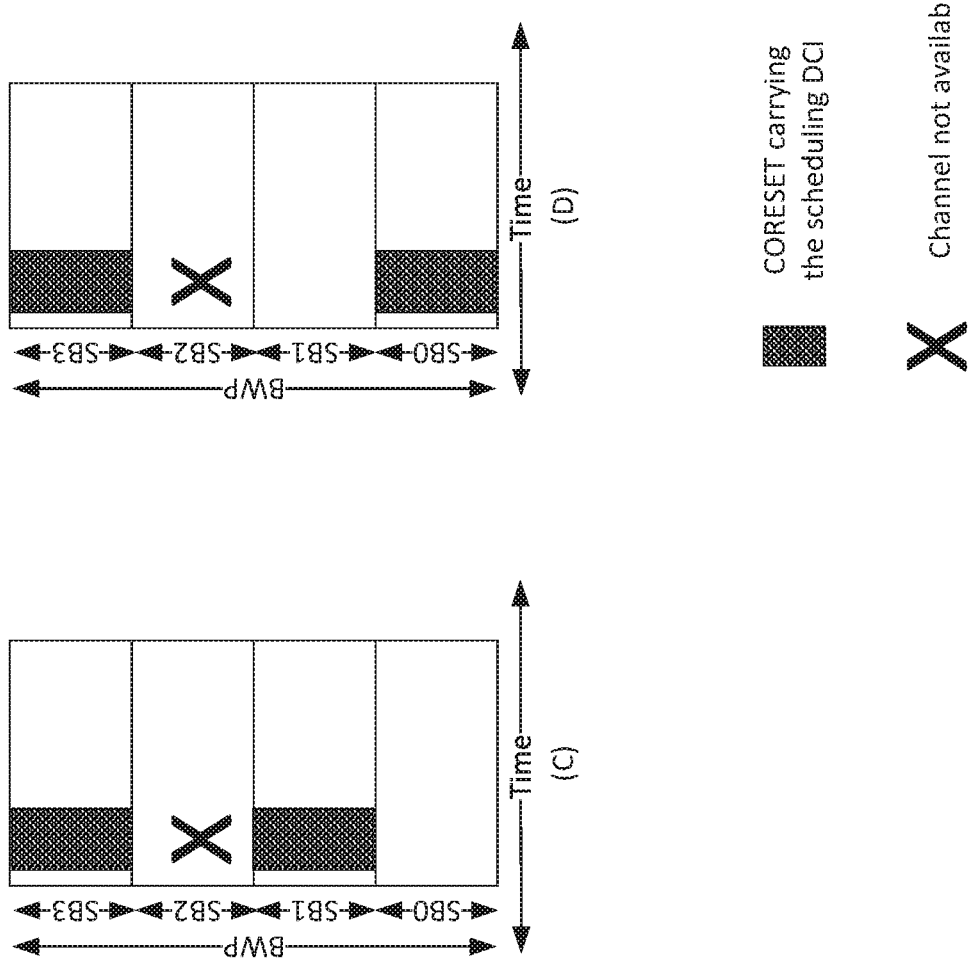
Figure 10E:
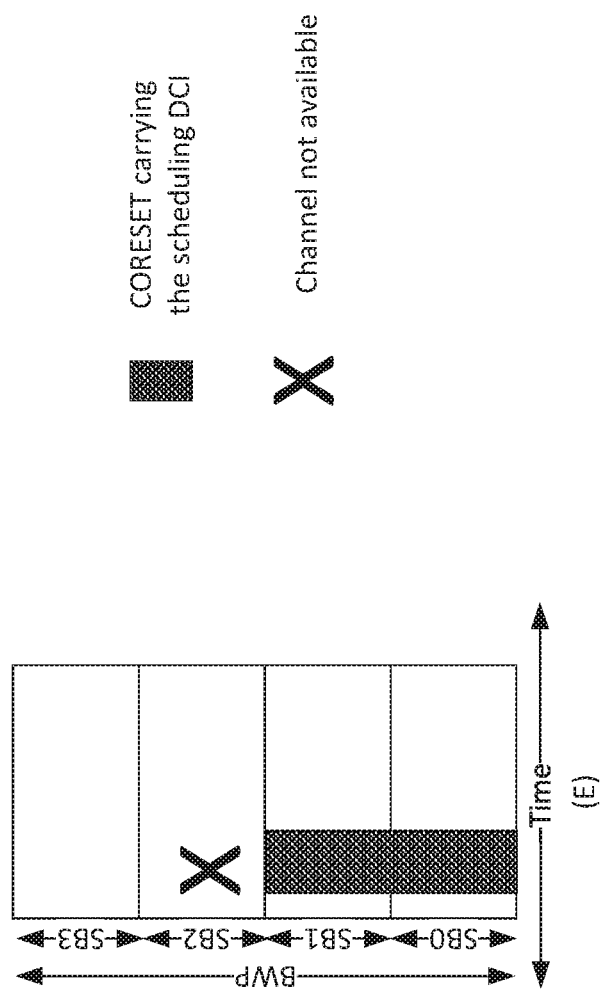

In NR-U, such configurations may not appropriate when LBT is conducted on sub-bands within BWP. If the PRBs configured to be part of a CORESET are contained in unavailable sub-band due to LBT failure, then this CORESET will be punctured. The absence of the knowledge about how the CORESET time/frequency resources are mapped to only available sub-bands significantly decreases the probability of successful PDCCH decoding. In the aforementioned embodiments, we proposed different solutions to allow the gNB to indicate which sub-bands are available and which are unavailable within the configured BWP either for LBT-independent sub-band configurations or LBT-dependent sub-band configurations. However, another set of solutions and procedures may be needed to define the UE behavior of monitoring different configured CORESETs. For example, FIG. 10A shows a CORESET is configured to span three contiguous sub-bands, SB1, SB2 and SB3. Due to channel unavailability at SB2, this CORESET may be remapped on other available SBs. One solution is to maintain the new CORESET's duration, e.g., the number of CORESET's symbols, and number frequency domain resources fixed. As illustrated in FIG. 10B for example, the new CORESET's duration is as same as the original CORESET's duration, while remapping the CORESET's frequency domain resources across the available sub-bands such that both the original and new CORESETs have the same number of frequency domain resources. Another possible solution is to change both the CORESET's duration and the number of frequency domain resources. For example, in FIG. 10C and FIG. 10D, the new CORESET may have bigger duration than the original CORESET and fewer frequency domain resources than the original CORESET. In both FIG. 10C and FIG. 10D, the frequency domain resources are distributed on non-contiguous sub-bands. Alternatively, the frequency domain resources may be distributed on contiguous sub-bands as shown in FIG. 10E for example. The other configurations of the new CORESET may be as same as the original CORESET or a different set of configurations may be needed to the new CORESET. Examples of such configurations are: 1) the mapping method of control channel elements (CCE) to resource element groups (REG), 2) the number of REGs within REG bundle, 3) The interleaver related parameters, 4) the quasi co-located (QCL) configuration, 5) the PDCCH demodulation reference signal (DMRS) scrambling initialization, etc.

There are so many possibilities to remap the time and frequency domain resources of old CORESET to a new CORESET in addition to the other configurations that may need to be modified. Therefore, both gNB and UE shall have the same understanding of the CORESET remapping and its configurations based on the outcome of sub-band LBT. Next, we propose several procedures to establish such understanding between gNB and UE.

Configuration-Based CORESET Remapping

A UE may be configured or signaled with information about the CORESET remapping. To this end, we herein propose the following methods.

Static configurations: In this case, high layer parameters such as, RRC IE for example, ControlResourceSetReMapping given in Information Element 4 in the Appendix may be used to configure the remapping information of CORESET identified by controlResourceSetId which is initially allocated in sub-bands' IDs identified by OldSB-Id. Due to conducting sub-band based LBT, those sub-bands identified by OldSB-Id may not be always available and the gNB may remap the CORESET identified by controlResourceSetId to sub-bands identified by NewSB-ID based on outcome of sub-band LBT.

The parameters OldSB-Id and NewSB-Id may consist of a single sub-band Id or multiple sub-band Ids which may be used if the CORESET's frequency domain resources are distributed across multiple sub-bands.

The CORESET's configurations over the new sub-bands may include parameters such as frequencyDomainResources which may configure the frequency domain resources for the CORESET over the new sub-bands. The parameter frequencyDomainResources may still use a bit string of 45 bits as same as the similar parameter in ControlResourceSet IE. Each bit corresponds to a group of 6 PRBs, with grouping starting from PRB 0 belonging to BWP contains the sub-sets. The most significant bit corresponds to the group of lowest frequency which is fully contained in the BWP containing the sub-bands within which the CORESET is configured, each next subsequent lower significance bit corresponds to the next lowest frequency group fully contained within the BWP containing the sub-bands within which the CORESET is configured, if any. Bits corresponding to a group not fully contained within the BWP containing the sub-band within which the CORESET is configured are set to zero. Moreover, the parameter frequencyDomainResources may be with respect to the BWP which contains the CORESET or absolute to the component carrier carrying this CORESET.

The parameter duration may be used to configure the CORESET's duration over the new sub-bands.

The remaining parameters may be interpreted as same as their corresponding ones in ControlResourceSet IE. However, in ControlResourceSetReMapping IE all these parameters are optional and in case of their absence the UE may use the corresponding values in ControlResourceSet IE for the CORESET identified by ControlResourceSetId. See Example Information Element 4, ControlResourceSetReMapping information element, of the Appendix.

Alternatively, instead of including the indices of the old sub-bands which initially contains the CORESET's frequency domain resources, we herein propose to define the CORESET remapping rule based on only the available sub-bands. Basically, in this solution, we drop the dependency on the old sub-bands' indices initially contained the CORESET's frequency domain resources. The high layer parameter such as ControlResourceSetReMappingV2, e.g. RRC IE, configuring the remapping configurations may cover all the sub-bands configurations within the associated BWP, given in Table 2 for example. We herein propose a compact version of RRC IE, see Example Information Element 5, ControlResourceSetReMappingV2 information element, of the Appendix.

Figure 11:
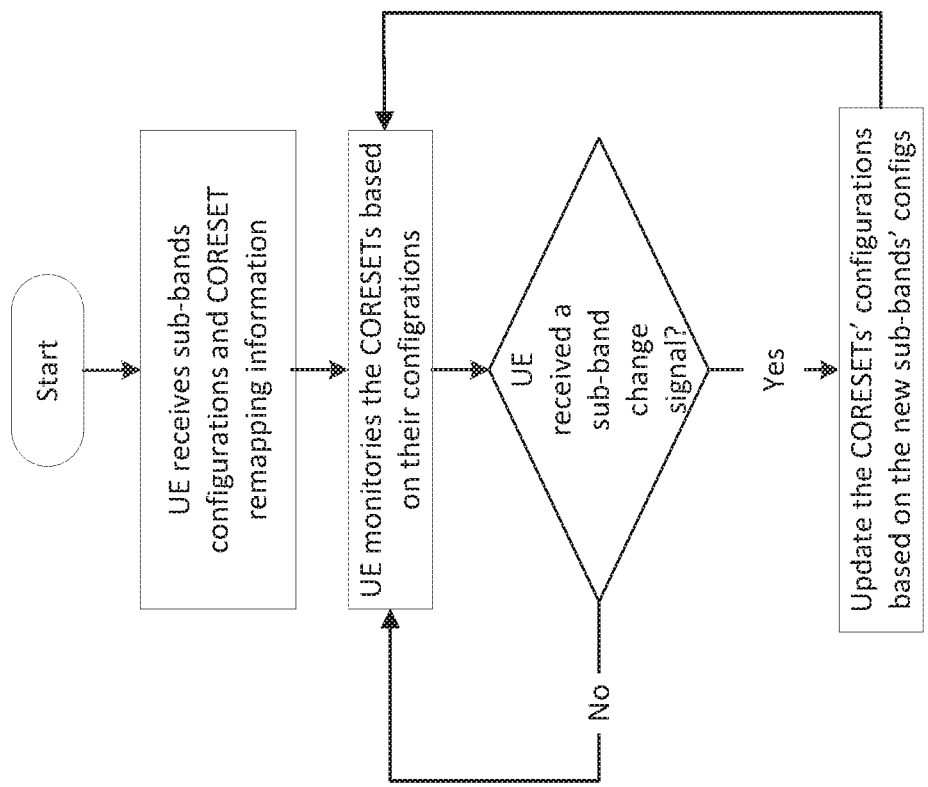
FIG. 11 is a flow chart of an example procedure for UE and gNB to adjust the CORESETs' configurations based on the available sub-bands.

Once the sub-bands are configured and the CORESET remapping information are received by the UE, then the UE may adapt to the outcome of sub-band based LBT at the gNB and may adjust the configurations of the different CORESETs that the UE is supposed to monitor. FIG. 11 shows this procedure for adjusting the CORESETs' configurations.

Figure 12:
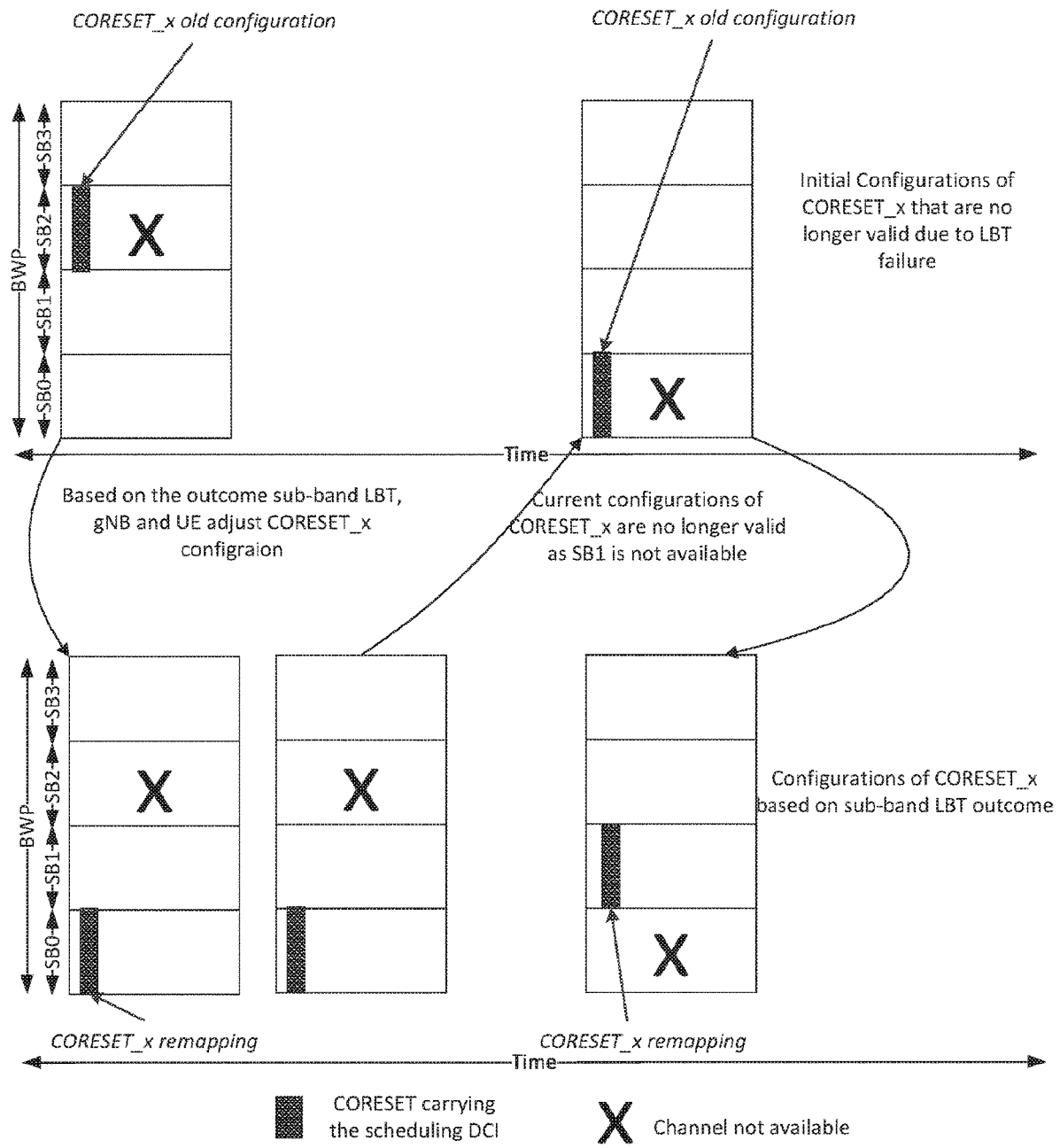
FIG. 12 illustrates example configurations of CORESET_x evolving over time based on the outcome of sub-band LBT.

In FIG. 12, we show an example for CORESET_x which is configured to be transmitted on SB2. Later on, the SB2 is not available due to LBT failure. Assuming that UE has received ControlResourceSetReMapping IE with OldSB-Id and NewSB-Id are set to $\{0, 1, 2, 3\}$ and $\{0, 1, 3\}$, respectively, or ControlResourceSetReMappingV2 IE with BWP-SB-Confis-Id with index associated with SB0+SB1+SB3, then once UE knows that SB2 is unavailable while other sub-bands are available, then UE knows immediately on which sub-band CORESET_x may be transmitted and the associated configurations, in our example, it is SB0. UE continues monitoring CORESET_x in SB0 until this sub-band is no longer available. When this happen, UE may use ControlResourceSetReMapping IE with OldSB-Id and NewSB-Id are set to $\{0, 1, 3\}$ and $\{1, 2, 3\}$, or ControlResourceSetReMappingV2 IE with BWP-SB-Confis-Id with index associated with SB1+SB2+SB3, then UE knows immediately on which sub-band CORESET_x may be transmitted and the associated configurations, in our example, it is SB1.

To avoid any ambiguity, for any tuple consists of the CORESET Id, the indices of old and new sub-bands, e.g., (controlResourceSetId, OldSB-Id, NewSB-Id), used in ControlResourceSetReMapping IE there is a unique set of configurations defining the mapping of the CORESET identified by controlResourceSetId and allocated in sub-bands are indexed by OldSB-Id and the available sub-bands are indexed by NewSB-Id. Similarly, for ControlResourceSetReMappingV2 IE, there is a unique set of configurations defining the mapping of the CORESET identified by controlResourceSetId when it is mapped to sub-bands associated BWP-SB-Confis-Id.

Semi-static configurations To allow more flexibility and enable the same tuple consisting of the CORESET Id, the indices of old and new sub-bands, e.g., (controlResourceSetId, OldSB-Id, NewSB-Id) or the CORESET Id and sub-bands associated BWP-SB-Confis-Id, to be associated with multiple CORESET remapping configurations, we herein propose to use MAC-CE to down select among those configurations. In other words, high layer parameter ControlResourceSetReMapping or ControlResourceSetReMappingV2 may provide the UE with multiple CORESET remapping information for the same tuple (controlResourceSetId, OldSB-Id, NewSB-Id) or BWP-SB-Confis-Id, then MAC-CE may select which configurations, e.g., ControlResourceSetReMappingId or CORESET_Remapping-Id, that the UE may follow. In the absence of MAC-CE, the UE may use the configurations with lowest Id, e.g., ControlResourceSetReMappingId or CORESET_Remapping-Id.

DCI for scheduling the configurations: for both static and semi-static configurations through RRC and RRC+MAC-CE, respectively, the DCI scheduling the PDSCH carrying RRC and MAC-CE may be signaled in UE-specific search space using its C-RNTI or it may be signaled in common search space or group common PDCCH with a dedicated a RNTI, CORESET_Remapping_RNTI for example.

Pre-Specified-Based CORESET Remapping

Figure 13:
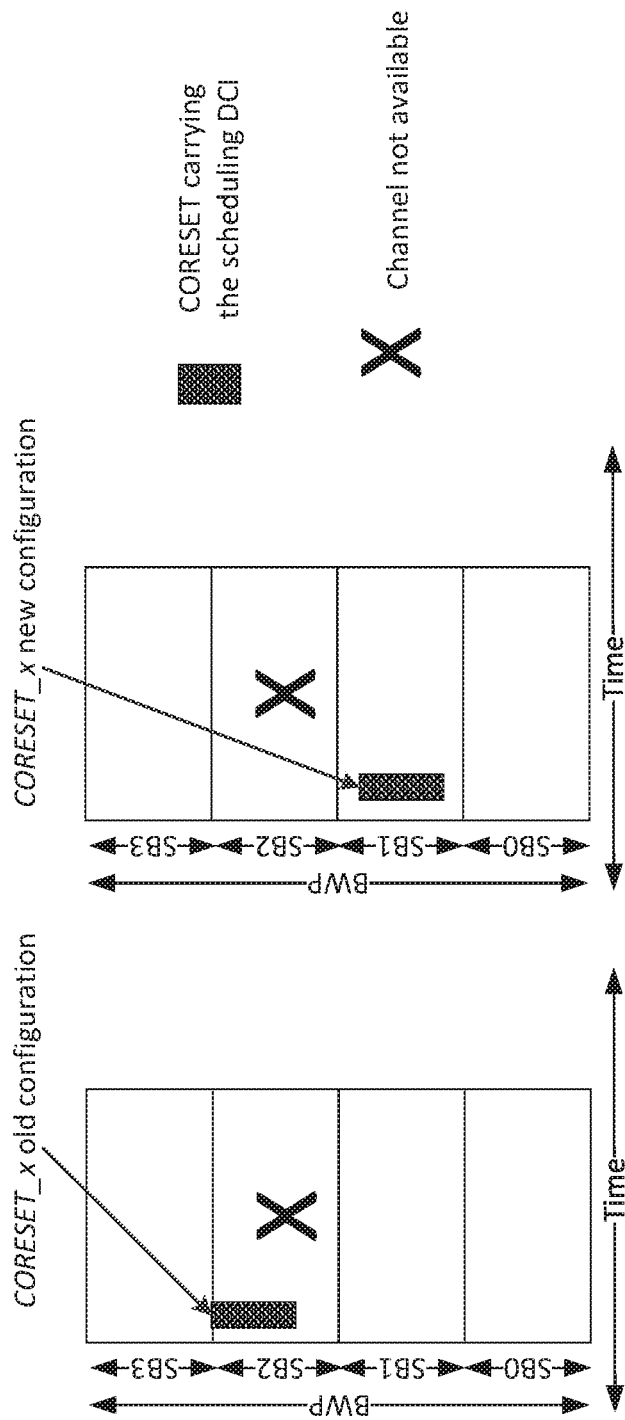
FIG. 13 shows and example of remapping the CORESET's frequency domain resources when The CORESET is entirely allocated with a single sub-band.

Alternatively, the CORESET remapping information may be pre-specified and is performed according to pre-defined rules to reduce the signaling overhead. We herein propose the following rules:

The CORESET is entirely allocated with a single sub-band: The UE may assume that all CORESET's configuration remains unchanged except the frequency domain resources. If the CORESET x's PRB allocated in sub-band identified by SB-Id y and this sub-band is no longer available, then UE may assume that CORESET's PRBs are centered around the center of the nearest sub-band to one initially configured to carry CORESET x. If there are two available sub-bands surrounding the unavailable sub-band, then the CORESET may be remapped to the sub-band with the smallest Id. For example, in FIG. 13, CORESET x is initially configured to be allocated on SB2 which is not available due to LBT failure. Given that SB0, SB2 and SB3 are available and the closest sub-bands to SB2 are SB1 and SB3, then CORESET x may be remapped into around the center of SB1.

Other sub-bands orders may be used to remapping the CORESET that is initially configured on unavailable sub-band. For example, instead of remapping the CORESET to the center of nearest sub-band to one initially configured, the CORESET may be remapped to the center of available sub-band with the smallest Id. In the example in FIG. 13, CORESET x will be remapped to SB0 instead of SB1. Moreover, remapping the CORESET to the new sub-band is not necessary to be around the center of the sub-band. It may be with respect to any other reference point. For example, the CORESET's frequency domain resources may start from the lowest PRB in the selected sub-band. The CORESET's frequency domain resources may end at the highest PRB at the selected sub-band, for example.

Figure 14:
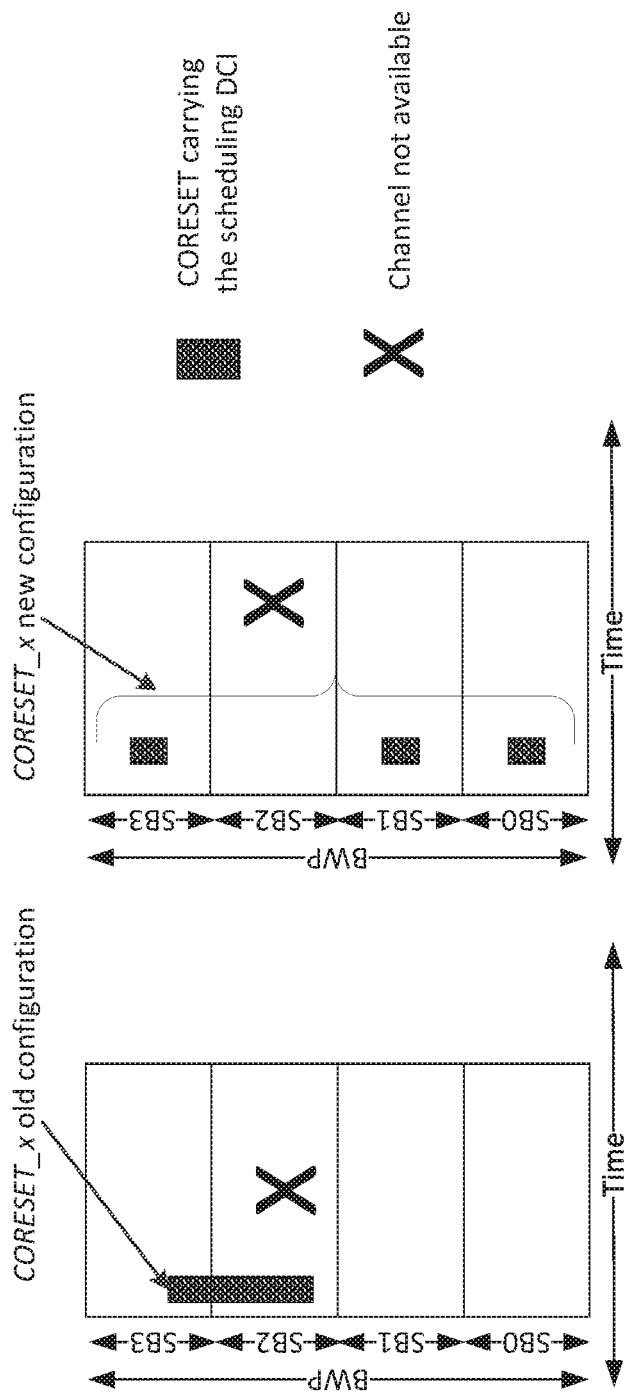
FIG. 14 shows another example of remapping the CORESET's frequency domain resources.

The CORESET spans multiple sub-band: If the CORESET's frequency domain resources span multiple sub-bands and some of those sub-bands are not available, the CORESET's frequency domain may be remapped to the center of all available sub-bands. For example, in FIG. 14, CORESET x's frequency resources is initially mapped across SB2 and SB3, but SB2 is not available due to LBT failure. Since SB0, SB1 and SB3 are available, then the same number of initially configured to CORESET x may be remapped equally around the center of all available sub-bands as shown in the figure.

Instead of remapping the CORESET across all the available sub-bands, the CORESET may be remapped to a subset of the available sub-bands according to a particular rule. For example, if the CORESET is mapped across two sub-bands, then it may be remapped to center of two available sub-bands with the smallest Id. In the previous example, it is SB0 and SB1. Moreover, the CORESET may be remapped to contiguous frequency domain resources starting from particular reference point in the selected sub-bands. In general, the reference point may be any PRB or frequency point inside or outside the selected sub-bands. For example, it may the lowest or highest PRB in the selected sub-bands.

Figure 15:
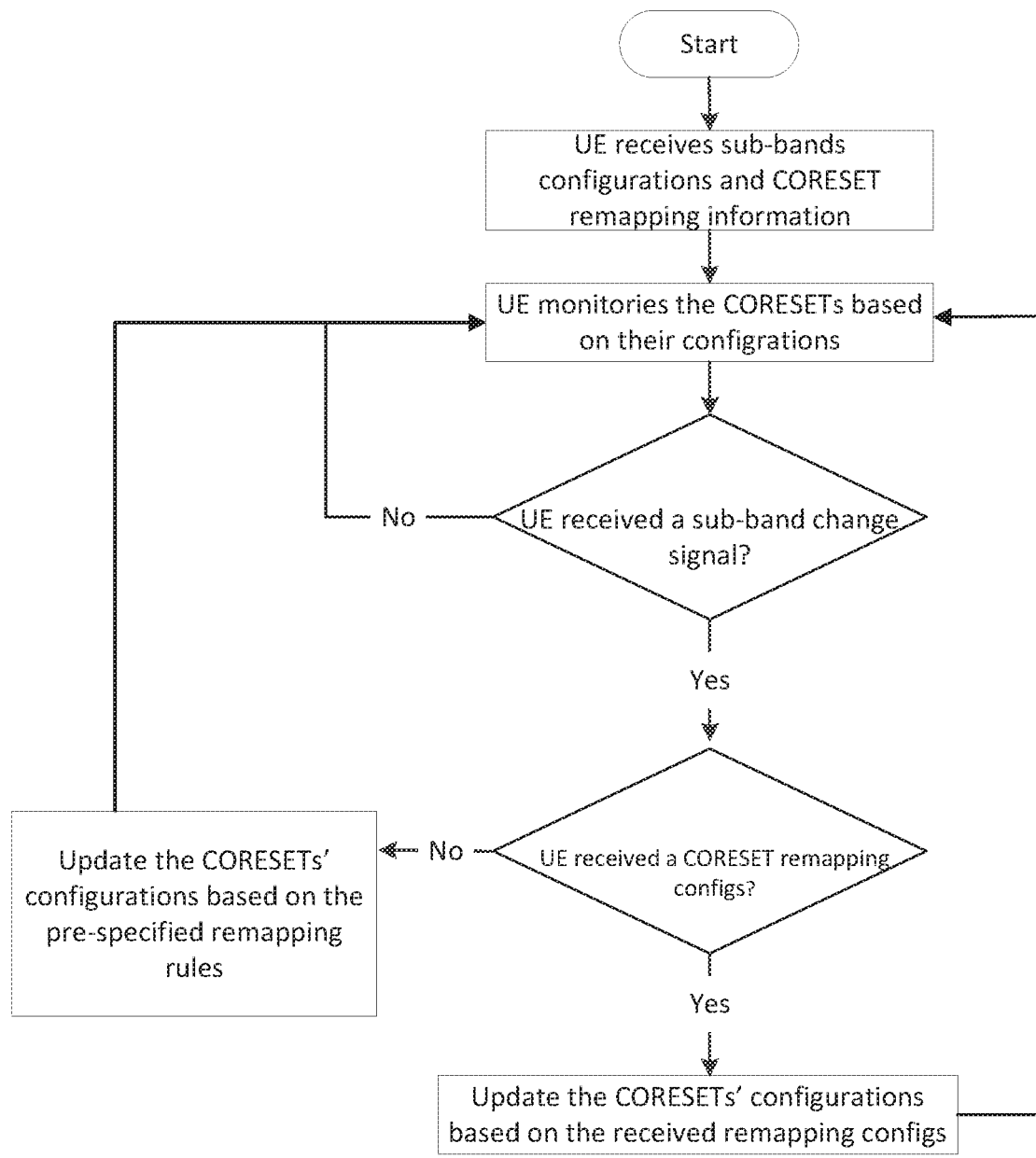
FIG. 15 is a flow chart of an example procedure for UE and gNB to adjust the CORESETs' configurations based on the available sub-bands using pre-specified remapping rules and statically/semi-statically remapping configurations

As another embodiment, we herein propose to combine signaling CORESET remapping configurations through RRC or RRC+MAC-CE or deploying pre-specified rules without any signaling. For instance, pre-specified CORESET remapping rules may be used if there are no CORESET remapping configurations. FIG. 15 shows the procedure for combining both approaches. Upon receiving an indication of a change in sub-bands, if static or semi-static CORESET remapping configurations are received by the UE for particular CORESET identified by controlResoruceSetId, then both gNB and UE use signaled configurations. However, if there is no remapping configuration, then gNB and UE may use a pre-specified rules.

Guard Band Indication and its Impact on CORSET Configurations

Guard band may be needed at the edge(s) of the available sub-bands to reduce power leakage to the adjacent frequency bands. Several approaches are proposed to indicate the guard band configurations to a UE operating in NR-U based on the available LBT sub-bands.

Figure 38:
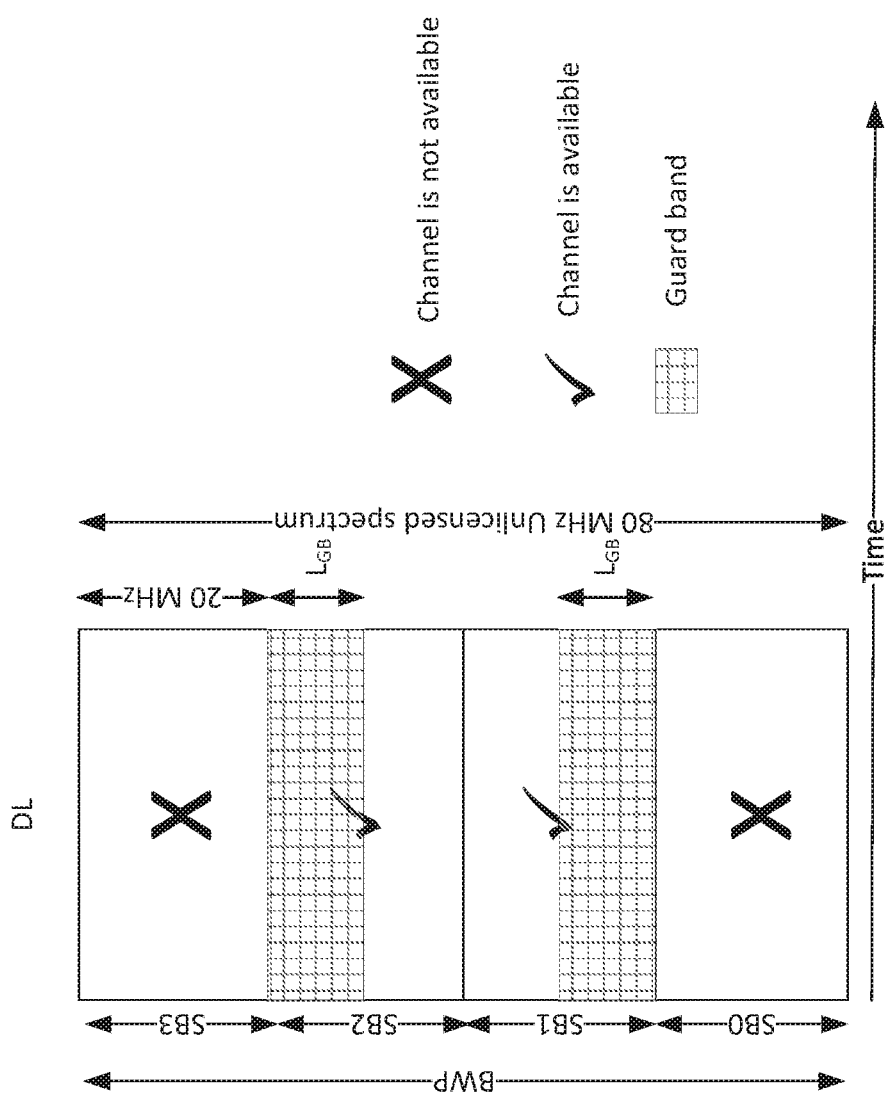
FIG. 38 illustrates and example of configuring a guard band.

The size of the guard band may be specified such that $L_{GB}$ PRBs, for example, are reserved at the edge(s) of the available LBT sub-bands and it may be assumed no guard band between contiguous available LBT sub-bands. FIG. 38 shows an example of a BWP divided into four sub-bands, SB0, SB1, SB2, and SB3 in which the inner sub-bands, SB1 and SB2, are available while the outer sub-bands, SB0 and SB3, are not available. In this case, $L_{GB}$ guard band PRBs are reserved between (SB0 and SB1) and (SB2 and SB3). Also, there is no guard band between the contiguous available sub-bands, (SB1 and SB2). For any available sub-band, the guard band width at the upper edge, denoted by $L_{GB,\ UP}$ for example, may be different than the guard band width at the lower edge, denoted by $L_{GB,\ Down}$ for example, of this sub-band and both $L_{GB,\ UP}$ and $L_{GB,\ Down}$ may be specified. If the available LBT sub-band is located at the upper or lower edge of the active BWP, then there may no need for guard band at upper or lower edge of this sub-band, respectively.

Alternatively, the guard band size may be configured by high layer signaling, such as UpperGB and LowerGB or GB for both upper and lower edges, RRC parameters for example. If only one parameter is indicated to a UE, then the UE may assume guard band sizes at upper and lower edges of the available LBT sub-band are equal and both are set to equal the indicated size.

The start of the guard band may be indicated by high layer signaling with reference to particular PRB such as the first PRB in the carrier, BWP, or available sub-band.

There is a chance that some of CORESETs' PRBs overlap with guard band. As specified for Release 15 New Radio, a CORESET can consist of contiguous or non-contiguous groups of PRBs and each group consists of 6 contiguous PRBs, it may be modified. Therefore, we herein propose that if any group of 6 PRBs is configured for a CORESET and it is fully overlapped with guard bands, then the UE may assume this group of 6 PRBs is invalid and it does not carry PDCCH. This is equivalent to modifying the configured frequencyDomainResources, RRC parameter that configure the frequency domain resources of the CORESET, by setting the bit associated with group of PRBs to zero instead of 1.

Moreover, if any group of 6 PRBs is configured for a CORESET and it is partially overlapped with guard bands, then the UE may assume the whole group of 6 PRBs is invalid and it does not carry PDCCH, or the UE may assume that only the PRBs that fully or partially overlap with guard band are invalid and it does not carry PDCCH while the other PRBs that do not overlap with guard band may still be used to carry PDCCH.

The CORSET may be configured to span multiple sub-bands, while PDCCH may be transmitted only within the CORESET portions within available sub-bands. The PDCCH may be fully confined within sub-band or it may be interleaved across multiple sub-bands.

If PDCCH is confined within a sub-band, then the UE may assume that PDCCH is not transmitted if this sub-band is indicated to be unavailable due to LBT failure at gNB side. Alternatively, the UE may attempt to decode PDCCH in the other available sub-bands within the configured CORESET.

The UE may receive an indication that PDCCH is confined within a sub-band by high layer signaling, e.g., RRC parameter such as SB_Confined_PDCCH. Also, high layer signaling such as RRC parameter may provide the UE with the sub-band index containing the PDCCH. Moreover, UE may be indicated, by high layer signaling for example, whether to assume that PDCCH is not transmitted if its sub-band is not available or it may be still transmitted in other available sub-bands in the CORESET.

If PDCCH is interleaved across several sub-bands and some of them are not available, then the UE may assume that the interleaved portions of PDCCH in those sub-bands are not transmitted. High layer signaling may indicate the sub-bands carrying the interleaved portions of PDCCH. Alternatively or additionally, the UE may assume that all sub-bands spanned by the CORESET may carry portions of the interleaved PDCCH.

Sub-Band Search Space

Since a CORESET may vary based on the available sub-bands, the search spaces associated with this CORESET may vary as well. For example, the monitoring slot, periodicity, offset, aggregation level, etc., may change as the available sub-bands change based on the outcome of LBT. Therefore, we herein propose the following embodiments to address this challenge.

We propose to associate the search space (SS) configurations not only with the CORESET Id, but also with the sub-bands Ids. To this end, the high layer parameter, such as RRC SearchSpaceSB IE in Example Information Element 6 in the Appendix, may be used to include sub-band(s) which contains the frequency domain resources of the CORESET identified by ControlResourceSetId. For example, this may be captured in the parameter SB-Id which carries single or multiple sub-bands' Ids containing the frequency domain resources of the CORESET.

See Example Information Element 6, SearchSpaceSB information element.

In NR Release 15, a search space is associated with a CORESET through high layer signalling. Due to channel access uncertainty, a portion or the whole CORESET may not be available. Therefore, multiple CORESETs with different IDs may be configured to the UE. Then based on the LBT outcome at gNB, the search space may be associated with the proper CORESET ID.

The UE may be configured with the proper CORESET ID associated with a search space by high layer signalling for each possible LBT outcome at gNB. For example, if a particular search space is associated with CORESET 1 if sub-band 0 is available while it is associated with CORESET 2 if sub-band 3 is available, and so on. To this end, assuming the BWP consists of M sub-bands, for example, the following RRC parameters may be introduced, SB_0, SB_1, . . . , SB_M−1, where each one indicates the proper CORESET ID if this sub-band is available.

Alternatively, the UE may infer the CORESET ID associated with a search space based on certain rules depending some parameters such as the search space ID, the available sub-band ID, etc.

Uplink BWP/Sub-Band Switching for RACH and BFR

Uplink BWP/Sub-Band Switching for RACH

In NR, once the initial access process is started in particular UL BWP with physical random access channel (PRACH) preamble transmission which is commonly known as message 1 (Msg 1), it is assumed that message 3 (Msg 3) in the RACH procedure will be transmitted on UL BWP as same as the UL BWP used for Msg 1 transmission. The time and frequency resources for Msg 3 is indicated in gNB response to Msg 1 which is known as random access response (RAR) and denoted as message 2 (Msg 2). Particularly, in Msg 2, gNB transmits a DCI format 1_0 scrambled with RACH-RNTI (RA-RNTI) and the UE has to decode it within time window called RAR-window. Once DCI is decoded correctly, the UE can proceed to decode PDSCH carrying RAR which indicate the time/frequency resources for Msg 3. The frequency domain resources of Msg 3 are allocated using uplink resources allocation type 1 which indicates the resources to the scheduled UE within active UL BWP.

In NR-U, the time between transmitting Msg 1 and Msg 3 may be big enough to the limit that other nodes may acquire the channel the UL BWP/sub-band containing the frequency domain resources may no longer be available. To address this challenge, we herein propose the following embodiments.

Figure 16:
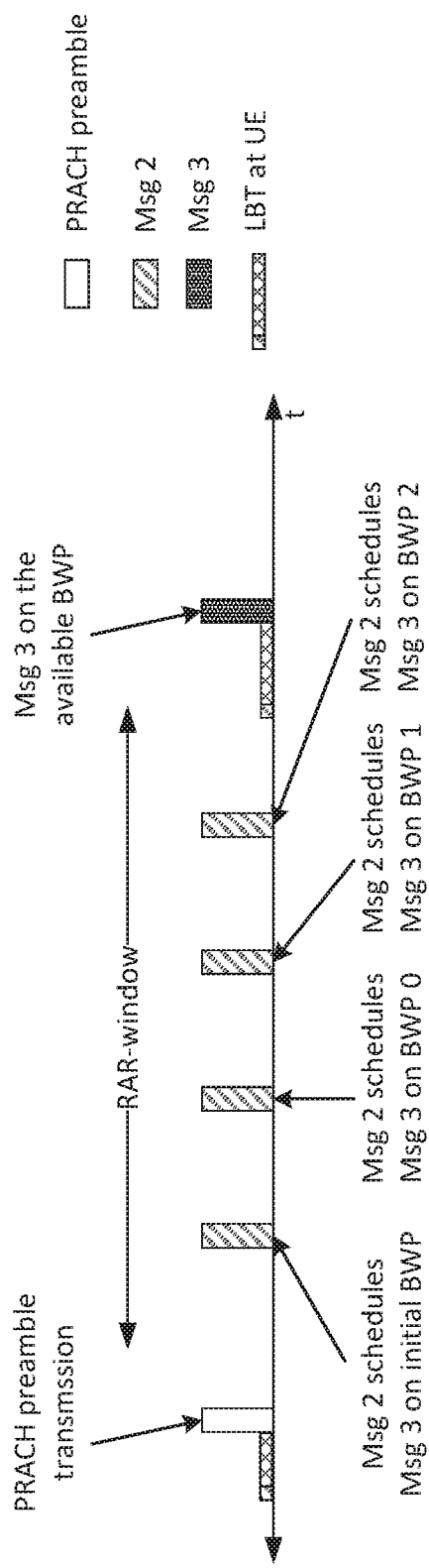
FIG. 16 is an example of configuring multiple RARs and each one is associated with particular BWP.

The UE may receive multiple RAR within the RAR-window, which may be expanded as well. Each RAR may provide time and frequency resources within particular BWP. The reserved bits in RAR may be used to indicate the BWP index or new bits may be introduced for this purpose. FIG. 16 shows an example of multiple RARs that provide frequency and time domains resources on different BWPs/sub-bands. Then, depending on LBT outcome, the UE may transmit Msg 3 on the available BWP/sub-band on the associated uplink grants.

To limit overhead due to each UE having multiple Msg3 resources, and also limit risk over Msg3 collision and therefore risk of detection failure at gNB, we herein propose that 1. UE may randomly select among the multiple Msg3 resources (e.g., BWPs or sub-bands), the resource that will be used for Msg3 transmission if there is multiple available UL BWP/sub-band.
2. Msg3 resources may be deterministically selected based on UE ID. For e.g. let's assume K Msg3 resources is signaled to the UE where Msg3 resources are indexed 0, 1, 2 . . . K−1. UE selects the resource index that satisfies the following: Selected resource index=UE_ID Mod K.

Figure 17:
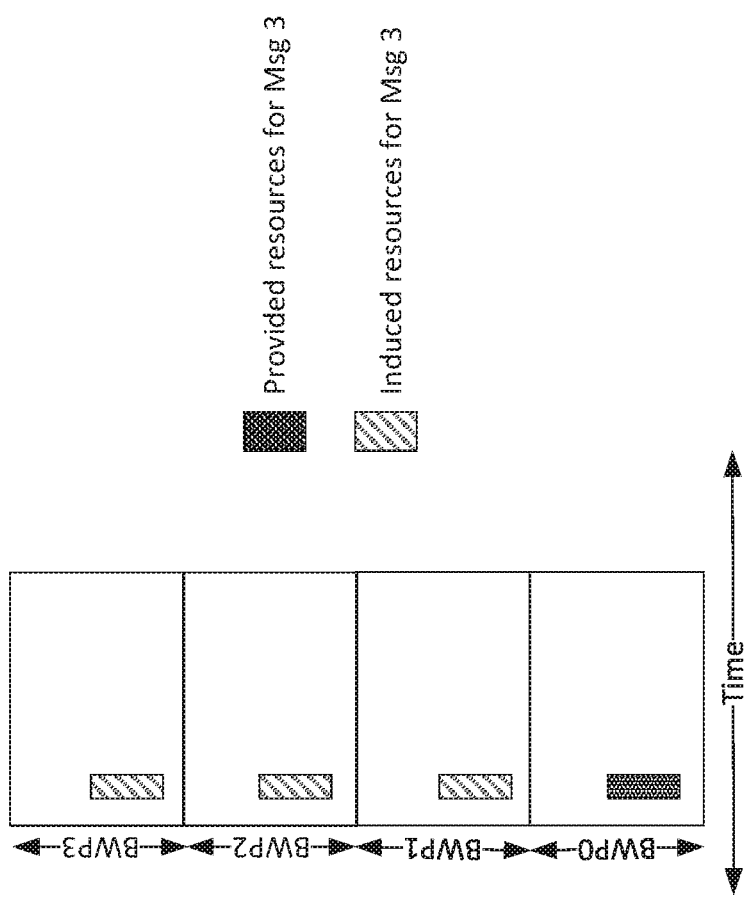
FIG. 17 illustrates an example of inducing resources for Message 3.

As another embodiment, we herein propose to define resources remapping rules which may indicate the time and frequency domains resources on other BWPs/sub-bands based on the provided resources in another UL BWP/sub-band. For example, the UE may induce the frequency domain resources for Msg 3 on UL BWPs/sub-bands by just shifting the configured resources on particular UL BWP/sub-band. FIG. 17 shows an example in which the RAR explicitly provides the frequency and time domains resources for Msg 3 on BWP0. Hence, the UE may induce the resources on other BWPs by shifting the frequency domain resources to the same location as in BWP0 while mainlining the same time location. Different rules may be applied to implicitly provide resources for Msg 3 on BWPs other than the one with explicit configurations. For example, the frequency domain resources may be shifted to the center of the other BWP/sub-band. The time domain resources may be the same across all BWP, but it also may be different by some shift based on BWP/sub-band Id, for example.

Alternatively, we herein propose that gNB may only transmit a single RAR, but with bigger size than the original size of RAR carrying the frequency and time domain resources for Msg 3 on a multiple BWPs/sub-bands. Here, we propose that the single RAR may carry the time and frequency resources for different BWPs/sub-bands.

Regarding Msg 4, if the UE chooses other BWP than the one initially used in Msg 1 transmission, this means that the UE may be surrounded by other nodes that are using the frequency domain corresponding to this BWP. Therefore, it may be better that Msg 4 to be transmitted on DL BWP associated with UL BWP that the UE choose for Msg 3 transmission.

Enhancement for MSG3

It may be beneficial to provide multiple transmission opportunities for MSG3 in time and/or frequency domains to increase the chance of accessing the channel. To provide multiple time domain, we herein propose the following procedures or a combination of them.

The MSG3 PUSCH time resource allocation field in the RAR, i.e., MAC PDU, may be expanded. Contrary to what's specified for Release 15 New Radio, instead of using this field to indicate a single row of the time domain allocation list provided by high layer signaling, TimeDomainAllocationList, or a default specified list, we herein propose to expand this field, e.g. to be 16 bits, and use it to indicate multiple rows in time domain allocation list. In other word, this field may be considered as bitmap and its length may be set to equal the number of rows in the time domain allocation list, for example. Each bit may correspond to a single row or multiple rows. The UE may consider the indicated rows as alternatives to each other and only one candidate start position may be selected based on LBT outcome.

For example, Table 3 shows an example time resource allocation bit map field is expanded into 16 bits. Each bit corresponds to particular slot offset $K_2$, start symbol S and allocation length L. For example, if the bits corresponding to the setup in the first and second rows are set to one, then UE may assume that two candidate start positions are at OFDM symbol 0 and 1 are indicated and UE may choose one of them based on LBT outcome.

TABLE 3

Time domain resource allocation using a bit map

| Resource allocation bit map field | PUSCH mapping type | $K_2$ | S | L |
|---|---|---|---|---|
| Most significant bit | Type A | 3 | 0 | 14 |
| 0/1 | Type A | 3 | 1 | 12 |
| 0/1 | Type A | 3 | 2 | 10 |
| 0/1 | Type B | 3 | 3 | 10 |
| 0/1 | Type B | 3 | 4 | 10 |
| 0/1 | Type B | 3 | 5 | 8 |
| 0/1 | Type B | 3 | 6 | 6 |
| 0/1 | Type A | 4 | 7 | 6 |
| 0/1 | Type A | 4 | 8 | 4 |
| 0/1 | Type A | 4 | 9 | 3 |
| 0/1 | Type A | 6 | 2 | 8 |
| 0/1 | Type A | 6 | 3 | 5 |
| 0/1 | Type A | 6 | 4 | 10 |
| 0/1 | Type B | 3 | 8 | 6 |
| 0/1 | Type A | 7 | 0 | 14 |
| Least significant bit | Type A | 7 | 0 | 10 |

Alternatively, the size of the time resource allocation bit field in RAR may keep as the same as specified for Release 15 New Radio, but the bit map may be interpreted differently. Specifically, each bit may correspond to multiple rows in time domain allocation list. For example, Table 4 shows that time resource allocation bit field is 4 and each bit correspond to four different PUSCH configurations for MSG3. UE may choose the best PUSCH configurations based on LBT outcome.

TABLE 4

Time domain resource allocation using a bit map where each bit correspond to multiple rows

| Resource allocation bit map field | PUSCH mapping type | $K_2$ | S | L |
|---|---|---|---|---|
| 0/1 | Type A | 3 | 0 | 14 |
|  | Type A | 3 | 1 | 12 |
|  | Type A | 3 | 2 | 10 |
|  | Type B | 3 | 3 | 10 |
| 0/1 | Type B | 3 | 4 | 10 |
|  | Type B | 3 | 5 | 8 |
|  | Type B | 3 | 6 | 6 |
|  | Type A | 4 | 7 | 6 |
| 0/1 | Type A | 4 | 8 | 4 |
|  | Type A | 4 | 9 | 3 |
|  | Type A | 6 | 2 | 8 |
|  | Type A | 6 | 3 | 5 |
| 0/1 | Type A | 6 | 4 | 10 |
|  | Type B | 3 | 8 | 6 |
|  | Type A | 7 | 0 | 14 |
|  | Type A | 7 | 0 | 10 |

Additionally, the size of configured or default time domain allocation list may be increased, adding more rows representing new configurations for PUSCH. The PUSCH configurations can be grouped such that each row represents multiple configurations. In this case, time resource allocation bit field is still indicating the row index, but each row provide multiple start positions of PUSCH. For example, 4 bits of time resource allocation bit field can indicate the indices of 16 row and each row may carry multiple configurations.

As yet another possible solution, only some of parameters of the time domain allocation list may be modified, without the need to add more rows or reinterpreting time resource allocation bit field or increasing its size. In some rows, multiple $K_2$ values may be used to provide multiple candidate start positions across different slots. For example, in some rows of Table 5, $K_2$ and $K_2+\beta$ are two different slot offset values and UE may select the appropriate slot offset based on LBT outcome. Similarly, multiple start symbols may be provided in some rows. Table 5 shows an example of providing S and S+$\alpha$ as possible start OFDM symbols and the UE may choose the appropriate start symbol based on LBT outcome. The parameters $\beta$ and $\alpha$ may be configured by high layer signaling. In case they are not configured, then the parameters $\beta$ and $\alpha$ may be specified and they may be function of other system parameters such numerology.

TABLE 5

Time domain resource allocation using a row index with multiple values for $K_2$ and S

| Row index | PUSCH mapping type | $K_2$ | S | L |
|---|---|---|---|---|
| 1 | Type A | 3, 3 + $\beta$ | 0 | 14 |
| 2 | Type A | 3, 3 + $\beta$, 3 + 2$\beta$ | 1 | 12 |
| 3 | Type A | 3 | 2, 2 + $\alpha$ | 10 |
| 4 | Type B | 3 | 3 | 10 |
| 5 | Type B | 3 | 4, 4 + $\alpha$ | 10 |
| 6 | Type B | 3 | 5 | 8 |

TABLE 5-continued

Time domain resource allocation using a row
index with multiple values for $K_2$ and S

| Row index | PUSCH mapping type | $K_2$ | S | L |
|---|---|---|---|---|
| 7 | Type B | 3 | 6 | 6 |
| 8 | Type A | 4, 4 + β | 7 | 6 |
| 9 | Type A | 4 | 8, 8 + α | 4 |
| 10 | Type A | 4 | 9 | 3 |
| 11 | Type A | 6, 6 + β | 2 | 8 |
| 12 | Type A | 6 | 3 | 5 |
| 13 | Type A | 6 | 4 | 10 |
| 14 | Type B | 3 | 8 | 6 |
| 15 | Type A | 7, 7 + β | 0 | 14 |
| 16 | Type A | 7 | 0, 0 + α | 10 |

Alternatively, the RAR may indicate multiple slot offset or start symbol values, a new field may be introduced for this purpose. This field may indicate the periodicity of the candidate start position which may be denoted by δ for example. Specifically, if the indicated slot offset is $K_2$, then UE may assume that MSG3 PUSCH may be transmitted in slots shifted by $K_2$, $K_2+\delta$, $K_2+2\delta$, . . . , or $K_{max}$, where $K_{max}$ is the maximum allowable slot offset that may be indicated by high layer signaling, derived according to certain rules, or specified. If indicated start symbol is S, then UE may assume that MSG3 PUSCH may be transmitted at symbol S, S+δ, S+2δ, . . . , or $S_{max}$, where $S_{max}$ is the maximum allowable start symbol index that may be indicated by high layer signaling, derived according certain rules such as $S_{max}=14-L$, or specified. The field indicating δ has $Log_2$ (number of possible values of δ) bits. Different periodicity values for slot offset and start symbol may be deployed and donated by $\delta_K$ and $\delta_S$, respectively, for example. In this case, two spate fields may be needed to indicate $\delta_K$ and $\delta_S$.

Rather than using additional fields in RAR to indicate the periodicity of slot offset or start symbol of MSG3 PUSCH to provide multiple candidate start positions, the periodicity periodicities δ, $\delta_K$ and/or $\delta_S$ may be configured by high layer signaling or specified in case of the absence of high layer signaling.

If RAR provides multiple candidate start positions for PUSCH of MSG3, multiple MCSs may need to be indicated to a UE for each or some of the provided PUSCH configurations. Multiple MCS fields in RAR each one may be tied to particular start position. UE may derive the new MCS using some rules depending on the candidate start position and length of PUSCH carrying MSG3. For example, if the length of MSG3 PUSCH of the candidate start position is as same as the length of MSG3 PUSCH of the original start position, then UE may use the same MCS provided for the original start position. In another example, if the length of MSG3 PUSCH of the candidate start position is half the length of MSG3 PUSCH of the original start position, then UE may use the double MCS provided for the original start position. For example, the MCS for the candidate start position can be expressed as follows $$MCS_{New} = \frac{L_{old}}{L_{new}} MCS_{old},$$

where $L_{old}$ and $MCS_{old}$ are the length and the indicated MCS of the original start position of MSG3 PUSCH while $L_{new}$ is the length of the MSG3 PUSCH depending on its new start position.

It is beneficial that MSG2 indicates the channel access procedure type(s) for MSG3 in the RACH procedure. In some cases, the same channel access procedure type may be deployed for all the candidate start positions of MSG3. In other cases, channel access procedure type may depend on the candidate start positions of MSG3.

Either for single start position or multiple candidate start positions deploying the same channel access procedure for MSG3, then a field in DCI scheduling RAR PDSCH, e.g. DCI format 1_0 scrambled with RA RNTI may be used to indicate the channel access procedure for MSG3. The size of the field may equal to $Log_2$ (number of channel access procedures).

If the UE cannot access the channel for a transmission according to the first start position indicated in RAR, there are a few options. The UE may attempt to access the channel and transmit PUSCH at the other candidate start positions. Similarly, or the channel access procedure may be indicated in the RAR itself by dedicating $Log_2$ (number of channel access procedures) field in RAR MAC PDU, for example. Alternatively, the indication of the channel access procedures may be split between DCI scheduling RAR PDSCH and RAR in case there is no enough bits in the DCI or RAR to carry this indication by itself only.

For the case that the channel access procedure may vary from candidate start position to another, we herein propose to add additional column to time domain allocation list such that for each indicated candidate start position, the associated channel access procedure type is indicated. This approach may be combined with the aforementioned procedures to indicate the candidate start positions. For example, in Table 6, a new column is added to indicate the channel access type.

TABLE 6

Time domain resource allocation indicating the channel access procedure associated with each candidate start positions of MSG3

| Resource allocation bit map field | PUSCH mapping type | $K_2$ | S | L | Channel access procedures |
|---|---|---|---|---|---|
| 0/1 | Type A | 3 | 0 | 14 | Type 1 |
|  | Type A | 3 | 1 | 12 | Type 1 |
|  | Type A | 3 | 2 | 10 | Type 1 |
|  | Type B | 3 | 3 | 10 | Type 2 |
| 0/1 | Type B | 3 | 4 | 10 | Type 2 |
|  | Type B | 3 | 5 | 8 | Type 2 |
|  | Type B | 3 | 6 | 6 | Type 2 |
|  | Type A | 4 | 7 | 6 | Type 2 |
| 0/1 | Type A | 4 | 8 | 4 | Type 2 |
|  | Type A | 4 | 9 | 3 | Type 2 |
|  | Type A | 6 | 2 | 8 | Type 2 |
|  | Type A | 6 | 3 | 5 | Type 2 |
| 0/1 | Type A | 6 | 4 | 10 | Type 2 |
|  | Type B | 3 | 8 | 6 | Type 2 |
|  | Type A | 7 | 0 | 14 | Type 2 |
|  | Type A | 7 | 0 | 10 | Type 2 |

Figure 39:
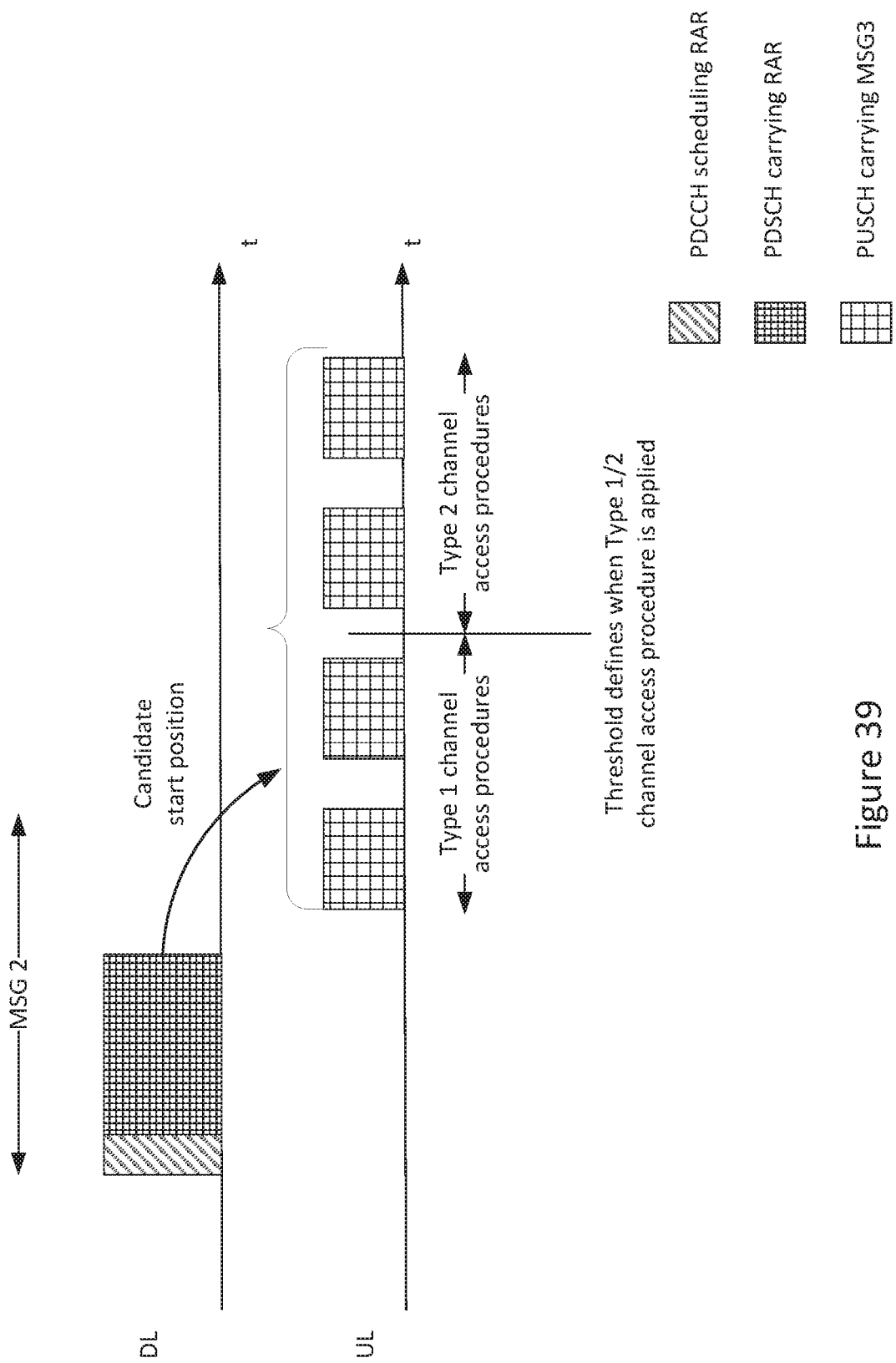
FIG. 39 illustrates and example of a UE inferring a channel access procedure type based on the time gap between MSG2 and MSG3.

Moreover, the UE may infer the type of channel access procedures based on certain rules depending several factors such as the time gap between the first symbol carrying MSG3 and the last symbol carrying RAR, the length of MSG3, numerology, etc. For example, if the time gap between the first symbol carrying MSG3 and the last symbol carrying RAR is smaller and/or greater than certain threshold(s), then particular type of channel access procedures may be applied. FIG. 39 shows an example of MSG2 provides 4 candidate start positions for MSG3. If the UE successfully accesses the channel to transmit PUSCH at the first or second candidate start positions, then Type 1 channel access procedure may be deployed. If the UE successfully accesses the channel to transmit PUSCH at the third or fourth candidate start positions, then Type 2 channel access procedure may be deployed. The threshold value(s) and the associated channel access type procedure may be configured by high layer singling or be specified.

Uplink BWP Switching for BFR

In BFR, we herein propose that gNB may configure the UE with PRACH resources across different BWPs/sub-bands to increase the chance that UE acquire the channel to transmit the beam failure recovery request (BFRQ). Some of these PRACH resources may be associated with contention-free PRACH while other associated with contention-based PRACH.

Moreover, we herein propose that gNB response may be transmitted on BWP with Id different than BWP used for BFRQ transmission. To reduce the power consumption at UE while monitoring the gNB's response, some of the aforementioned embodiment may adopted to configure the CORESET associated with recoverySearchSpaceId and to monitor the gNB response across the different BWP/sub-bands Ids.

As another embodiment, we herein propose that UE may monitor the CORESET associated with recoverySearchSpaceId on different BWP/sub-bands with particular order. For example, the UE may start monitoring this CORESET on the BWP/sub-band originally configured in. Then UE may monitor this CORESET on BWPs with following order default BWP→Initial BWP→$BWP_0$→$BWP_1$→ . . . etc. Similarly, the UE may monitor this CORESET on the sub-bands with following order: SB0→SB1→SB2→ . . . , etc.

CSI-RS Enhancements

CSI-RS can be configured for multiple purposes including channel acquisition, beam management, beam failure recovery, radio link monitoring, radio resource management, etc. For any of these use cases, CSI-RS can be configured to occupy the full bandwidth or just a fraction of the BWP configured for the UE. With wide band operation, gNB may not always have access to the whole frequency band carrying CSI-RS, i.e., gNB conducts successful LBT on a set of sub-bands composing this BWP. Consequently, if CSI-RS(s) is configured to span multiple sub-bands, it is not guaranteed that all those sub-bands are always available at the same time. Therefore, we herein propose several enhancements to CSI-RS cope with such challenge.

Channel acquisition indication(s) may be used to let the UE adjust its receiving filter(s). Either explicit or implicit channel acquisition indication(s) may indicate the sub-bands acquired by gNB. In this case, the UE may assume that only the REs within the available sub-bands are carrying the configured CSI-RS while the other REs within the unavailable sub-bands are not transmitted and should not be considered in the measurements process. For example, the UE should not average the REs in the unavailable sub-bands.

For New Radio Release 15, CSI-RS can be configured to be transmitted on a fraction of DL BWP. Specifically, the BWP is divided into CSI-RS sub-bands (CSRS-SB) of contiguous PRBs and the size of this CSRS-SB depends on BWPs size as shown in Table 7, different sizes of CSRS-SB may be introduced. For each size BWP, there are two possible CSRS-SB sizes and the selected size can be configured by high layer signaling.

TABLE 7

| CSRS-SB sizes | |
|---|---|
| Bandwidth part (PRBs) | CSRS-SB size (PRBs) |
| <24 | N/A |
| 24-72 | 4, 8 |
| 73-144 | 8, 16 |
| 145-275 | 16, 32 |

Figure 28:
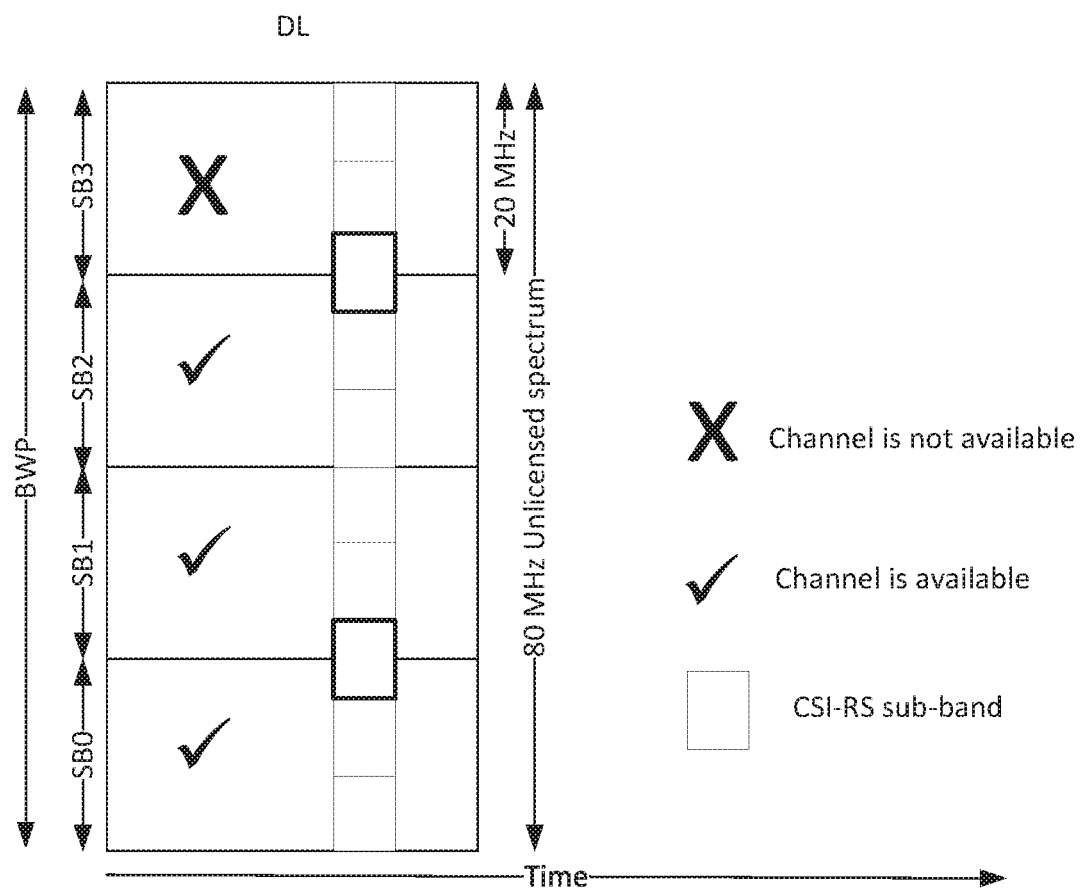
FIG. 28 illustrates and example of CSRS-SB crossing LBT sub-band boundaries.

The CSRS-SB may cross the LBT sub-band boundaries as shown in FIG. 28, for example. If one of the LBT sub-bands carrying a configured CSRS-SB to the UE is not available, for example SB3 in FIG. 28, then UE may assume one of the following alternatives.

Figure 29:
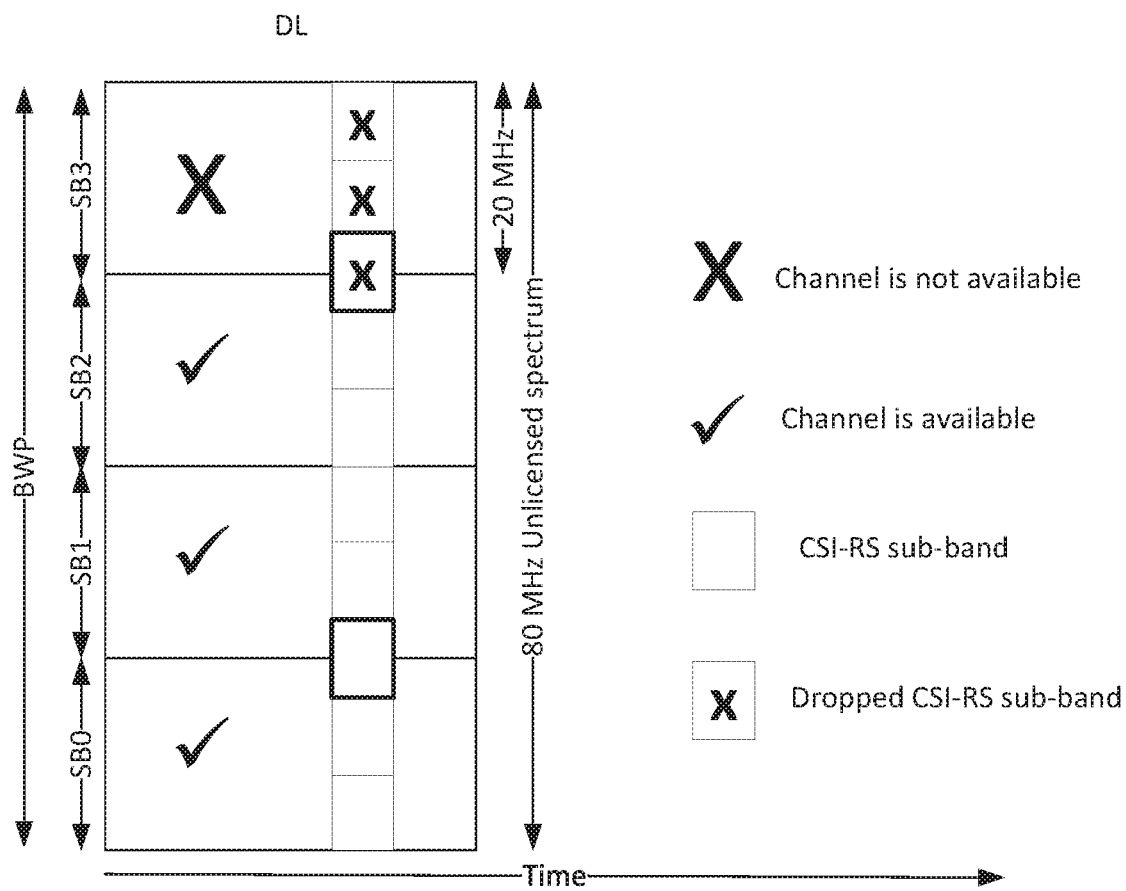
FIG. 29 illustrates and example of CSRS-SB that are fully or partially outside the available LBT sub-bands being dropped.

In first alternative, if any of CSRS-SB spanning two LBT sub-bands and one of them is not available, then the UE may assume that no CSI-RS is transmitted in this CSRS-SB, i.e., dropping the measurement on this CSRS-SB, and no reporting is required for this CSRS-SB. This is exemplified in FIG. 29 in which all the configured CSRS-SB that are fully or partially outside the available sub-bands are dropped from the measurements and no reporting is required for them. Moreover, if the measurements are averaged with across all subbands within the UE's DL BWP, the UE may not include in the unavailable SB(s) for averaging to avoid corrupting the averaging.

Figure 30A:
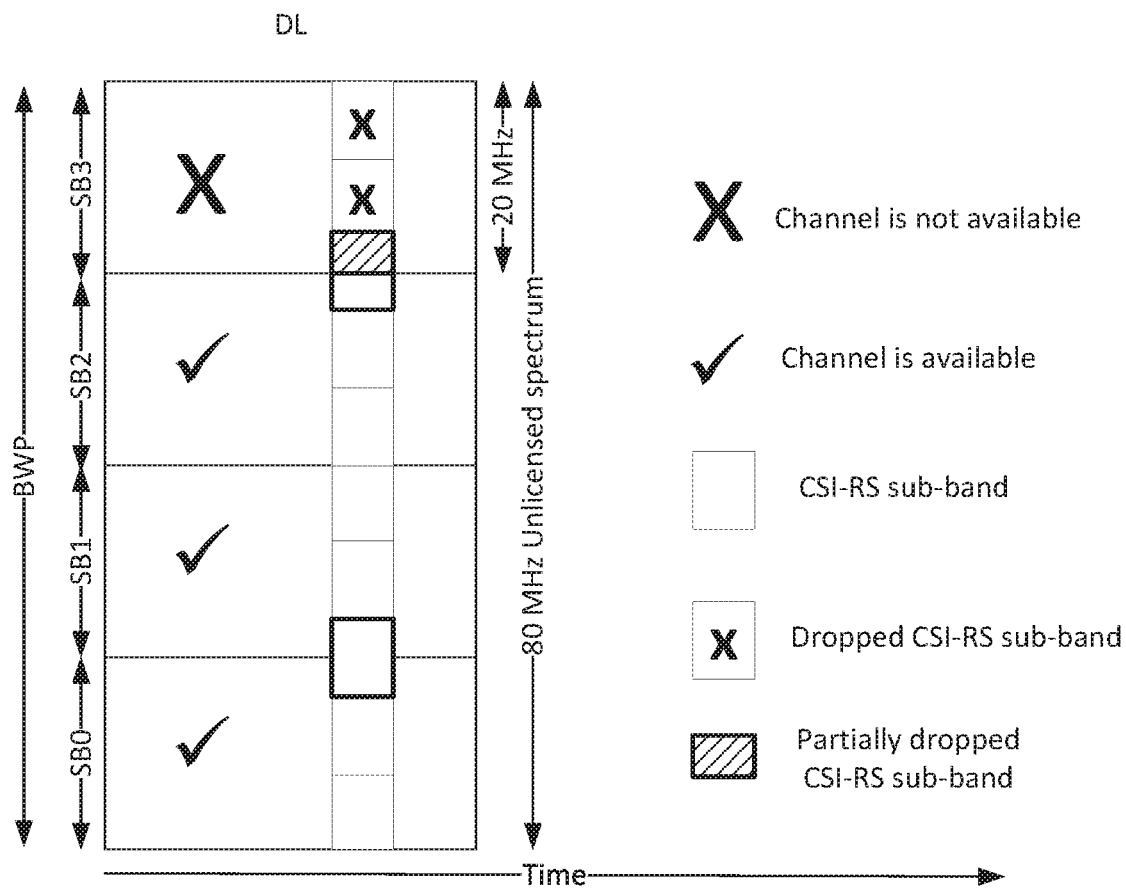
FIG. 30A illustrates and example of a shrinking CSRS-SB that overlaps with available and unavailable LBT sub-bands.

In another alternative, the configured CSRS-SB spanning two LBT sub-bands may not fully dropped if any of those LBT sub-bands are not available. Instead, the CSRS-SB PRBs that are fully or partially in the unavailable LBT sub-band will be dropped and other PRBs in the same CSRS-SB may still carry CSI-RS and contribute to the measurements. This is equivalent to shrinking the last CSRS-SB to contain less number of PRB than other CSRS-SB far from the sub-band boundary. For example, FIG. 30A shows that CSRS-SB spanning SB2 and SB3 is partially dropped because SB3 is unavailable. In this case, the CSI-RS may only be transmitted on the PRBs that are fully in SB2.

Figure 30B:
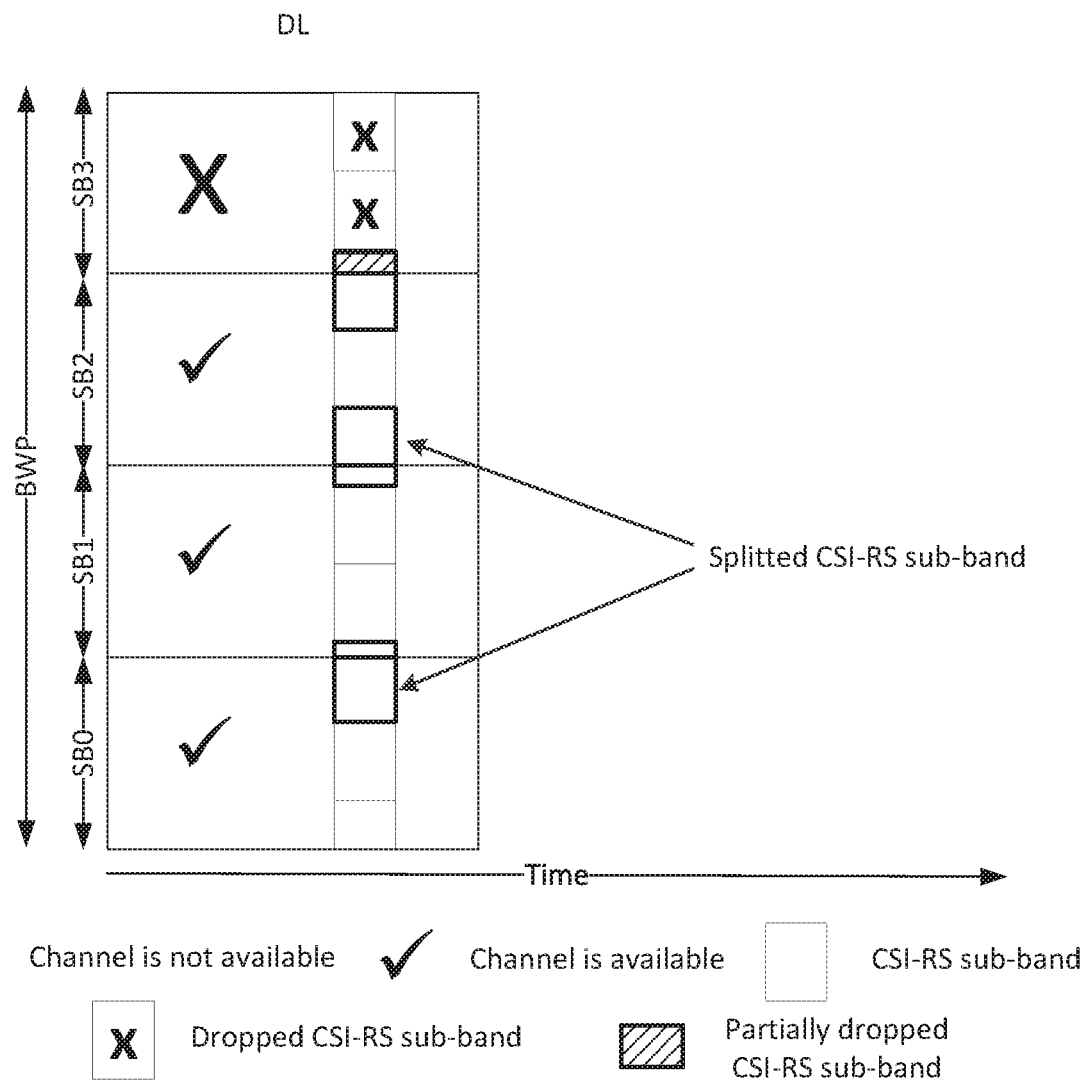
FIG. 30B illustrates and example of restricting measurements within the available LBT sub-bands.

Moreover, even if multiple contiguous LBT sub-bands are available, we herein propose to restrict the measurements to be confined within the LBT sub-bands. If a configured CSRS-SB spans two contiguous available sub-bands, then this CSRS-SB may be divided into two CSRS-SBs, each one is fully contained within one LBT sub-bands. If there is a PRB that across the boundary between any contiguous LBT sub-bands, then this PRB may be dropped and UE may assume that no CSI-RS is transmitted in this PRB. FIG. 30B shows an example of CSRS-SB that spans (SB0, SB1) and another one spanning (SB1, SB2), then each of those CSRS-SB is divided into two CSRS-SBs one in each available LBT sub-band. If a UE is configured to report CSI on CSRS-SB, parent CSRS-SB, spanning two contiguous LBT sub-bands, then UE may assume that CSI reporting is configured for the children CSRS-SBs, the new CSRS-SBs obtained be dividing the parent CSRS-SB.

Figure 31:
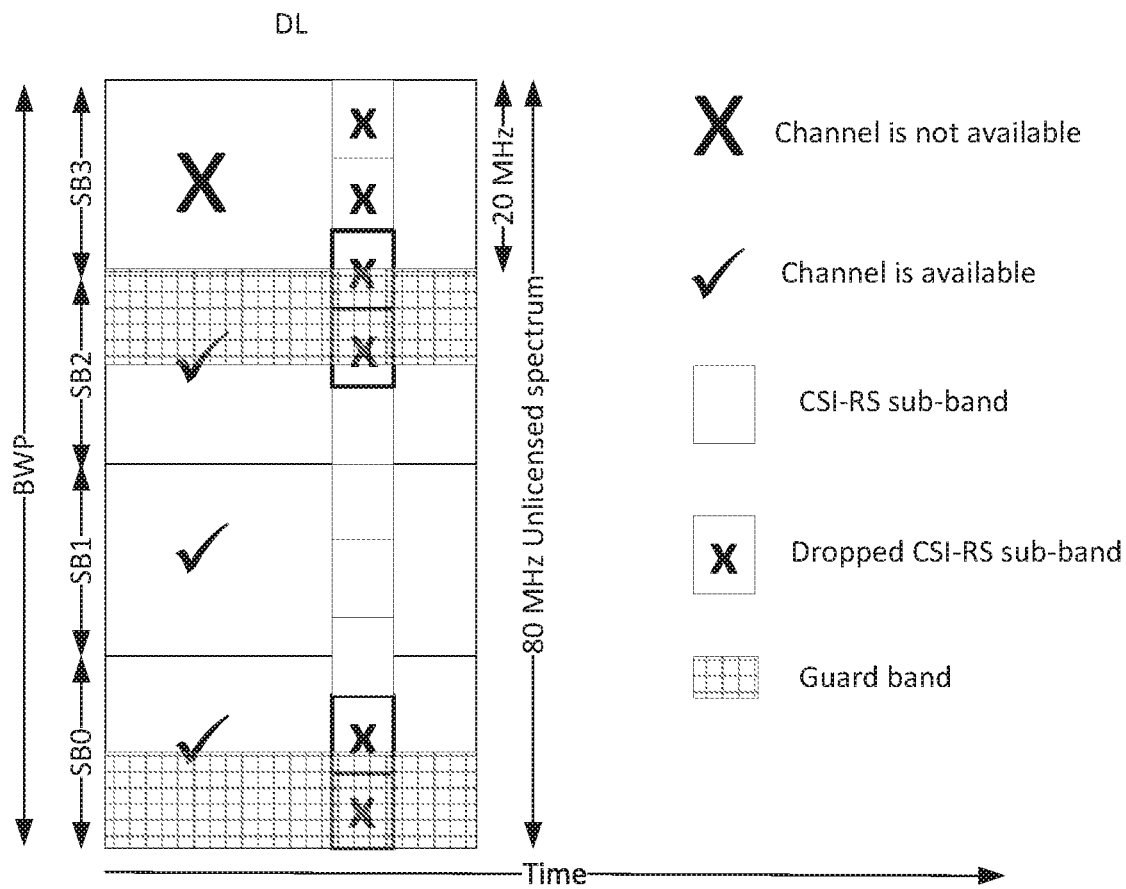
FIG. 31 illustrates and example of dropping the CSRS-SB that fully or partially overlap with guard band.

In new radio (NR) based access to unlicensed spectrum, guard band may be adopted to avoid interfering on the adjacent channel. Consequently, some CSRS-SBs may fully or partially overlap with guard band as shown in FIG. 31, for example. If any of those CSRS-SBs are configured for the UE to conduct measurements, then the UE may assume, for example that no CSI-RS REs are transmitted on those CSRS-SBs. In other words, the UE may drop those CSRS-SBs from configured measurements. Also, if there are CSRS-SBs are configured to carry CSI-RS REs fall in unavailable sub-bands, then the UE may assume no measurement should be conducted on those CSRS-SBs.

Figure 32:
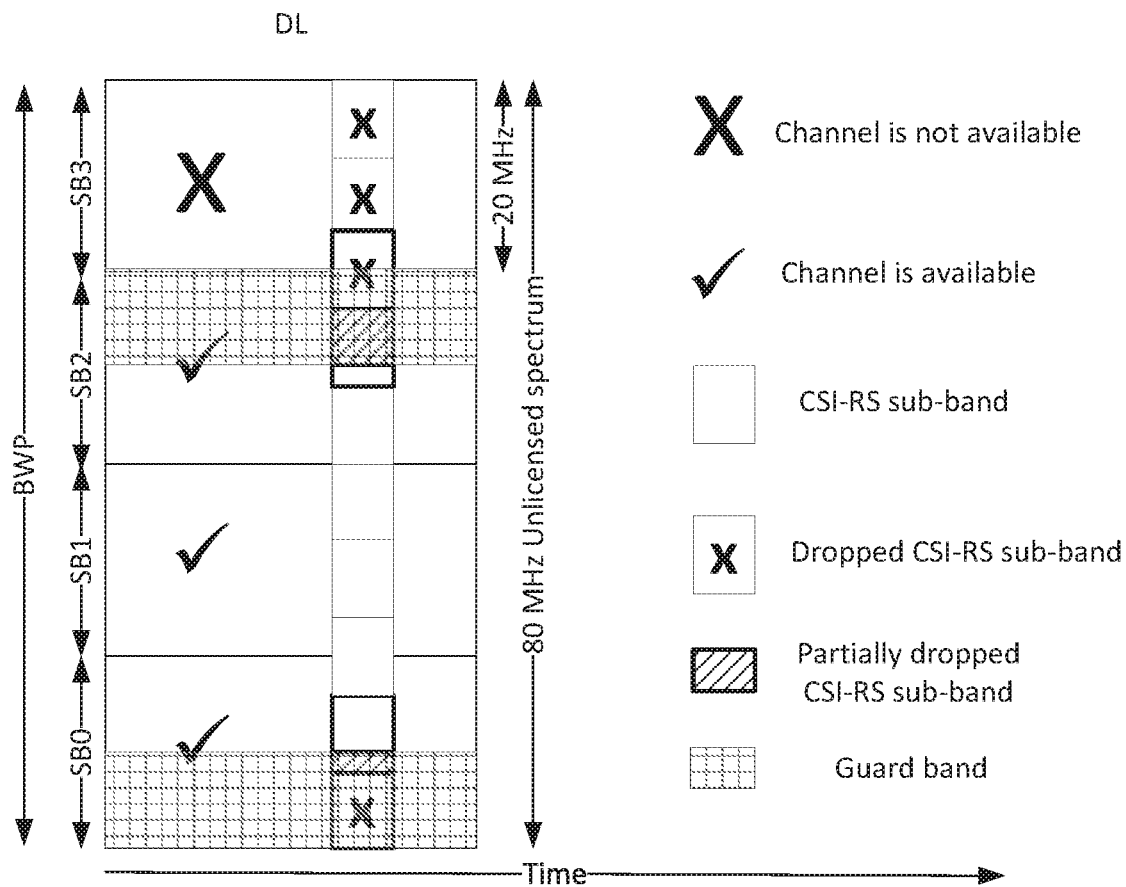
FIG. 32 illustrates and example of shrinking CSRS-SB that overlaps with available LBT sub-bands and guard bands.

Alternatively, if a CSRS-SB is fully overlapped with the guard band or it spans unavailable LBT sub-band and the guard band, i.e., CSRS-SB is at the boundary between unavailable LBT sub-band and the guard band, then UE may assume no measurements should be conducted on them and the whole CSRS-SB is dropped. However, for CSRS-SBs that span available LBT sub-band and guard band, then UE may assume that the PRBs that fully or partially fall in the guard band may not carry CSI-RS and no measurements is conducted on them. While the UE may assume that PRBs that fully fall in the available LBT sub-band may still carry CSI-RS and measurements may be conducted on them. FIG. 32 shows an example of CSRS-SB are fully overlapped with unavailable LBT sub-band or guard band or spanning both, then UE may drop them. On the other hand, for those CSRS-SBs that span available sub-band and guard band, then UE may assume that its PRBs in the available sub-band may carry CSI-RS and measurements may be conducted on those PRBs. In other word, the UE may assume that size of those CSRS-SBs are smaller than other CSRS-SBs away from the guard band.

Figure 33:
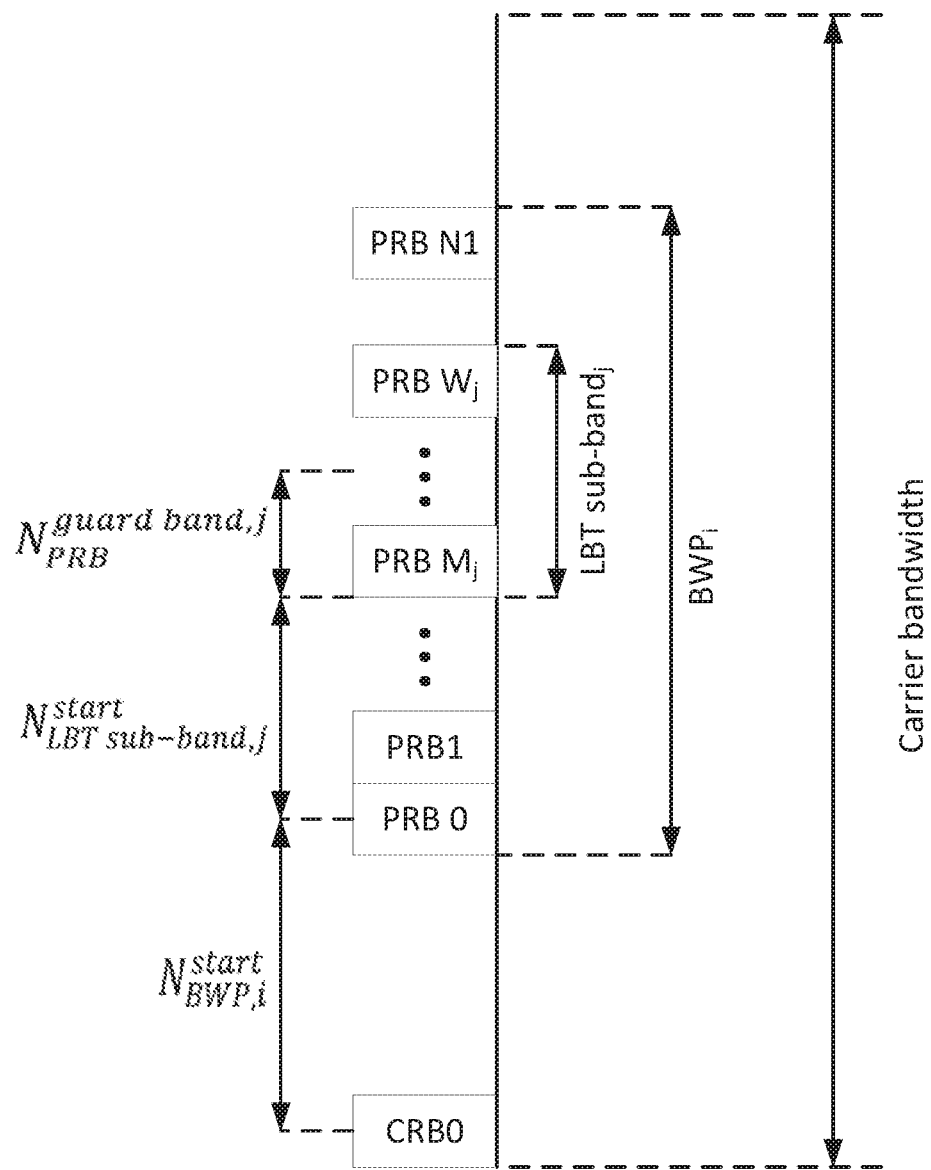
FIG. 33 illustrates and example of calculating the size of the first and last CSRS-SB.

The sizes of the first and the last CSRS-SBs may be given as function of the location of LBT sub-band, the guard band size, the location of the BWP, etc. For example, the size of the first CSRS-SB which is located in the lowest available LBT sub-band in the BWP may be given by $N_{PRB}^{CSRS-SB} - ([N_{BWP,i}^{start} + N_{LBT\ sub-band,j}^{start} + N_{PRB}^{guard\ band,j}]$ mod $N_{PRB}^{CSRS-SB})$, where $N_{PRB}^{CSRS-SB}$ is the size of CSRS-SB, $N_{BWP,i}^{start}$ is the number of PRBs from a reference PRB to the first PRB in the $BWP_i$, $N_{LBT\ sub-band,j}^{start}$ is the number of PRBs from the first PRB in the $BWP_i$ to the first PRB in the first available LBT sub-band$_j$ and $N_{PRB}^{guard\ band,j}$ is the number of PRBs that are used as guard band in LBT sub-band$_j$. FIG. 33 exemplifies those terms. If no guard band PRBs are needed, then $N_{PRB}^{guard\ band,j}$ may be set to zero.

The size of the last CSR-SB which is located in the highest available LBT sub-band$_k$ in the BWP may be given by $[N_{BWP,i}^{start} + N_{LBT\ sub-band,j}^{start} + MN_{LBT\ sub-band}^{size} - N_{PRB}^{guard\ band,k}]$ mod $N_{PRB}^{CSRS-SB}$ if $[N_{BWP,i}^{start} + N_{LBT\ sub-band,j}^{start} + MN_{LBT\ sub-band}^{size} - N_{PRB}^{guard\ band,k}]$ mod $N_{PRB}^{CSRS-SB} \neq 0$, where M is the number of contiguous available LBT sub-bands, $N_{LBT\ sub-band}^{size}$ is the size of LBT sub-band in terms of PRBs and $N_{PRB}^{guard\ band,k}$ is the number of PRBs that are used as guard band in LBT sub-band$_k$. If $[N_{BWP,i}^{start} + N_{LBT\ sub-band,j}^{start} + MN_{LBT\ sub-band}^{size} - N_{PRB}^{guard\ band,k}]$ mod $N_{PRB}^{CSRS-SB} = 0$, then size of the last CSR-SB which is located in the highest available LBT sub-band$_k$ in the BWP may be given by $N_{PRB}^{CSRS-SB}$. If the available LBT sub-bands have different sizes, then the term $MN_{LBT\ sub-band}^{size}$ may be replaced with $\Sigma_{q=1}^{M} N_{LBT\ sub-band,q}^{size}$, where $N_{LBT\ sub-band,q}^{size}$ is the size of the $q^{th}$ available LBT sub-band.

For the case of non-contiguous available LBT sub-bands, the aforementioned examples can be applied by treating available LBT sub-bands separately.

In new radio release 15, CSI-RS can be configured to occupy multiple ODSM symbols within a slot. Due to channel access uncertainty, gNB may not access the channel at the configured time domain location(s). To cope with such challenge, the following alternatives may be adopted or any of their combinations.

Figure 34:
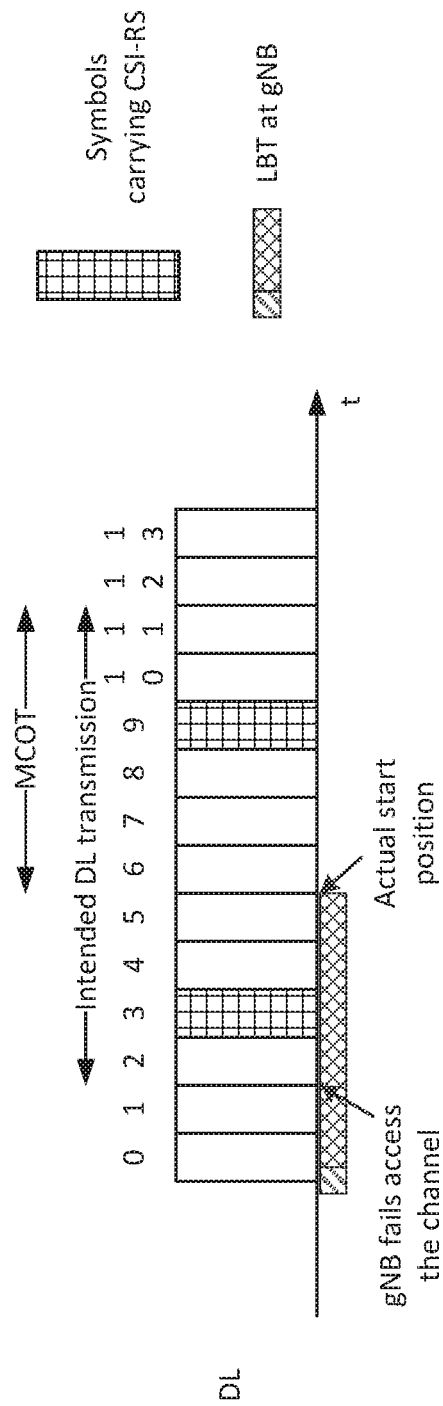
FIG. 34 illustrates and example of dropping the CSI-RS in OFDM symbols that fall before gNB successfully acquire the channel.

In first alternative, the UE may assume that CSI-RS in OFDM symbols that fall before gNB successfully acquire the channel are dropped. In other words, the UE may assume that the OFDM symbols carrying CSI-RS are punctured if gNB fails in acquiring the channel before them. For example, FIG. 34 shows an example of CSI-RS configured to be transmitted in OFDM symbols 3 and 9. In this example, gNB acquires the channel at OFDM symbol 6. Therefore, the UE may assume that OFDM symbol 3 carrying CSI-RS is punctured while OFDM symbol 9 is still carrying CSI-RS as originally configured.

As a possibly other solution, if any symbol(s) carrying CSI-RS is punctured, a UE may assume that other OFDM symbol(s) carrying CSI-RS will be punctured as well even if they fall within gNB's COT. It is worth mentioning that when we herein propose to puncture the OFDM symbol carrying CSI-RS, this OFDM symbol may still carry other DL transmission. Only the REs that are configured to carry CSI-RS in this OFDM symbol is punctured. Those REs may carry DL transmission to this UE or any other UEs. This solution may of great interest especially if CSI-RSs are time domain CDMed.

Figure 35:
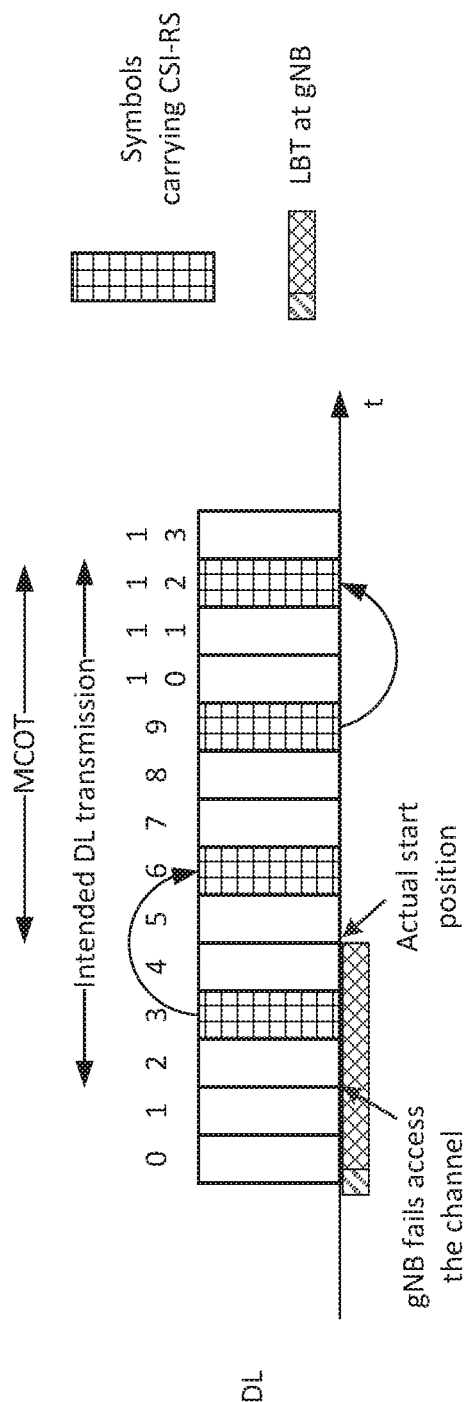
FIG. 35 illustrates and example of shifting the OFDM symbol carrying CSI-RS.

Alternatively, the UE may assume that the OFDM symbol(s) carrying CSI-RS may be shifted. The shift value can be explicitly indicated to the UE dynamically in UE-specific DCI or group-common DCI, for example. The UE specific DCI may be scrambled by C-RNIT and the group-common DCI may be scrambled with SFI-like RNTI. The shift value may be indicated by MAC-CE as well. The shift value may be implicitly indicated to the UE by noticing the time shift if any signal/channel that was supposed to be received earlier, for example, the time shift in DMRS, PSS, SSS, SSB can serve this purpose. If the OFDM symbol(s) carrying CSI-RS are shifted to fall beyond gNB MCOT, then the UE may assume that those OFDM symbols are punctured. In FIG. 35, we show an example of CSI-RS configured to be transmitted in OFDM symbols 3 and 9 and gNB failed in access the channel due to LBT failure. Consequently, when gNB acquire the channel, it may indicate a shift of 3 OFDM symbols, then the UE may assume that CSI-RS that was supposed to be transmitted in OFDM symbols 3 and 9 are transmitted in OFDM symbols 6 and 12, respectively.

Moreover, it may be beneficial to remove the time dependency in the initial sequence generator of CSI-RS. For example, the initialization sequence may be given by $$C_{init} = (2^{10}(N_{symb}^{slot} n_s^{\mu} + l + 1)(2n_{ID} + 1) + n_{ID}) \bmod 2^{31}$$

where $n_s^{\mu}$ may be the slot number relative the beginning of COT. If gNB acquired the channel in the middle of slot, then this partial slot may be counted as the first slot in gNB's COT. The parameter l is the OFDM symbol number within a slot and for the first slot in gNB's COT, l may not be smaller than the index of the first OFDM symbol in gNB's COT. The parameters $n_{ID}$ and $N_{symb}^{slot}$ are equal to high-layer parameter and the number of OFDM symbols in a slot, respectively.

Alternatively, $n_s^{\mu}$ may be the slot number within a radio frame and l may be the OFDM symbol number relative to beginning of gNB's COT. The other parameters in the equation remain the same.

In new radio release 15, a reporting CSRS-SB can be configured by a higher layer signaling carrying a bit map whose size is equal to the number of CSRS-SB in BWP. In the aforementioned solutions, if size of a CSRS-SB is reduced due to spanning available LBT sub-band and another unavailable LBT sub-band, then the indication bit corresponding to the original CSRS-SB may be used to indicate the modified CSRS-SB size. Also, for a parent CSRS-SB that is divided into two children CSRS-SBs due to spanning available LBT sub-band, the same indication bit corresponding to the original CSRS-SB may be used to indicate both children CSRS-SBs.

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHz, with cmWave and mmWave specific design optimizations.

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+ Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring andسensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, and virtual reality to name a few. All of these use cases and others are contemplated herein.

Figure 27A:
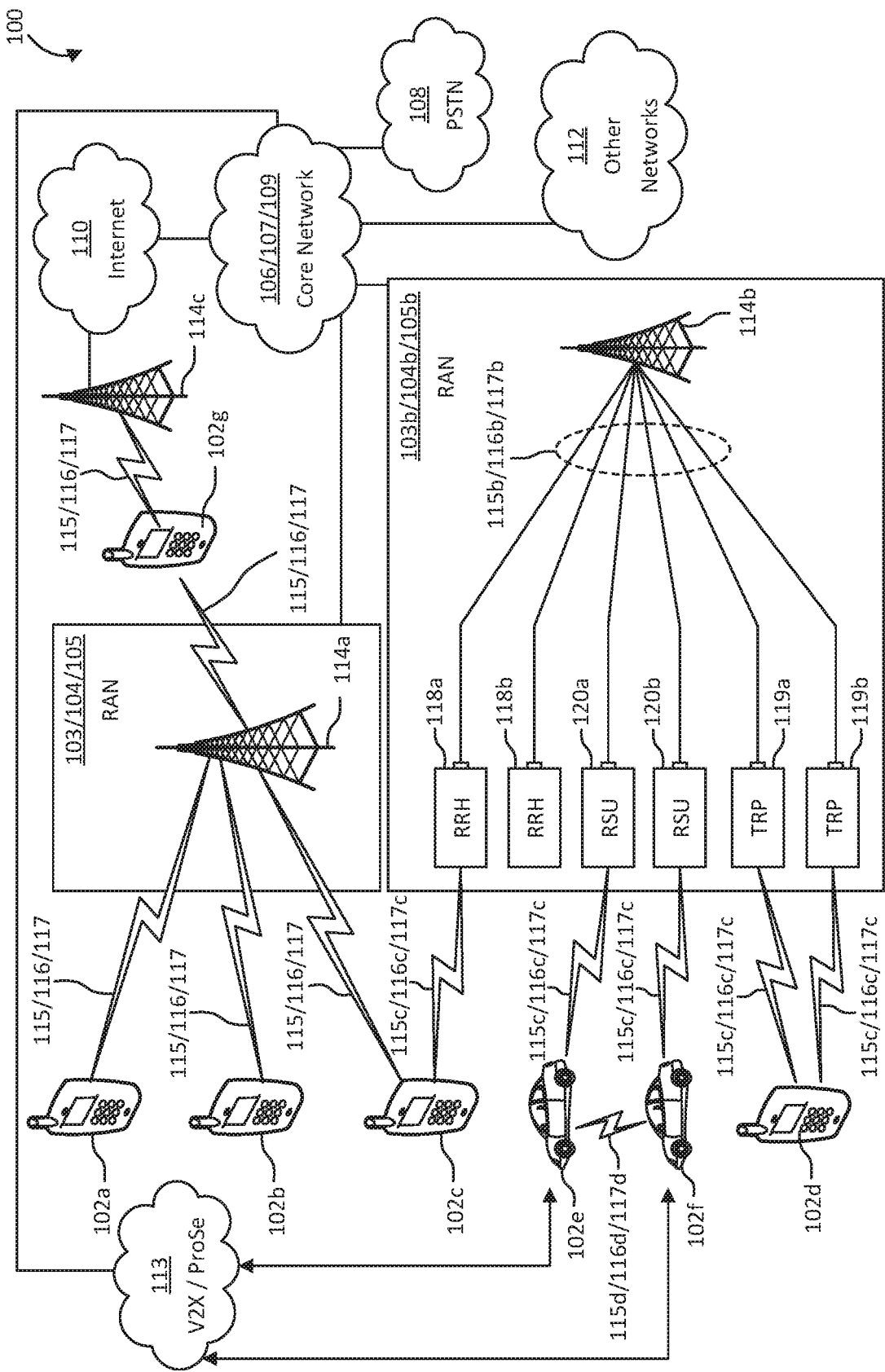
FIG. 27A illustrates an example communications system 100 in which the methods and apparatuses described and claimed herein may be embodied.

FIG. 27A illustrates one embodiment of an example communications system 100 in which the methods and apparatuses described and claimed herein may be embodied. As shown, the example communications system 100 may include wireless transmit/receive units (WTRUs) 102a, 102b, 102c, 102d, 102e, 102f, and/or 102g (which generally or collectively may be referred to as WTRU 102), a radio access network (RAN) 103/104/105/103b/104b/105b, a core network 106/107/109, a public switched telephone network (PSTN) 108, the Internet 110, other networks 112, and V2X server (or ProSe function and server) 113, though it will be appreciated that the disclosed embodiments contemplate any number of WTRUs, base stations, networks, and/or network elements. Each of the WTRUs 102a, 102b, 102c, 102d, 102e, 102f, 102g may be any type of apparatus or device configured to operate and/or communicate in a wireless environment. Although each WTRU 102a, 102b, 102c, 102d, 102e, 102f, 102g is depicted in FIGS. 1A-1E as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114a and a base station 114b. Base stations 114a may be any type of device configured to wirelessly interface with at least one of the WTRUs 102a, 102b, and 102c to facilitate access to one or more communication networks, such as the core network 106/107/109, the Internet 110, and/or the other networks 112. Base stations 114b may be any type of device configured to wiredly and/or wirelessly interface with at least one of the RRHs (Remote Radio Heads) 118a, 118b, TRPs (Transmission and Reception Points) 119a, 119b, and/or RSUs (Roadside Units) 120a, 120b to facilitate access to one or more communication networks, such as the core network 106/107/109, the Internet 110, the other networks 112, and/or V2X server (or ProSe function and server) 113. RRHs 118a, 118b may be any type of device configured to wirelessly interface with at least one of the WTRU 102c, to facilitate access to one or more communication networks, such as the core network 106/107/109, the Internet 110, and/or the other networks 112. TRPs 119a, 119b may be any type of device configured to wirelessly interface with at least one of the WTRU 102*d*, to facilitate access to one or more communication networks, such as the core network 106/107/109, the Internet 110, and/or the other networks 112. RSUs 120*a*, 120*b*, may be any type of device configured to wirelessly interface with at least one of the WTRU 102*e* or 102*f*, to facilitate access to one or more communication networks, such as the core network 106/107/109, the Internet 110, the other networks 112, and/or V2X server (or ProSe function and server) 113. By way of example, the base stations 114*a*, 114*b* may be a base transceiver station (BTS), a Node-B, an eNode B, a Home Node B, a Home eNode B, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 103/104/105, which may also include other base stations and/or network elements (not shown), such as a base station controller (BSC), a radio network controller (RNC), relay nodes, etc. The base station 114*b* may be part of the RAN 103*b*/104*b*/105*b*, which may also include other base stations and/or network elements (not shown), such as a base station controller (BSC), a radio network controller (RNC), relay nodes, etc. The base station 114*a* may be configured to transmit and/or receive wireless signals within a particular geographic region, which may be referred to as a cell (not shown). The base station 114*b* may be configured to transmit and/or receive wired and/or wireless signals within a particular geographic region, which may be referred to as a cell (not shown). The cell may further be divided into cell sectors. For example, the cell associated with the base station 114*a* may be divided into three sectors. Thus, in an embodiment, the base station 114*a* may include three transceivers, e.g., one for each sector of the cell. In an embodiment, the base station 114*a* may employ multiple-input multiple output (MIMO) technology and, therefore, may utilize multiple transceivers for each sector of the cell.

The base stations 114*a* may communicate with one or more of the WTRUs 102*a*, 102*b*, 102*c* over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114*b* may communicate with one or more of the RRHs 118*a*, 118*b*, TRPs 119*a*, 119*b*, and/or RSUs 120*a*, 120*b*, over a wired or air interface 115*b*/116*b*/117*b*, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115*b*/116*b*/117*b* may be established using any suitable radio access technology (RAT).

The RRHs 118*a*, 118*b*, TRPs 119*a*, 119*b* and/or RSUs 120*a*, 120*b*, may communicate with one or more of the WTRUs 102*c*, 102*d*, 102*e*, 102*f* over an air interface 115*c*/116*c*/117*c*, which may be any suitable wireless communication link (e.g., radio frequency (RF), microwave, infrared (IR), ultraviolet (UV), visible light, cmWave, mmWave, etc.). The air interface 115*c*/116*c*/117*c* may be established using any suitable radio access technology (RAT).

The WTRUs 102*a*, 102*b*, 102*c*, 102*d*, 102*e*, 102*f*, and/or 102*g* may communicate with one another over an air interface 115*d*/116*d*/117*d* (not shown in the figures), which may be any suitable wireless communication link (e.g., radio frequency (RF), microwave, infrared (IR), ultraviolet (UV), visible light, cmWave, mmWave, etc.). The air interface 115*d*/116*d*/117*d* may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 103/104/105 and the WTRUs 102*a*, 102*b*, 102*c*, or RRHs 118*a*, 118*b*, TRPs 119*a*, 119*b* and RSUs 120*a*, 120*b*, in the RAN 103*b*/104*b*/105*b* and the WTRUs 102*c*, 102*d*, 102*e*, 102*f*, may implement a radio technology such as Universal Mobile Telecommunications System (UMTS) Terrestrial Radio Access (UTRA), which may establish the air interface 115/116/117 or 115*c*/116*c*/117*c* respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114*a* and the WTRUs 102*a*, 102*b*, 102*c*, or RRHs 118*a*, 118*b*, TRPs 119*a*, 119*b*, and/or RSUs 120*a*, 120*b* in the RAN 103*b*/104*b*/105*b* and the WTRUs 102*c*, 102*d*, may implement a radio technology such as Evolved UMTS Terrestrial Radio Access (E-UTRA), which may establish the air interface 115/116/117 or 115*c*/116*c*/117*c* respectively using Long Term Evolution (LTE) and/or LTE-Advanced (LTE-A). In the future, the air interface 115/116/117 may implement 3GPP NR technology. The LTE and LTE-A technology includes LTE D2D and V2X technologies and interface (such as Sidelink communications, etc.) The 3GPP NR technology includes NR V2X technologies and interface (such as Sidelink communications, etc.)

In an embodiment, the base station 114*a* in the RAN 103/104/105 and the WTRUs 102*a*, 102*b*, 102*c*, or RRHs 118*a*, 118*b*, TRPs 119*a*, 119*b* and/or RSUs 120*a*, 120*b* in the RAN 103*b*/104*b*/105*b* and the WTRUs 102*c*, 102*d*, 102*e*, 102*f* may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*c* in FIG. 27A may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114*c* and the WTRUs 102*e*, may implement a radio technology such as IEEE 802.11 to establish a wireless local area network (WLAN). In an embodiment, the base station 114*c* and the WTRUs 102*d*, may implement a radio technology such as IEEE 802.15 to establish a wireless personal area network (WPAN). In yet another embodiment, the base station 114*c* and the WTRUs 102*e*, may utilize a cellular-based RAT (e.g., WCDMA, CDMA2000, GSM, LTE, LTE-A, etc.) to establish a picocell or femtocell. As shown in FIG. 27A, the base station 114*b* may have a direct connection to the Internet 110. Thus, the base station 114*c* may not be required to access the Internet 110 via the core network 106/107/109.

The RAN 103/104/105 and/or RAN 103*b*/104*b*/105*b* may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication.

Although not shown in FIG. 27A, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d, 102e to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103b/104b/105b or a different RAT.

Some or all of the WTRUs 102a, 102b, 102c, 102d in the communications system 100 may include multi-mode capabilities, e.g., the WTRUs 102a, 102b, 102c, 102d, and 102e may include multiple transceivers for communicating with different wireless networks over different wireless links. For example, the WTRU 102e shown in FIG. 27A may be configured to communicate with the base station 114a, which may employ a cellular-based radio technology, and with the base station 114c, which may employ an IEEE 802 radio technology.

Figure 27B:
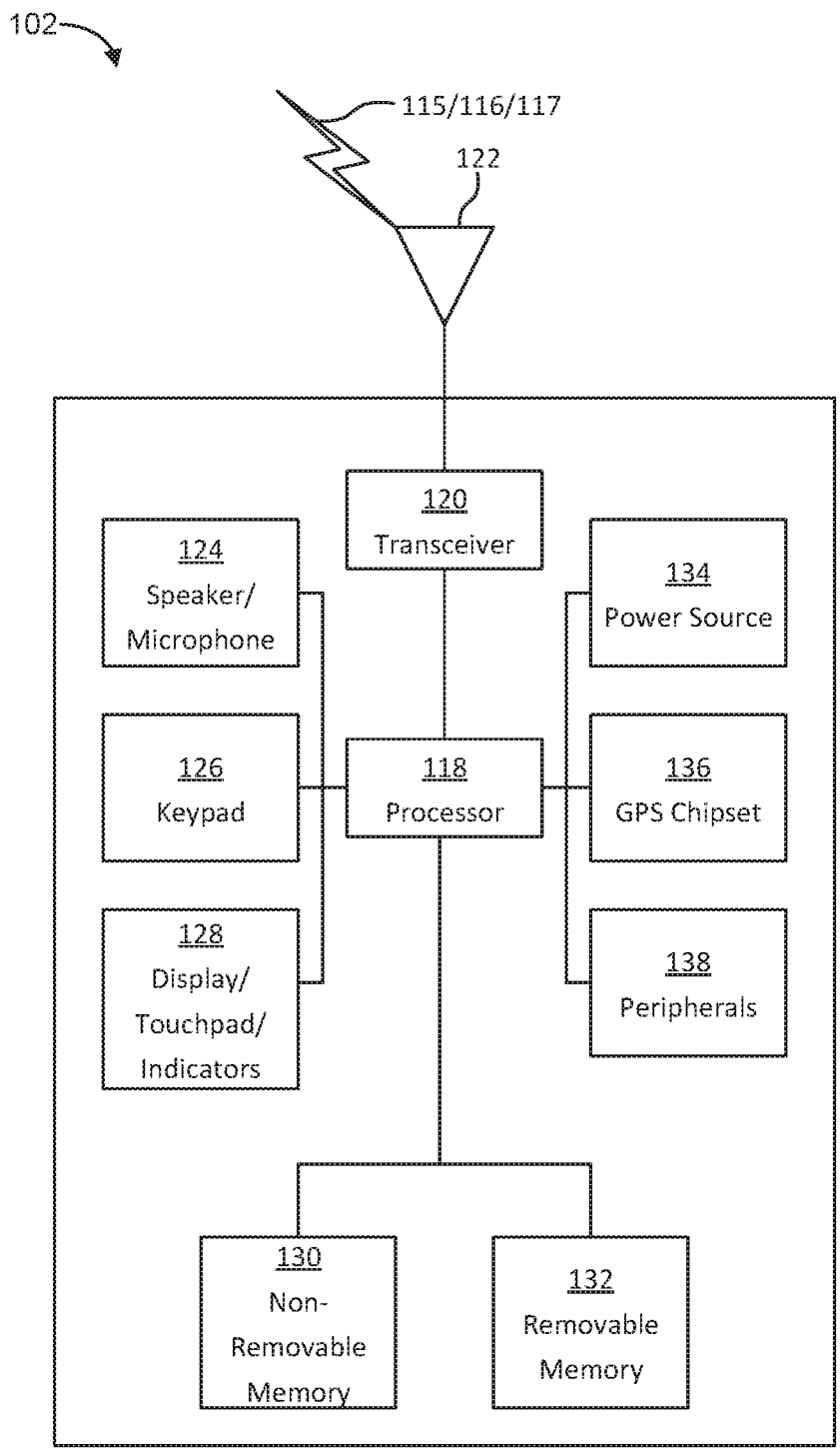
FIG. 27B is a block diagram of an example apparatus or device configured for wireless communications in accordance with the embodiments illustrated herein.

FIG. 27B is a block diagram of an example apparatus or device configured for wireless communications in accordance with the embodiments illustrated herein, such as for example, a WTRU 102. As shown in FIG. 27B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 27B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 27B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 27B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality, and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 27C:
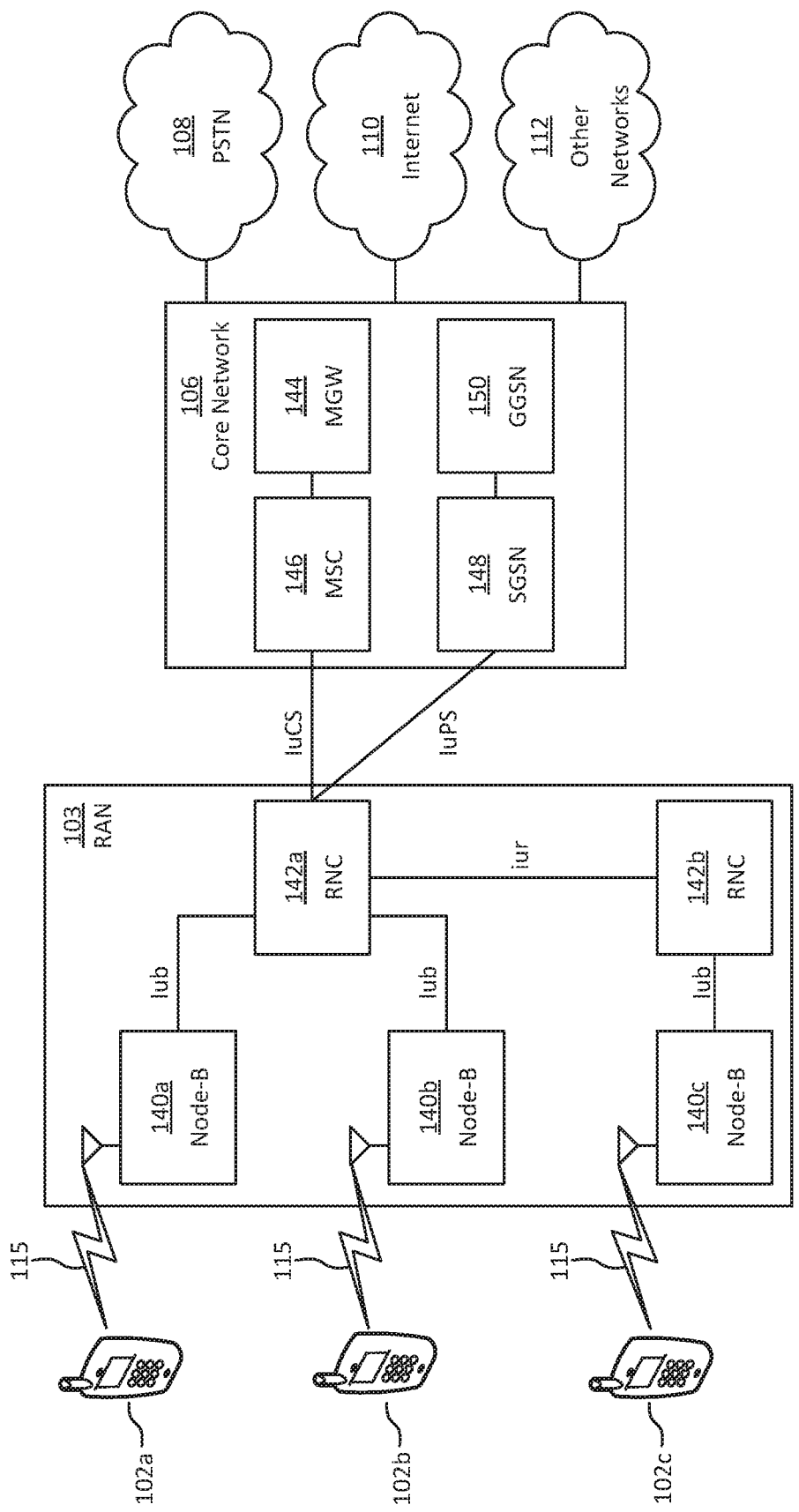
FIG. 27C is a system diagram of an example the radio access network and core network.

FIG. 27C is a system diagram of the RAN 103 and the core network 106 according to an embodiment. As noted above, the RAN 103 may employ a UTRA radio technology to communicate with the WTRUs 102a, 102b, and 102c over the air interface 115. The RAN 103 may also be in communication with the core network 106. As shown in FIG. 27C, the RAN 103 may include Node-Bs 140a, 140b, 140c, which may each include one or more transceivers for communicating with the WTRUs 102a, 102b, and 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 27C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 27C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c, and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 27D:
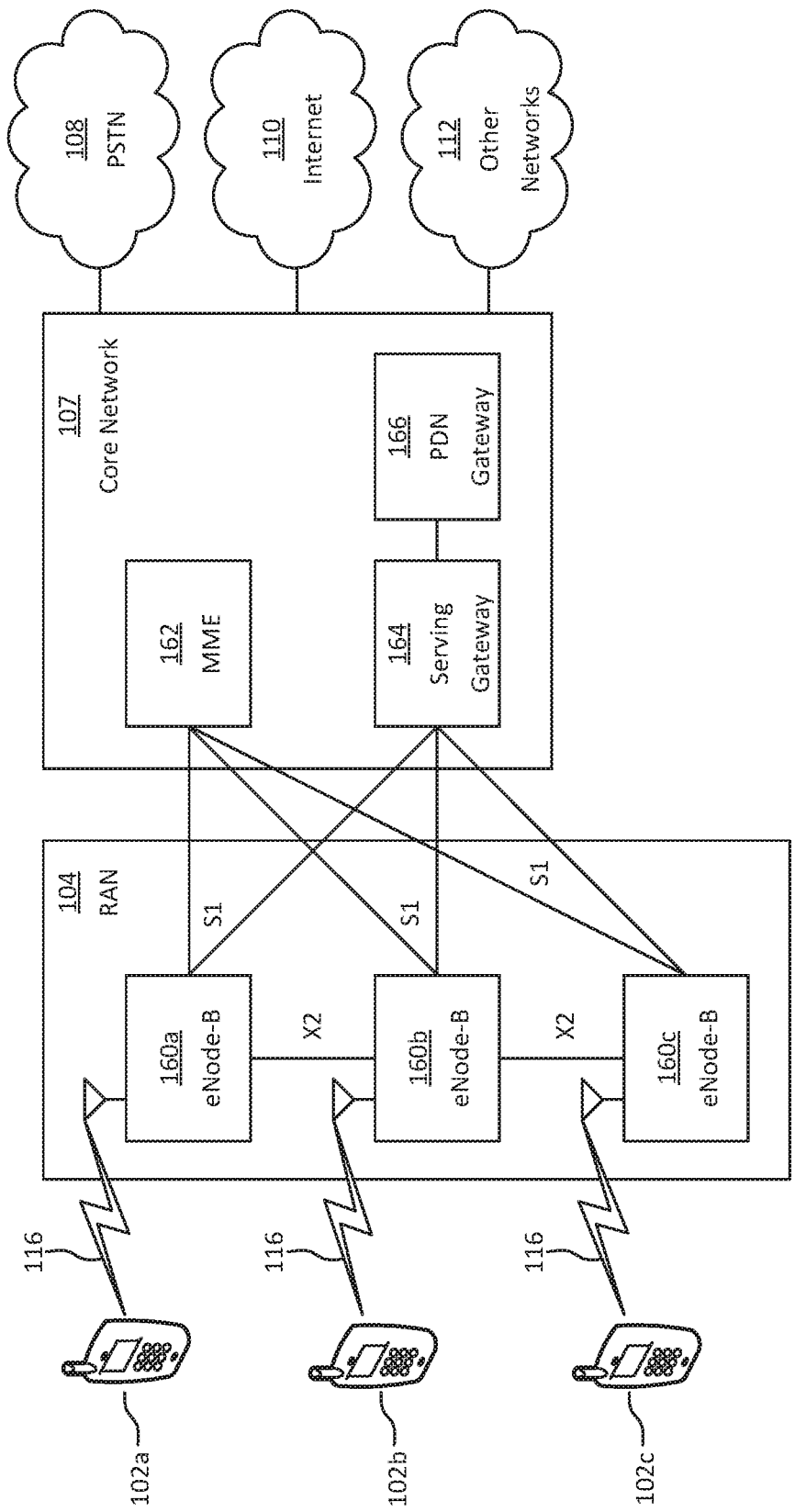
FIG. 27D is a system diagram of another example the radio access network and core network.

FIG. 27D is a system diagram of the RAN 104 and the core network 107 according to an embodiment. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 27D, the eNode-Bs 160a, 160b, 160c may communicate with one another over an X2 interface.

The core network 107 shown in FIG. 27D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c, and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c, and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 27E:
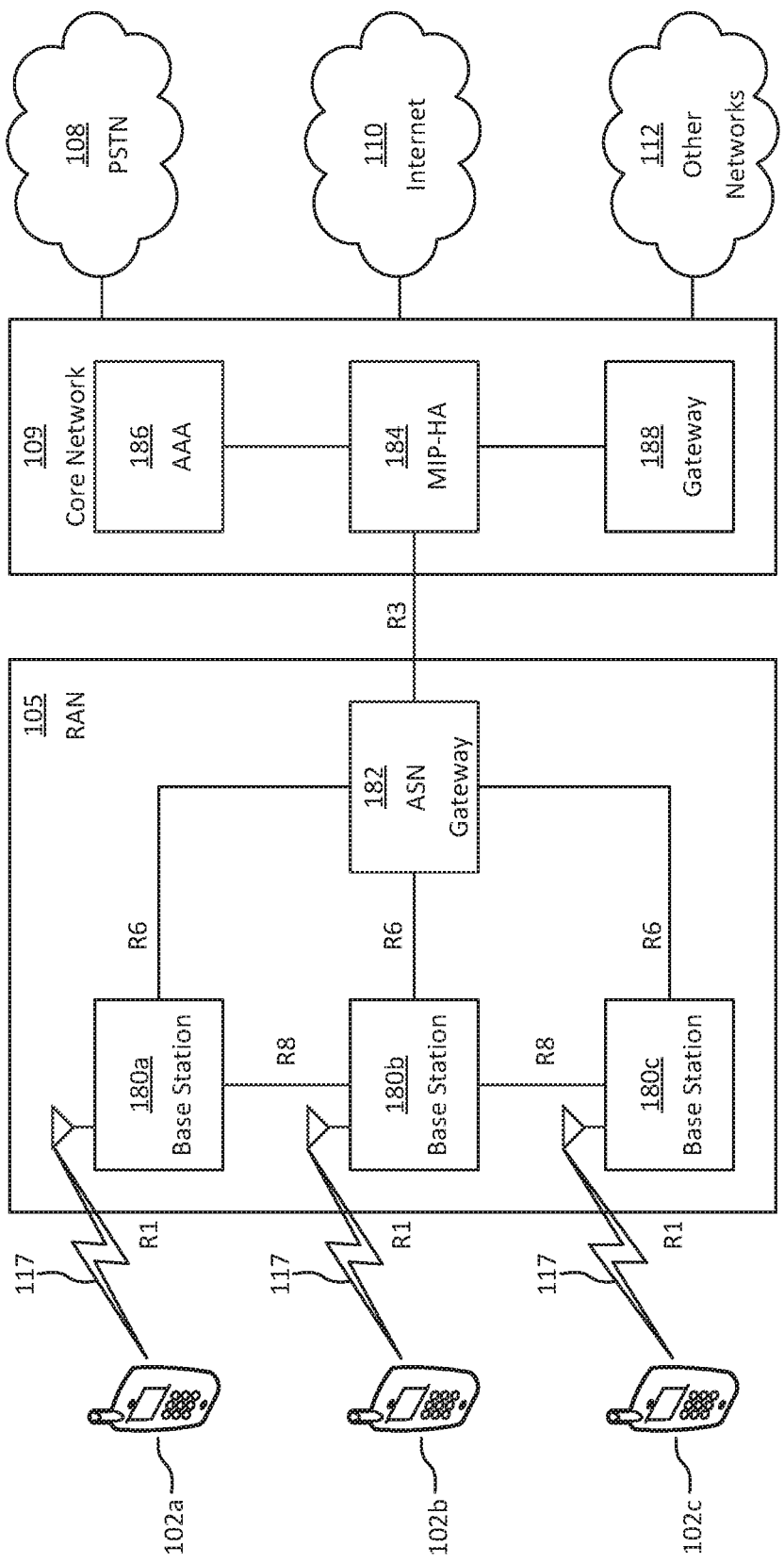
FIG. 27E is a system diagram of a third example radio access network and core network.

FIG. 27E is a system diagram of the RAN 105 and the core network 109 according to an embodiment. The RAN 105 may be an access service network (ASN) that employs IEEE 802.16 radio technology to communicate with the WTRUs 102a, 102b, and 102c over the air interface 117. As will be further discussed below, the communication links between the different functional entities of the WTRUs 102a, 102b, 102c, the RAN 105, and the core network 109 may be defined as reference points.

As shown in FIG. 27E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell in the RAN 105 and may include one or more transceivers for communicating with the WTRUs 102a, 102b, 102c over the air interface 117. In an embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 27E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c, and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c, and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 27E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 1A, 1C, 1D, and 1E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 1A, 1B, 1C, 1D, and 1E are provided by way of example only, and it is understood that the subject matter disclosed and claimed herein may be embodied or implemented in any similar communication system, whether presently defined or defined in the future.

Figure 27F:
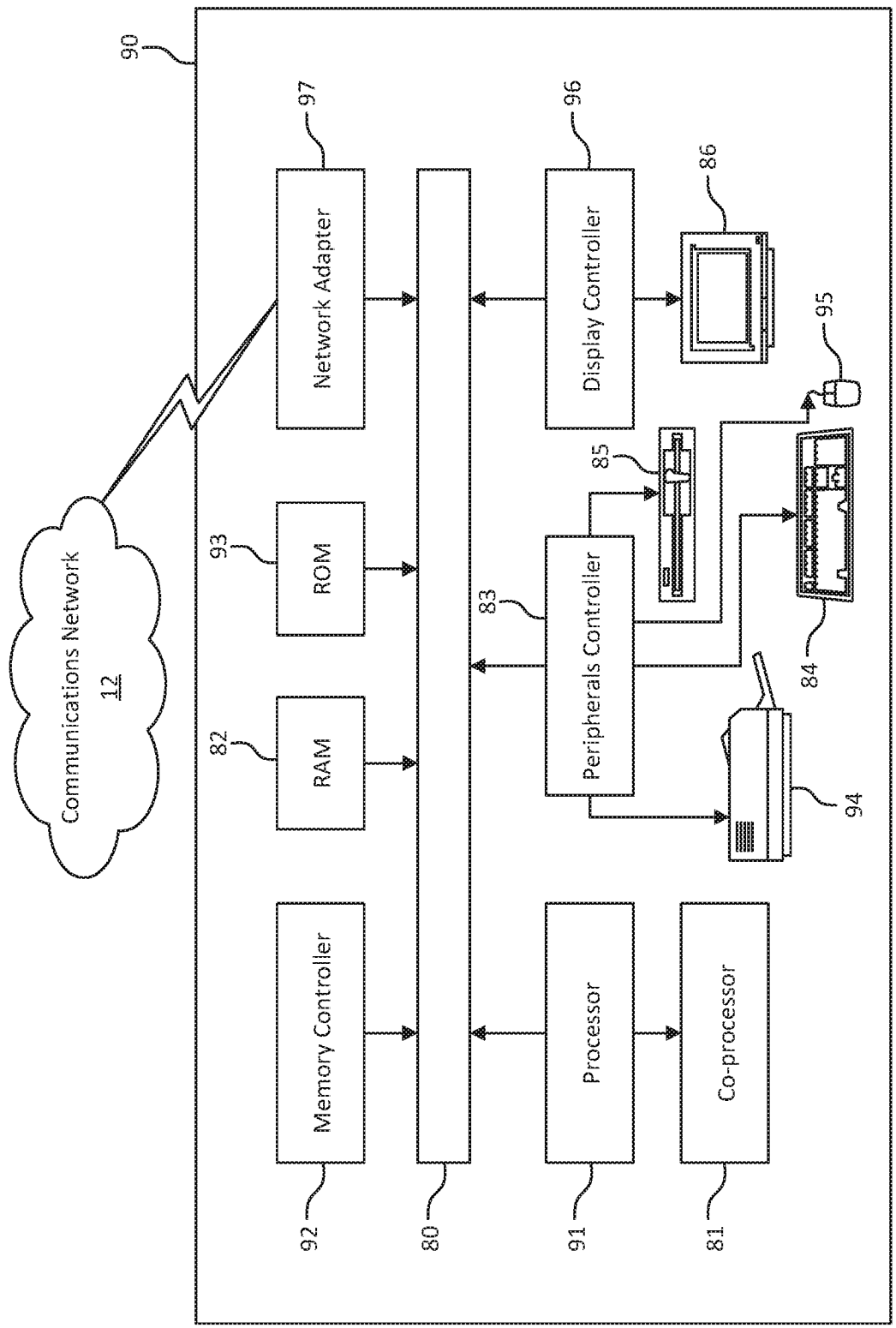
FIG. 27F is a block diagram of an exemplary computing system in which one or more apparatuses of the communications networks illustrated in FIGS. 18A, 18C, 18D, and 18E may be embodied.

FIG. 27F is a block diagram of an exemplary computing system 90 in which one or more apparatuses of the communications networks illustrated in FIGS. 1A, 1C, 1D and 1E may be embodied, such as certain nodes or functional entities in the RAN 103/104/105, Core Network 106/107/109, PSTN 108, Internet 110, or Other Networks 112. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 1A, 1B, 1C, 1D, and 1E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

Figure 27G:
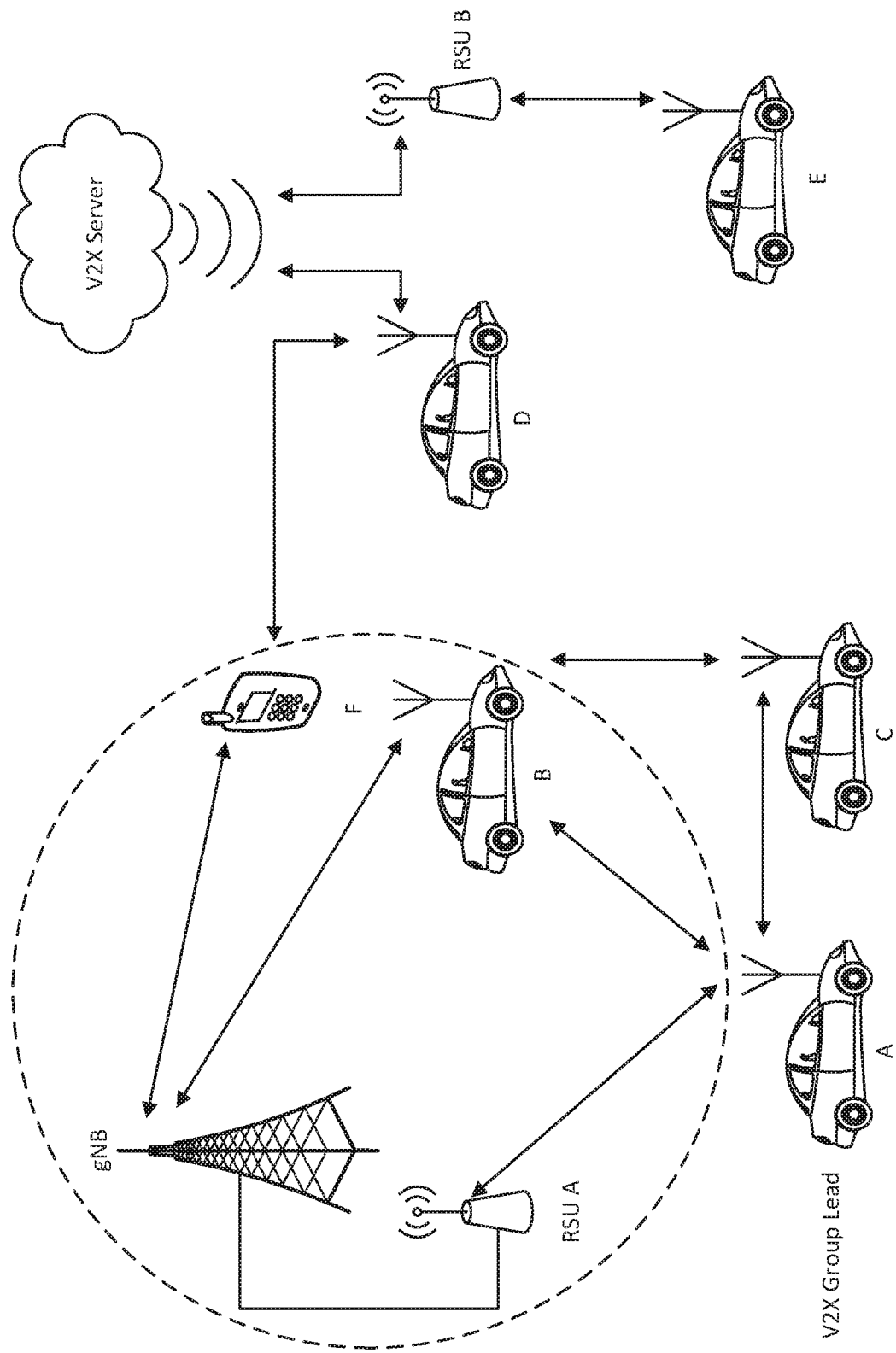
FIG. 27G illustrates an example communications system 111 in which the methods and apparatuses described and claimed herein may be embodied.

FIG. 27G illustrates one embodiment of an example communications system 111 in which the methods and apparatuses described and claimed herein may be embodied. As shown, the example communications system 111 may include wireless transmit/receive units (WTRUs) A, B, C, D, E, F, a base station, a V2X server, and a RSUs A and B, though it will be appreciated that the disclosed embodiments contemplate any number of WTRUs, base stations, networks, and/or network elements. One or several or all WTRUs A, B, C, D, E can be out of range of the network (for example, in the figure out of the cell coverage boundary shown as the dash line). WTRUs A, B, C form a V2X group, among which WTRU A is the group lead and WTRUs B and C are group members. WTRUs A, B, C, D, E, and F may communicate over Uu interface or Sidelink (PC5) interface.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations, or functions described herein may be implemented in the form of such computer executable instructions, executing on the processor of an apparatus or computing system configured for wireless and/or wired network communications. Computer readable storage media include volatile and nonvolatile, removable and non-removable media implemented in any non-transitory (e.g., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

TABLE 0

Acronyms

| | |
|---|---|
| BA | Bandwidth adaptation |
| BFRQ | Beam failure recovery request |
| BWP | Bandwidth Part |
| CA | Carrier aggregation |
| CCA | Clear channel assessment |
| CCE | Control channel elements |
| CORESET | Control resource set |
| C-RNTI | Cell-radio network temporary identifier |
| C-RNTI | Cell Radio-Network Temporary Identifier |
| DC | Dual connectivity |
| DCI | DL Control Information |
| DL | Downlink |
| DMRS | Demodulation reference signal |
| FDD | Frequency- division-duplexing |
| LAA | Licensed-assisted access |
| LBT | Listen Before Talk |
| LTE | Long Term Evolution |
| MAC | Medium Access Control |
| MAC-CE | Medium access control-control element |
| MCOT | Maximum Channel Occupancy Time |
| NR | New Radio |
| NR-U | New radio unlicensed |
| OFDM | Orthogonal Frequency Division Multiplexing |
| Pcell | Primary cell |
| PDCCH | Physical Downlink Control Channel |
| PHY | Physical Layer |
| PRACH | Physical random access channel |
| PRB | Physical resource blocks |
| PSS | Primary synchronization signal |
| PUCCH | Physical uplink control channel |
| PUSCH | Physical uplink shared channel |
| QCL | Quasi co-located |
| RACH | Random access channel |
| RAN | Radio Access Network |
| RAR | Random access response |
| RA-RNTI | Rach-RNTI |
| REG | Resource element groups |
| RRC | Radio Resource Control |
| RS | Reference signal |
| SB | Sub-band |
| SB_act-RNTI | SB_act_radio network temporary identified |
| SBI-RNTI | Sub-band indication- radio network temporary identifier |
| SCells | Secondary cells |
| SI-RNTI | System information-radio network temporary identifier |
| SRS | Sounding reference signal |
| SS | Search space |
| TDD | Time-division-duplexing |
| UE | User Equipment |
| UL | Uplink |

TABLE 1

SB IE field descriptions

SB-Id

An identifier for this SB. Other parts of the RRC configuration may use the SB-Id to associate themselves with a particular SB.
cyclicPrefix Indicates whether to use the extended cyclic prefix for SB. If not set, the UE may use the normal cyclic prefix.
locationAndBandwidth Frequency domain location and bandwidth of this SB. Here the start of SB and the number of consecutive PRBs constructing SBs may be indicated using a single value, e.g., resource indicator value (RIV)-like. The start of the SB may be relative to BWP containing this SB, or it may be relative to the actual component carrier containing the BWP and its SBs.
subcarrierSpacing Subcarrier spacing to be used in this SB for all channels and reference signals unless explicitly configured elsewhere.

TABLE 2

Sub-band configurations example

| Index | Configurations |
|---|---|
| 0 | SB0 |
| 1 | SB1 |
| 2 | SB3 |
| 3 | SB4 |
| 4 | SB0 + SB1 |
| 5 | SB0 + SB3 |
| . | . |
| . | . |
| . | . |
| K-2 | SB0 + SB1 + SB3 |
| K-1 | SB0 + SB1 + SB2 |
| K | SB0 + SB1 + SB2 + SB3 |

Example Information Element 1

SB Information Element

```
-- ASN1START
-- TAG-SubBand-START
SB ::=                      SEQUENCE {
    SB-Id                   SB-ID,
    locationAndBandwidth    INTEGER (0..37949),
    subcarrierSpacing       SubcarrierSpacing,
    cyclicPrefix            ENUMERATED { extended }
    OPTIONAL    -- Need R
}
-- TAG-SubBand-STOP
-- ASN1STOP
```

Example Information Element 2

SB-List Information Element

```
-- ASN1START
-- TAG-SubBandList-START
SB-List ::=                 SEQUENCE {
    SB-List-Id              SB-List-Id,
SB ::=                      SEQUENCE {
    SB-Id                   SB-ID,
    locationAndBandwidth    INTEGER (0..37949),
    subcarrierSpacing       SubcarrierSpacing,
    cyclicPrefix            ENUMERATED { extended }
    OPTIONAL    -- Need R
}
SB ::=                      SEQUENCE {
    SB-Id                   SB-ID,
    locationAndBandwidth    INTEGER (0..37949),
    subcarrierSpacing       SubcarrierSpacing,
    cyclicPrefix            ENUMERATED { extended }
    OPTIONAL    -- Need R
}
...
}
-- TAG-SubBandList-STOP
-- ASN1STOP
```

Example Information Element 3

BWP_SB_Configs Information Element

```
-- ASN1START
-- TAG-BWP_SB_Configs-START
BWP-SB-Configs ::=           SEQUENCE {
    BWP-SB-Confis-Id         BWP-SB-Confis-Id,
Config ::=                   SEQUENCE {
    SB-Config-Id             SB-Config-Id,
    locationAndBandwidth     INTEGER (0..37949),
    subcarrierSpacing        SubcarrierSpacing,
    cyclicPrefix             ENUMERATED { extended }
        OPTIONAL   -- Need R
}
Config ::=                   SEQUENCE {
    SB-Config-Id             SB-Config-Id,
    locationAndBandwidth     INTEGER (0..37949),
    subcarrierSpacing        SubcarrierSpacing,
    cyclicPrefix             ENUMERATED { extended }
        OPTIONAL   -- Need R
}
...
}
--TAG- BWP_SB_Configs-STOP
-- ASN1STOP
```

Example Information Element 4

ControlResourceSetReMapping Information Element

```
-- ASN1START
-- TAG-ControlResourceSetReMapping-START
ControlResourceSetReMapping ::=                 SEQUENCE {
    ControlResourceSetReMappingId               ControlResourceSetReMappingId,
    controlResourceSetId                        ControlResourceSetId,
    OldSB-Id                                    SEQUENCE (SIZE(1..maxNrofSB)) OF SB-ID,
    NewSB-Id                                    SEQUENCE (SIZE(1..maxNrofSB)) OF SB-ID,
    frequencyDomainResources                    BIT STRING (SIZE (45)),
    duration                                    INTEGER (1..maxCoReSetDuration),
    cce-REG-MappingType                         CHOICE {
        interleaved                             SEQUENCE {
            reg-BundleSize                      ENUMERATED {n2, n3, n6},
            interleaverSize                     ENUMERATED {n2, n3, n6},
            shiftIndex                          INTEGER(0..maxNrofPhysicalResourceBlocks-1)
                OPTIONAL   -- Need S
        },
        nonInterleaved                          NULL
    },
    precoderGranularity                         ENUMERATED {sameAsREG-bundle, allContiguousRBs},
    tci-StatesPDCCH-ToAddList                   SEQUENCE(SIZE (1..maxNrofTCI-StatesPDCCH)) OF
TCI-StateId                                     OPTIONAL,   -- Need N
    NewSBtci-StatesPDCCH-ToReleaseList                      SEQUENCE(SIZE (1..maxNrofTCI-StatesPDCCH))
OF TCI-StateId                                  OPTIONAL,   -- Need N
    tci-PresentInDCI                            ENUMERATED {enabled}
        OPTIONAL,   -- Need S
    pdcch-DMRS-ScramblingID                     INTEGER (0..65535)
        OPTIONAL,   -- Need S
    ...
}
-- TAG-ControlResourceSetReMapping-STOP
-- ASN1STOP
```

Example Information Element 5

ControlResourceSetReMappingV2 Information Element

```
-- ASN1START
-- TAG-ControlResourceSetReMappingV2-START
ControlResourceSetReMappingV2 ::=               SEQUENCE {
    ControlResourceSetReMappingV2Id             ControlResourceSetReMappingV2Id,
    controlResourceSetId                        ControlResourceSetId,
    BWP-SB-Confis-Id                            SEQUENCE (SIZE(1..maxNrofSB_configsBWP)) OF BWP-SB-Confis-
Id,
CORESET_Remapping ::=                           SEQUENCE {
    CORESET_Remapping-Id                        CORESET_Remapping-Id
    BWP-SB-Confis-Id                            BWP-SB-Confis-Id
    frequencyDomainResources                    BIT STRING (SIZE (45)),
    duration                                    INTEGER (1..maxCoReSetDuration),
    cce-REG-MappingType                         CHOICE {
        interleaved                             SEQUENCE {
            reg-BundleSize                      ENUMERATED {n2, n3, n6},
            interleaverSize                     ENUMERATED {n2, n3, n6},
            shiftIndex                          INTEGER(0..maxNrofPhysicalResourceBlocks-1)
```

```
                OPTIONAL   -- Need S
        },
            nonInterleaved                           NULL
    },
    precoderGranularity                              ENUMERATED {sameAsREG-bundle, allContiguousRBs},
    tci-StatesPDCCH-ToAddList                              SEQUENCE(SIZE (1..maxNrofTCI-StatesPDCCH)) OF
TCI-StateId                         OPTIONAL, -- Need N
    NewSBtci-StatesPDCCH-ToReleaseList                     SEQUENCE(SIZE (1..maxNrofTCI-StatesPDCCH))
OF TCI-StateId                      OPTIONAL, -- Need N
tci-PresentInDCI                             ENUMERATED {enabled}
    OPTIONAL,  -- Need S
    pdcch-DMRS-ScramblingID                      INTEGER (0..65535)
    OPTIONAL,   -- Need S
        ...
}
...
}
-- TAG-ControlResourceSetReMappingV2-STOP
-- ASN1STOP
```

Example Information Element 6

SearchSpaceSB Information Element

```
-- ASN1START
-- TAG-SEARCHSPACESB-START
SearchSpaceSB ::=                   SEQUENCE {
    searchSpaceId                   SearchSpaceId,
    controlResourceSetId            ControlResourceSetId
    OPTIONAL,   -- Cond SetupOnly
    SB-Id                           SEQUENCE (SIZE(1..maxNrofSB)) OF SB-ID,
    monitoringSlotPeriodicityAndOffset       CHOICE {
        sl1                             NULL,
        sl2                             INTEGER (0..1),
        sl4                             INTEGER (0..3),
        sl5                         INTEGER (0..4),
        sl8                             INTEGER (0..7),
        sl10                        INTEGER (0..9),
        sl16                            INTEGER (0..15),
        sl20                            INTEGER (0..19),
        sl40                            INTEGER (0..39),
        sl80                        INTEGER (0..79),
        sl160                           INTEGER (0..159),
        sl320                           INTEGER (0..319),
        sl640                           INTEGER (0..639),
        sl1280                          INTEGER (0..1279),
        sl2560                          INTEGER (0..2559)
    }                                                       OPTIONAL,
    -- Cond Setup
    duration                        INTEGER (2..2559)
    OPTIONAL,  -- Need R
    monitoringSymbolsWithinSlot              BIT STRING (SIZE (14))
            OPTIONAL,   -- Cond Setup
    nrofCandidates                  SEQUENCE {
        aggregationLevel1               ENUMERATED {n0, n1, n2, n3, n4, n5, n6, n8},
        aggregationLevel2               ENUMERATED {n0, n1, n2, n3, n4, n5, n6, n8},
        aggregationLevel4               ENUMERATED {n0, n1, n2, n3, n4, n5, n6, n8},
        aggregationLevel8               ENUMERATED {n0, n1, n2, n3, n4, n5, n6, n8},
        aggregationLevel16              ENUMERATED {n0, n1, n2, n3, n4, n5, n6, n8}
    }                                                       OPTIONAL,
    -- Cond Setup
    searchSpaceType                 CHOICE {
        common                      SEQUENCE {
            dci-Format0-0-AndFormat1-0              SEQUENCE {
                ...
            }                                       OPTIONAL,
    -- Need R
            dci-Format2-0                   SEQUENCE {
                nrofCandidates-SFI              SEQUENCE {
                    aggregationLevel1               ENUMERATED {n1, n2}
        OPTIONAL,  -- Need R
                    aggregationLevel2               ENUMERATED {n1, n2}
        OPTIONAL,  -- Need R
                    aggregationLevel4               ENUMERATED {n1, n2}
        OPTIONAL,  -- Need R
```

```
                aggregationLevel8           ENUMERATED {n1, n2}
       OPTIONAL,  -- Need R
                aggregationLevel16          ENUMERATED {n1, n2}
       OPTIONAL   -- Need R
             },
             ...
           }                                 OPTIONAL,
 -- Need R
        dci-Format2-1                   SEQUENCE {
             ...
           }                                 OPTIONAL,
 -- Need R
        dci-Format2-2                   SEQUENCE {
             ...
           }                                 OPTIONAL,
 -- Need R
        dci-Format2-3                   SEQUENCE {
            monitoringPeriodicity            ENUMERATED {n1, n2, n4, n5, n8, n10, n16, n20 }
                OPTIONAL,  -- Cond Setup
            nrofPDCCH-Candidates             ENUMERATED {n1, n2},
             ...
           }                                 OPTIONAL
 -- Need R
        },
        ue-Specific                     SEQUENCE {
            dci-Formats                      ENUMERATED {formats0-0-And-1-0, formats0-1-And-1-
1},
             ...
         }
      }                                      OPTIONAL
   -- Cond Setup
}
-- TAG-SEARCHSPACESB-STOP
-- ASN1STOP
```

We claim:

1. An apparatus, comprising a processor, a memory, and communication circuitry, the apparatus being connected to a network via the communication circuitry, the apparatus further comprising computer-executable instructions stored in the memory which, when executed by the processor, cause the apparatus to:

receive, from a base station, downlink control information (DCI) comprising one or more bitmapped sub-band (SB) indications indicating one or more SB configurations;

perform measurements using a first channel state information-reference signal (CSI-RS) received in one or more orthogonal frequency division multiplexing (OFDM) symbols, wherein the first CSI-RS is received in a first channel successfully acquired by the base station; and cancel reception of a second CSI-RS in one or more OFDM symbols, wherein the second CSI-RS reception falls outside the first channel successfully acquired by the base station.

2. The apparatus of claim 1, wherein the instructions further cause the apparatus to determine whether the OFDM symbols are successfully acquired is based on the one or more bitmapped SB indications.

3. The apparatus of claim 1, wherein the instructions further cause the apparatus to determine a listen-before-talk (LBT) type from a Random Access Response (RAR).

4. The apparatus of claim 1, wherein the apparatus is a wireless transmit/receive unit (WTRU).

5. The apparatus of claim 4, wherein the unavailable sub-band is an LBT sub-band that is indicated to be unavailable based on the LBT outcome of the base station.

6. The apparatus of claim 1, wherein the one or more SB indications is associated with a resource block (RB), wherein the instructions further cause the apparatus to periodically receive new DCI, wherein one or more new DCI indicate a change in available sub-bands.

7. An apparatus, comprising a processor, a memory, and communication circuitry, the apparatus being connected to a network via the communication circuitry, the apparatus further comprising computer-executable instructions stored in the memory which, when executed by the processor, cause the apparatus to:

receive, from a base station, downlink control information (DCI) comprising one or more sub-band (SB) indications indicating one or more SB configurations; and determine whether a first channel state information reference signal (CSI-RS) is canceled based on the DCI and at least in part on a second CSI RS, where sub-bands cross a boundary between an available and an unavailable listen-before-talk (LBT) sub-band.

8. The apparatus of claim 7, wherein the instructions further cause the apparatus to determine that group of Physical Resource Blocks (PRBs) is invalid based at least in part on whether a PRB of the group of PRBs overlaps a guard band.

9. The apparatus of claim 7, wherein the instructions further cause the apparatus to determine a listen-before-talk (LBT) type from a Random Access Response (RAR).

10. The apparatus of claim 7, wherein the one or more SB indications is associated with a resource block (RB), wherein the unavailable sub-band is an LBT sub-band that is indicated to be unavailable based on the LBT outcome of the base station.

11. The apparatus of claim 7, wherein the instructions further cause the apparatus to cancel Channel State Information Reference Signal (CSI-RS) in one or more Orthogonal Frequency Division Multiplexing (OFDM) symbols carrying CSI-RS that fall outside a channel successfully acquired by the base station.

12. A method comprising:
- receiving, from a base station, downlink control information (DCI) comprising one or more bitmapped sub-band (SB) indications indicating one or more SB configurations; and
- performing measurements using a first channel state information-reference signal (CSI-RS) received in one or more orthogonal frequency division multiplexing (OFDM) symbols, wherein the first CSI-RS is received in a first channel successfully acquired by the base station; and
- canceling reception of a second CSI-RS in one or more OFDM symbols, wherein the second CSI-RS reception falls outside a second channel successfully acquired by the base station.

13. The method of claim 12, further comprising whether the OFDM symbols are successfully acquired is based on the one or more bitmapped SB indications.

14. The method of claim 12, further comprising determining a listen-before-talk (LBT) type from a Random Access Response (RAR).

15. The method of claim 12, wherein the unavailable sub-band is an LBT sub-band that is indicated to be unavailable based on the LBT outcome of the base station.

16. The method of claim 12, wherein the one or more SB indications is associated with a resource block (RB).

17. The method of claim 12, further comprising periodically receiving new DCI, wherein one or more new DCI indicate a change in available sub-bands.

18. The method of claim 12, wherein CSI-RS in one or more OFDM symbols indicated as not successfully acquired by the base station are not available.

19. The apparatus of claim 1, wherein CSI-RS in one or more OFDM symbols indicated as not successfully acquired by the base station are not available.

20. The apparatus of claim 1, wherein a SB configuration of the one or more SB configurations comprises an indication of frequency domain resources.

* * * * *

UNITED STATES PATENT AND TRADEMARK OFFICE
CERTIFICATE OF CORRECTION

| | |
|---|---|
| PATENT NO. | : 11,871,451 B2 |
| APPLICATION NO. | : 17/275702 |
| DATED | : January 9, 2024 |
| INVENTOR(S) | : Mohamed Awadin et al. |

It is certified that error appears in the above-identified patent and that said Letters Patent is hereby corrected as shown below:

In the Claims

In Claim 12: Column 57, Line 14, delete "second" and insert --first--

Signed and Sealed this
Eighteenth Day of June, 2024

Katherine Kelly Vidal
*Director of the United States Patent and Trademark Office*